(12) United States Patent
Maeda et al.

(10) Patent No.: US 9,788,268 B2
(45) Date of Patent: Oct. 10, 2017

(54) MOBILE COMMUNICATION SYSTEM

(75) Inventors: Miho Maeda, Tokyo (JP); Mitsuru Mochizuki, Tokyo (JP); Taiga Saegusa, Tokyo (JP); Yasushi Iwane, Tokyo (JP)

(73) Assignee: TCL COMMUNICATION TECHNOLOGY HOLDINGS LIMITED, Shatin NT (HK)

( * ) Notice: Subject to any disclaimer, the term of this patent is extended or adjusted under 35 U.S.C. 154(b) by 1204 days.

(21) Appl. No.: 13/141,858

(22) PCT Filed: Dec. 22, 2009

(86) PCT No.: PCT/JP2009/007131
§ 371 (c)(1),
(2), (4) Date: Jun. 23, 2011

(87) PCT Pub. No.: WO2010/073628
PCT Pub. Date: Jul. 1, 2010

(65) Prior Publication Data
US 2011/0261777 A1 Oct. 27, 2011

(30) Foreign Application Priority Data

Dec. 23, 2008 (JP) ................. 2008-326643
Oct. 30, 2009 (JP) ................. 2009-250206

(51) Int. Cl.
*H04W 48/20* (2009.01)
*H04L 5/00* (2006.01)

(52) U.S. Cl.
CPC ........... *H04W 48/20* (2013.01); *H04L 5/0007* (2013.01)

(58) Field of Classification Search
USPC ........ 370/329, 312, 319, 328, 342, 444, 461
See application file for complete search history.

(56) References Cited

U.S. PATENT DOCUMENTS

| | | | |
|---|---|---|---|
| 2008/0207245 A1 | 8/2008 | Wakabayashi et al. | |
| 2009/0047968 A1* | 2/2009 | Gunnarsson et al. | 455/446 |
| 2009/0180414 A1 | 7/2009 | Maeda et al. | |
| 2009/0305699 A1* | 12/2009 | Deshpande et al. | 455/434 |
| 2010/0112980 A1* | 5/2010 | Horn | H04W 48/20 455/411 |

(Continued)

FOREIGN PATENT DOCUMENTS

| | | |
|---|---|---|
| JP | 2011-523308 A | 8/2011 |
| WO | 2009 028209 | 3/2009 |
| WO | 2009 044620 | 4/2009 |

OTHER PUBLICATIONS

Deshpande et al., System Selection Appendix 1, Jun. 6, 2008, Qualcomm, U.S. Appl. No. 61/059,680, pp. 1-31.*

(Continued)

*Primary Examiner* — Joseph Bednash
(74) *Attorney, Agent, or Firm* — Shimokaji IP

(57) ABSTRACT

In a communication system including a specified subscriber cell which allows a specific mobile terminal to use the specified subscriber cell, and an unspecified user cell which an unspecified mobile terminal can use, in which each mobile terminal receives cell identification information assigned to each communication cell and makes a cell selection, identification information for identifying the CSG cell operating in an open access mode is included in the cell identification information.

9 Claims, 37 Drawing Sheets

(56) References Cited

U.S. PATENT DOCUMENTS

| | | |
|---|---|---|
| 2010/0178895 A1 | 7/2010 | Maeda et al. |
| 2011/0216732 A1 | 9/2011 | Maeda et al. |
| 2012/0157107 A9* | 6/2012 | Jung et al. .................... 455/450 |

OTHER PUBLICATIONS

Deshpande et al., Systems and Methods for Registration and Access in Femtocell Deployment Appendix 2, Jun. 6, 2008, Qualcomm, U.S. Appl. No. 61/059,680, pp. 1-3.*

Lee et al., "Integrating Femto-cell into the 1xRTT and EV-DO and the UMB environments", 3rd Generation Partnership Project 2 "3GPP2", 2007; C00-20061008-003.*

Ch'ng et al., Tutorial on Femtocell Technology and SIP/IMS-based Femto Network Architectures, 3GPP2, 2007.*

3GPP TS 36.331 V9.0.0 (Sep. 2009), 3rd Generation Partnership Project; Technical Specification Group Radio Access Network; Evolved Universal Terrestrial Radio Access (E-UTRA) Radio Resource Control (RRC); Protocol Specification (Release 9), pp. 101-103, 208-209.*

U.S. Appl. No. 13/420,306, filed Mar. 14, 2012, Maeda, et al.
U.S. Appl. No. 13/499,026, filed Mar. 29, 2012, Maeda, et al.
U.S. Appl. No. 13/504,672, filed Apr. 27, 2012, Maeda, et al.
U.S. Appl. No. 13/499,737, filed Apr. 2, 2012, Mochizuki, et al.

3GPP TSG-RAN WG2 Meeting #60BIS R2-080020, "CSG & Home Deployments Status in CT1," Nokia Corporation, Nokia Siemens Networks, total 3 pages, (Jan. 14-18, 2008).

3GPP TSG RAN WG1 #54 R1-082911, "CSG Flag in Physical Cell ID," LG Electronics, pp. 1-8, (Aug. 18-22, 2008).

3GPP TS 36.300 V8.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP™, total 12 pages, (Sep. 2008).

3GPP TSG-RAN WG1 Meeting #49bis R1-072963, "Signaling of MBSFN subframe allocation in D-BCH," Nokia Siemens Networks, Nokia, Huawei, total 3 pages, (Jun. 25-29, 2007).

3GPP TR R3.020 V0.6.0., "3rd Generation Partnership Project; Technical Specification Group Radio Access Network Home (e)NodeB; Network aspects (Release 8)," 3GPP™, total 27 pages, (May 2008).

3GPP TS 36.304 V8.3.0, "3rd Generation Partnership Project; Technical Specification Group Radio Access Network; Evolved Universal Terrestrial Radio Access (E-UTRA); User Equipment (UE) procedures in idle mode (Release 8)," total 14 pages, (Sep. 2008).

3GPP TSG-RAN WG 2 Meeting #62 R2-082899, "LS on CSG cell identification," RAN2, 1 page, (May 5-9, 2008).

3GPP TSG-SA1 #42 S1-083461, "LS on HNB/HeNB Open Access Mode," 3GPP SA WG1, 1 page, (Oct. 13-17, 2008).

3GPP TSG RAN WG2 #64 Tdoc R2-086246, "PSC/PCI split handling and clarifications," Huawei, total 2 pages, (Nov. 2008).

3GPP TS 22.011 V8.3.0, "3rd Generation Partnership Project; Technical Specification Group Services and System Aspects; Service Accessibility (Release 8)," 3GPP™, total 13 pages, (Mar. 2008).

3GPP TSG-RAN WG2 #64bis R2-086281, "H(e)NBs PSC/PCI split for hybrid access mode," Qualcomm Europe, total 2 pages, (Nov. 10-14, 2008).

3GPP TS 36.331 V8.3.0, "3rd Generation Partnership Project; Technical Specification Group Radio Access Network; Evolved Universal Terrestrial Radio Access (E-UTRA) Radio Resource Control (RRC); Protocol Specification (Release 8)," 3GPP™, total 9 pages, (Sep. 2008).

3GPP TSG-RAN WG2#67 R2-094808, "[66b#6] UMTS-LTE Hybrid cells," Email Discussion Rapporteur (Qualcomm), pp. 1-14, (Aug. 24-28, 2009).

International Search Report issued Apr. 6, 2010 in PCT/JP09/007131 filed Dec. 22, 2009.

U.S. Appl. No. 13/144,972, filed Jul. 18, 2011, Maeda, et al.
U.S. Appl. No. 13/378,380, filed Dec. 15, 2011, Maeda, et al.
U.S. Appl. No. 13/264,767, filed Oct. 17, 2011, Mochizuki, et al.

European Search Report issued Feb. 18, 2014 in corresponding European Patent Application No. 09834436.9.

Qualcomm Europe: "Mixed Open/Closed HeNB Deployments", 3GPP Draft; R2 083266, $3^{RD}$ Generation Partnership Project (3GPP), vol. RAN WG2, no. Warsaw, Poland; Jun. 24, 2008.

3GPP SA 2G1: "LS on HNB/HeNB Open Access Mode", 3GPP Draft: R2-086050_S1-083461, $3^{RD}$ Generation Partnership Project (3GPP), Nov. 3, 2008.

Vodafone: "Support of Hybrid Mode CSG Cells in UTRAN", 3GPP Draft; R2-086462, $3^{RD}$ Generation Partnership Project (3GPP), Nov. 3, 2008.

Huawei: "Add Hybrid cell into the manual CSG ID selection", 3GPP Draft: 25367U_CR0010_REL-9)_R2-097291_Add Hybrid Cell into Manual CSG ID Selection, $3^{rd}$ Generation Partnership Project (3GPP); Nov. 9, 2009.

Ericsson: "Support for hybrid home base stations", 3GPP Draft; R2-092083 Hybridmode, $3^{RD}$ Generation Partnership Project (3GPP), Mar. 17, 2009.

Japanese Office Action issued Dec. 24, 2013 in corresponding Japanese Patent Application No. 2013-096900 (with English Translation), (3 pages).

T-Mobile, Realization of open and "semi open" CSG cell, S1-083177, 3GPP, Oct. 17, 2008, pp. 2-3.

* cited by examiner

FIG.5
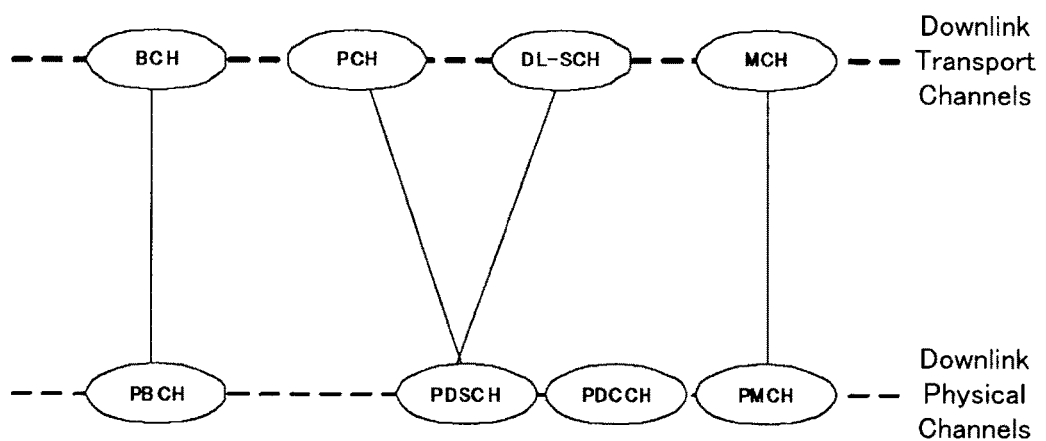
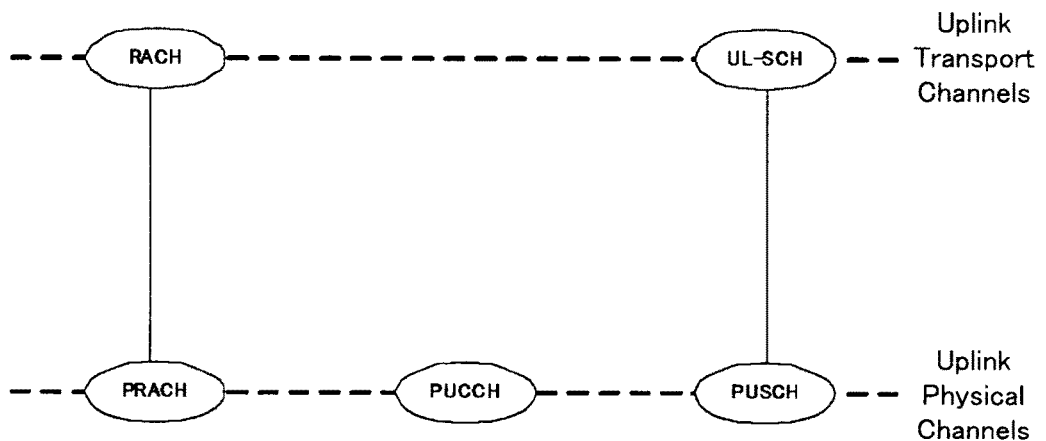

FIG.6
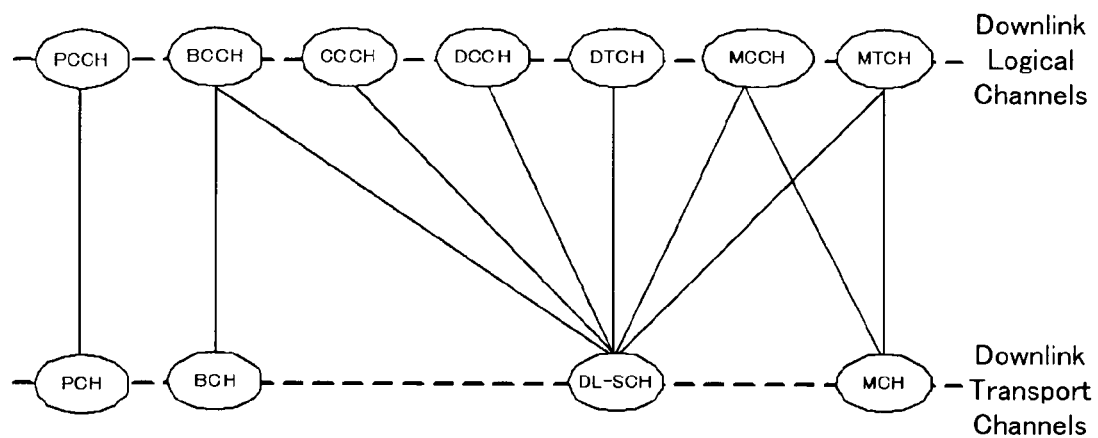
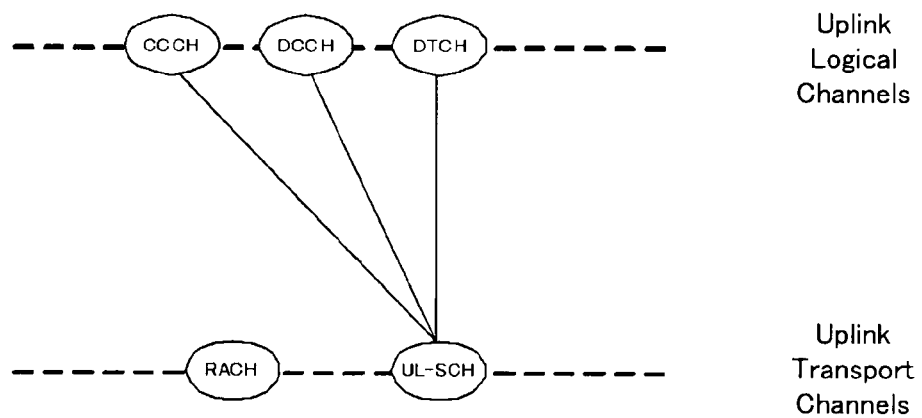

FIG.13
(a)
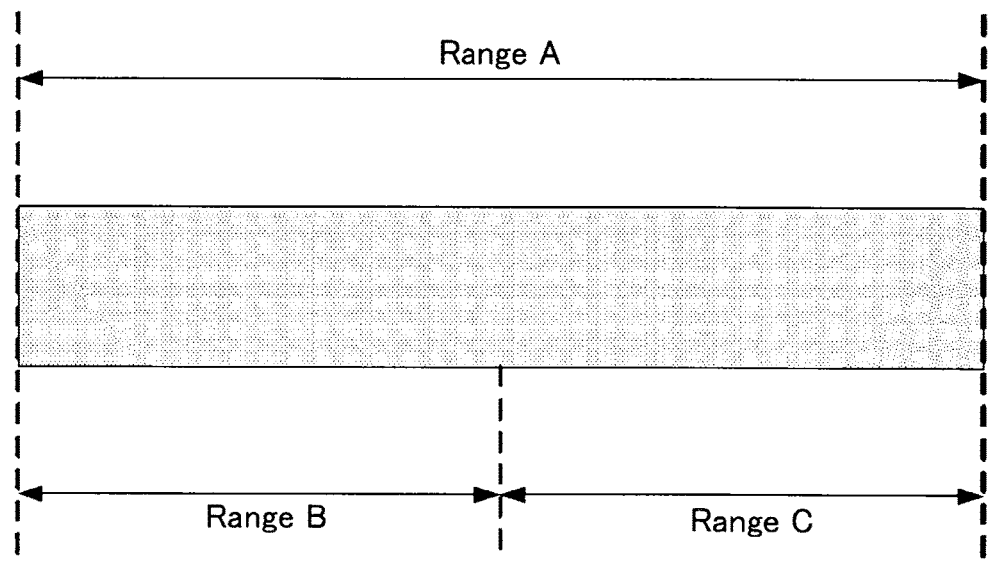
(b)
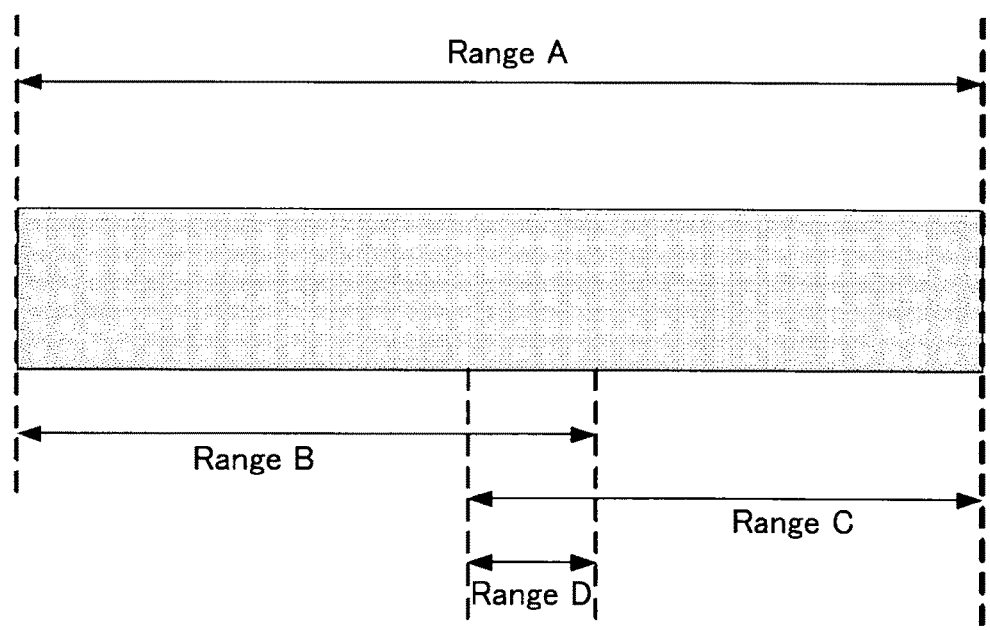

FIG.16
(a)
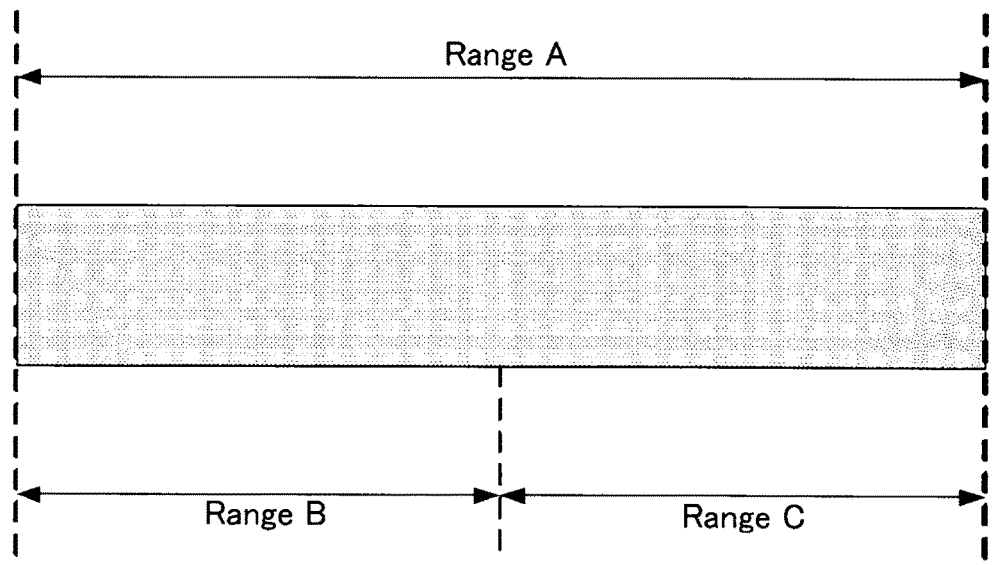
(b)
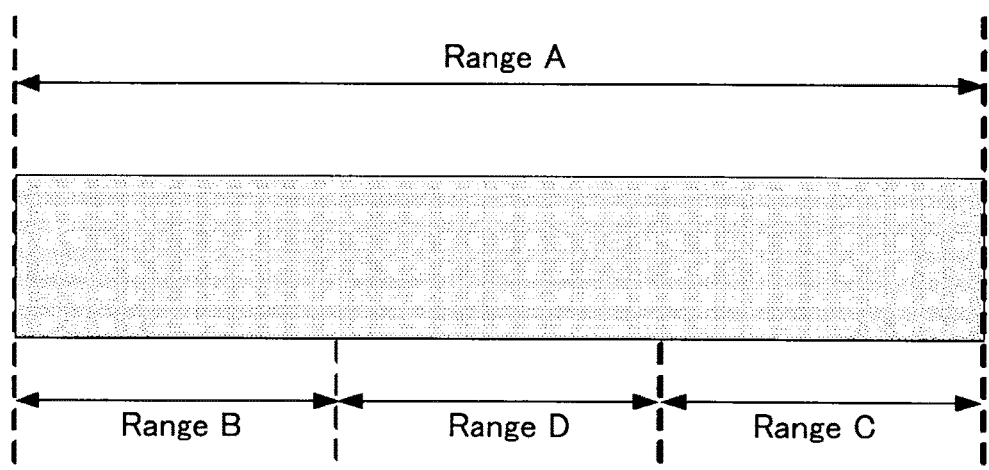

MOBILE COMMUNICATION SYSTEM

FIELD OF THE INVENTION

The present invention relates to a mobile communication system in which a base station carries out radio communications with a plurality of mobile terminals.

BACKGROUND OF THE INVENTION

Commercial services which employ a W-CDMA (Wideband Code division Multiple Access) method which is included in communication methods called a third generation were started in Japan since 2001. Furthermore, a service with HSDPA (High Speed Down Link Packet Access) which implements a further improvement in the speed of data transmission using downlinks (a dedicated data channel and a dedicated control channel) by adding a channel for packet transmission (HS-DSCH: High Speed-Downlink Shared Channel) to the downlinks has been started. In addition, services using an HSUPA (High Speed Up Link Packet Access) method have been started in order to further speed up uplink data transmission. The W-CDMA is a communication method which was determined by the 3GPP (3rd Generation Partnership Project) which is the organization of standardization of mobile communication systems, and the technical specification of the release 8 has been being organized currently.

In the 3GPP, as a communication method different from the W-CDMA, a new communication method having a wireless section, which is referred to as "Long Term Evolution" (LTE), and a whole system configuration including a core network, which is referred to as "System Architecture Evolution" (SAE), has also been studied. The LTE has an access method, a radio channel configuration, and protocols which are completely different from those of the current W-CDMA (HSDPA/HSUPA). For example, while the W-CDMA uses, as its access method, code division multiple access (Code Division Multiple Access), the LTE uses, as its access method, OFDM (Orthogonal Frequency Division Multiplexing) for the downlink direction and uses SC-FDMA (Single Career Frequency Division Multiple Access) for the uplink direction. Furthermore, while the W-CDMA has a bandwidth of 5 MHz, the LTE enables each base station to select one bandwidth from among bandwidths of 1.25, 2.5, 5, 10, 15, and 20 MHz. In addition, the LTE does not include a circuit switching method, unlike the W-CDMA, but uses only a packet communication method.

According to the LTE, because a communication system is configured using a new core network different from a core network (GPRS) in the W-CDMA, the communication system is defined as an independent radio access network which is separate from a W-CDMA network. Therefore, in order to distinguish from a communication system which complies with the W-CDMA, in a communication system which complies with the LTE, a base station (Base station) which communicates with a mobile terminal (UE: User Equipment) is referred to as eNB (E-UTRAN NodeB), and a base station control apparatus (Radio Network Controller) which performs exchange of control data and user data with a plurality of base stations is referred to as an EPC (Evolved Packet Core) (may be called aGW: Access Gateway). This communication system which complies with the LTE provides a unicast (Unicast) service and an E-MBMS service (Evolved Multimedia Broadcast Multicast Service). An E-MBMS service is a broadcast type multimedia service, and simply may be referred to as an MBMS. A large-volume broadcast content, such as news, a weather forecast, or a mobile broadcasting content, is transmitted to a plurality of mobile terminals. This service is also referred to as a point-to-multipoint (Point to Multipoint) service.

Matters currently determined in the 3GPP and regarding a whole architecture (Architecture) in an LTE system are described in nonpatent reference 1. The whole architecture (chapter 4 of nonpatent reference 1) will be explained with reference to FIG. 1. FIG. 1 is an explanatory drawing showing the configuration of a communication system using an LTE method. In FIG. 1, if a control protocol (e.g., RRC (Radio Resource Management)) and a user plane (e.g., PDCP: Packet Data Convergence Protocol, RLC: Radio Link Control, MAC: Medium Access Control, PHY: Physical layer) for a mobile terminal 101 are terminated at a base station 102, E-UTRAN (Evolved Universal Terrestrial Radio Access) is constructed of one or more base stations 102.

Each base station 102 carries out scheduling (Scheduling) and transmission of a paging signal (Paging Signaling, which is also referred to as paging messages (paging messages)) which is transmitted thereto from an MME 103 (Mobility Management Entity). The base stations 102 are connected to one another via X2 interfaces. Furthermore, each base station 102 is connected to an EPC (Evolved Packet Core) via an S1 interface. More specifically, each base station is connected to an MME 103 (Mobility Management Entity) via an S1_MME interface, and is also connected to an S-GW 104 (Serving Gateway) via an S1_U interface. Each MME 103 distributes a paging signal to one or more base stations 102. Furthermore, each MME 103 carries out mobility control (Mobility control) of an idle state (Idle State). When a mobile terminal is in any one of an idle state and an active state (Active State), each MME 103 manages a tracking area (Tracking Area) list. Each S-GW 104 carries out transmission and reception of user data to and from one or more base stations 102. Each S-GW 104 becomes a local mobility anchor point (Mobility Anchor Point) when a handover occurs between base stations. Furthermore, a P-GW (PDN Gateway) exists and carries out packet filtering for each user, allocation of a UE-ID address, etc.

Matters currently determined in the 3GPP and regarding a frame configuration in a LTE system are described in nonpatent reference 1 (Chapter 5). The currently determined matters will be explained with reference to FIG. 2. FIG. 2 is an explanatory drawing showing the configuration of a radio frame for use in a communication system using an LTE method. In FIG. 2, one radio frame (Radio frame) has a time length of 10 ms. Each radio frame is divided into ten equal-sized subframes (Sub-frames). Each subframe is divided into two equal-sized slots (slots). A downlink synchronization signal (Downlink Synchronization Channel Signal: SS) is included in each of the 1st (#0) and 6th subframes (#5) of each frame. Synchronization signals include a primary synchronization signal (Primary Synchronization Signal: P-SS) and a secondary synchronization signal (Secondary Synchronization Signal: S-SS). Multiplexing of a channel used for MBSFN (Multimedia Broadcast multicast service Single Frequency Network) and a channel used for other than MBSFN is carried out for each subframe. Hereafter, a subframe used for MBSFN transmission is referred to as an MBSFN subframe (MBSFN subframe). In nonpatent reference 2, an example of signaling at the time of allocation of MBSFN subframes is described. FIG. 3 is an explanatory drawing showing the configuration of an MBSFN frame. In FIG. 3, MBSFN subframes are allocated to each MBSFN frame (MBSFN frame). An MBSFN frame cluster (MBSFN frame Cluster) is scheduled. The repetition period (Repetition Period) of an MBSFN frame cluster is allocated.

Matters currently determined in the 3GPP and regarding a channel configuration in an LTE system are described in nonpatent reference 1. It is assumed that the same channel configuration as that used for non-CSG cells are used also for CSG (Closed Subscriber Group) cells. Physical channels (Physical channels) (chapter 15 of nonpatent reference) will be explained with reference to FIG. 4. FIG. 4 is an explanatory drawing explaining physical channels for use in a communication system using an LTE method. In FIG. 4, a physical broadcast channel 401 (Physical Broadcast channel: PBCH) is a downlink channel which is transmitted from a base station 102 to a mobile terminal 101. A BCH transport block (transport block) is mapped onto four subframes during a 40-ms time period. There is no clear signaling having a timing of 40 ms. A physical control channel format indicator channel 402 (Physical Control format indicator channel: PCFICH) is transmitted from the base station 102 to the mobile terminal 101. The PCFICH informs the number of OFDM symbols used for PDCCHs from the base station 102 to the mobile terminal 101. The PCFICH is transmitted in each subframe. A physical downlink control channel 403 (Physical downlink control channel: PDCCH) is a downlink channel transmitted from the base station 102 to the mobile terminal 101. The PDCCH informs resource allocation (allocation), HARQ information about a DL-SCH (a downlink shared channel which is one of transport channels shown in FIG. 5), and a PCH (paging channel which is one of the transport channels shown in FIG. 5). The PDCCH carries an uplink scheduling grant (Uplink Scheduling Grant). The PDCCH also carries ACK/Nack which is a response signal showing a response to uplink transmission. The PDCCH is also called an L1/L2 control signal. A physical downlink shared channel 404 (Physical downlink shared channel: PDSCH) is a downlink channel transmitted from the base station 102 to the mobile terminal 101. A DL-SCH (downlink shared channel) which is a transport channel and a PCH which is a transport channels are mapped onto the PDSCH. A physical multicast channel 405 (Physical multicast channel: PMCH) is a downlink channel transmitted from the base station 102 to the mobile terminal 101. An MCH (multicast channel) which is a transport channel is mapped onto the PMCH.

A physical uplink control channel 406 (Physical Uplink control channel: PUCCH) is an uplink channel transmitted from the mobile terminal 101 to the base station 102. The PUCCH carries ACK/Nack which is a response signal (response) which is a response to downlink transmission. The PUCCH carries a CQI (Channel Quality indicator) report. The CQI is quality information showing either the quality of received data or communication channel quality. The PUCCH also carries a scheduling request (Scheduling Request: SR). A physical uplink shared channel 407 (Physical Uplink shared channel: PUSCH) is an uplink channel transmitted from the mobile terminal 101 to the base station 102. A UL-SCH (an uplink shared channel which is one of the transport channels shown in FIG. 5) is mapped onto the PUSCH. A physical HARQ indicator channel 408 (Physical Hybrid ARQ indicator channel: PHICH) is a downlink channel transmitted from the base station 102 to the mobile terminal 101. The PHICH carries ACK/Nack which is a response to uplink transmission. A physical random access channel 409 (Physical random access channel: PRACH) is an uplink channel transmitted from the mobile terminal 101 to the base station 102. The PRACH carries a random access preamble (random access preamble).

In a downlink reference signal (Reference signal), symbols known in the mobile communication system are inserted into first, third and final OFDM symbols of each slot. As measurement of a physical layer of each mobile terminal, there is reference symbol received power (Reference symbol received power: RSRP).

The transport channels (Transport channels) (chapter 5 of nonpatent reference 1) will be explained with reference to FIG. 5. FIG. 5 is an explanatory drawing explaining the transport channels for use in a communication system using an LTE method. Mapping between downlink transport channels and downlink physical channels is shown in FIG. 5A. Mapping between uplink transport channels and uplink physical channels is shown in FIG. 5B. In the downlink transport channels, a broadcast channel (Broadcast channel: BCH) is broadcast to all the base stations (cell). The BCH is mapped onto a physical broadcast channel (PBCH). Retransmission control with HARQ (Hybrid ARQ) is applied to a downlink shared channel (Downlink Shared channel: DL-SCH). Broadcasting to all the base stations (cell) can be carried out. Dynamic or semi-static (Semi-static) resource allocation is supported. Semi-static resource allocation is also referred to as persistent scheduling (Persistent Scheduling). DRX (Discontinuous reception) by a mobile terminal is supported in order to achieve low power consumption of the mobile terminal. The DL-SCH is mapped onto a physical downlink shared channel (PDSCH). A paging channel (Paging channel: PCH) supports DRX by a mobile terminal in order to enable the mobile terminal to achieve low power consumption. Broadcasting to all the base stations (cell) is requested. Mapping onto either a physical resource such as a physical downlink shared channel (PDSCH) which can be dynamically used for traffic, or a physical resource such as a physical downlink control channel (PDCCH) which is another control channel is carried out. A multicast channel (Multicast channel: MCH) is used for the broadcasting to all the base stations (cell). SFN combining of MEMS services (MTCH and MCCH) in multi-cell transmission is supported. Semi-static resource allocation is supported. The MCH is mapped onto a PMCH.

Retransmission control with HARQ (Hybrid ARQ) is applied to an uplink shared channel (Uplink Shared channel: UL-SCH). Dynamic or semi-static (Semi-static) resource allocation is supported. A UL-SCH is mapped onto a physical uplink shared channel (PUSCH). A random access channel (Random access channel: RACH) shown in FIG. 5B is limited to control information. There is a risk of collision. The RACH is mapped onto a physical random access channel (PRACH). HARQ will be explained hereafter.

HARQ is a technology of improving the communication quality of a transmission line by using a combination of automatic retransmission (Automatic Repeat reQuest) and error correction (Forward Error Correction). Retransmission provides an advantage of making an error correction function be effective also for a transmission line whose communication quality varies. Particularly, when performing retransmission, combining the results of reception of first-time transmission and the results of reception of retransmission provides a further improvement in the quality. An example of a retransmission method will be explained. When a receive side cannot decode received data correctly (when a CRC Cyclic Redundancy Check error occurs (CRC=NG)), the receive side transmits "Nack" to the transmit side. When receiving "Nack", the transmit side retransmits the data. In contrast, when the receive side can decode the received data correctly (when no CRC error occurs (CRC=OK)), the receive side transmits "Ack" to the transmit side. When receiving "Ack", the transmit side transmits the next data. There is "chase combining" (Chase Combining) as an example of a HARQ method. The chase combining is a method of transmitting the same data sequence at the time of first-time transmission and at the time of retransmission, and, when performing retransmission, combining the data sequence at the first-time transmission and the data sequence at the retransmission to improve the gain. This is based on an idea that even if the first-time transmission data has an error, the first-time transmission data partially includes correct data, and therefore the data can be transmitted with a higher degree of precision by combining the correct portion of the first-time transmission data and the retransmission data. Furthermore, there is IR (Incremental Redundancy) as another example of the HARQ method. The IR is a method of increasing the degree of redundancy with a combination with the first-time transmission by transmitting a parity bit at the time of retransmission to improve the quality by using an error correction function.

Logical channels (Logical channels) (chapter 6 of nonpatent reference 1) will be explained with reference to FIG. 6. FIG. 6 is an explanatory drawing explaining logical channels for use in a communication system using an LTE method. Mapping between downlink logical channels and downlink transport channels is shown in FIG. 6A. Mapping between uplink logical channels and uplink transport channels is shown in FIG. 6B. A broadcast control channel (Broadcast control channel: BCCH) is a downlink channel for broadcast system control information. The BCCH which is a logical channel is mapped onto either a broadcast channel (BCH) which is a transport channel, or a downlink shared channel (DL-SCH). A paging control channel (Paging control channel: PCCH) is a downlink channel for transmitting a paging signal. The PCCH is used when the network does not know the cell location of a mobile terminal. The PCCH which is a logical channel is mapped onto a paging channel (PCH) which is a transport channel. A common control channel (Common control channel: CCCH) is a channel for transmission control information between a mobile terminal and a base station. The CCCH is used when the mobile terminal does not have RRC connection (connection) between the mobile terminal and the network. In the downlink direction, the CCCH is mapped onto a downlink shared channel (DL-SCH) which is a transport channel. In the uplink direction, the CCCH is mapped onto an uplink shared channel (UL-SCH) which is a transport channel.

A multicast control channel (Multicast control channel: MCCH) is a downlink channel for point-to-multipoint transmission. The channel is used for transmission of MEMS control information for one or some MTCHs from the network to mobile terminals. The MCCH is used only for a mobile terminal currently receiving an MBMS. The MCCH is mapped onto either a downlink shared channel (DL-SCH) which is a transport channel, or a multicast channel (MCH). A dedicated control channel (Dedicated control channel: DCCH) is a channel for transmitting individual control information between a mobile terminal and the network. The DCCH is mapped onto an uplink shared channel (UL-SCH) in the uplink, and is mapped onto a downlink shared channel (DL-SCH) in the downlink. A dedicated traffic channel (Dedicate Traffic channel: DTCH) is a channel of point-to-point communications to each mobile terminal for transmission of user information. The DTCH exists for both the uplink and the downlink. The DTCH is mapped onto an uplink shared channel (UL-SCH) in the uplink, and is mapped onto a downlink shared channel (DL-SCH) in the downlink. A multicast traffic channel (Multicast Traffic channel: MTCH) is a downlink channel for transmission of traffic data from the network to a mobile terminal. The MTCH is used only for a mobile terminal currently receiving an MBMS. The MTCH is mapped onto either a downlink shared channel (DL-SCH) or a multicast channel (MCH).

A GCI is a global cell identifier (Global Cell Identity). In an LTE and in a UMTS (Universal Mobile Telecommunication System), a CSG cell (Closed Subscriber Group cell) is introduced. A CSG cell will be explained hereafter (Chapter 43.1 of nonpatent reference). A CSG (Closed Subscriber Group) is a cell (specified subscriber cell) in which an operator specifies subscribers which can use the cell. Each specified subscriber is allowed to access one or more E-UTRAN cells in a PLMN (Public Land Mobile Network). One or more E-UTRAN cells which each specified subscriber is allowed to access are referred to as "CSG cell (s)". However, an access restriction is imposed on the PLMN. A CSG cell is a part of the PLMN which broadcasts a specific CSG identity (CSG identity: CSG ID, CSG-ID). Each subscriber group member that is registered in advance into a CSG cell and is allowed to access this CSG cell accesses the CSG cell by using the CSG-ID which is access allowance information. The CSG-ID is broadcast by the CSG cell or a cell. Two or more CSG-IDs exist for each CSG cell in the mobile communication system. A CSG-ID is used by each terminal (UE) in order to facilitate access from a CSG associated member. It has been debated in the 3GPP meeting that as the information broadcast by a CSG cell or a cell, a tracking area code (Tracking Area Code TAC) is used instead of a CSG-ID. A location track of a mobile terminal is carried out in units of each zone which consists of one or more cells. The location track is carried out in order to track the position of the mobile terminal even if this mobile terminal is in a state (idle state) which it not carrying out communications and to be able to call the mobile terminal (enable the mobile terminal to receive an incoming call). Each zone for this location track of the mobile terminal is referred to as a tracking area. A CSG white list (CSG White List) is a list in which all the CSG IDs of a CSG cell to which subscribers belong are recorded and which is stored in a USIM. The white list in each mobile terminal is provided by an upper layer. As a result, a base station of each CSG cell assigns radio resources to each mobile terminal.

A "suitable cell" (Suitable cell) will be explained hereafter (chapter 4.3 of nonpatent reference 4). A "suitable cell" (Suitable cell) camps on (Camp ON) in order for a UE to receive a normal (normal) service. (1) This cell has to be a part of a selected PLMN, a registered PLMN or a PLMN in an "Equivalent PLMN list", and further satisfies the following requirement (2) in the latest information provided by NAS (non-access stratum). (1) The cell is not a barred cell. (2) The cell is not a part of a "barred LAs list for roaming" lists, but is a part of at least one tracking area (Tracking Area: TA). In this case, the cell has to satisfy above-mentioned (1). (3) The cell meets a cell selection evaluation criterion. (4) When the cell is specified, as a CSG cell, by system information (System Information: SI), the CSG-ID is a part of a "CSG white list" (CSG White List) of an UE (the CSG-ID is included in the CSG White List of the UE).

An "acceptable cell" (Acceptable cell) will be explained hereafter (chapter 4.3 of nonpatent reference 4). This cell camps on in order for a UE to receive a limited service (emergency dial). This cell satisfies all the following requirements. More specifically, a minimum set of requirements to start an emergency dial in an E-UTRAN network will be shown hereafter. (1) The cell is not a barred cell. (2) The cell meets a cell selection evaluation criterion.

RELATED ART DOCUMENT

Patent Reference

Nonpatent reference 1: 3GPP TS36.300 V8.6.0
Nonpatent reference 2: 3GPP R1-072963
Nonpatent reference 3: TR R3.020V0.6.0
Nonpatent reference 4: 3GPP TS36.304 V8.3.0
Nonpatent reference 5: 3GPP R2-082899
Nonpatent reference 6: 3GPP S1-083461
Nonpatent reference 7: 3GPP R2-086246
Nonpatent reference 8: 3GPP TS22.011
Nonpatent reference 9: 3GPP R2-086281
Nonpatent reference 10: 3GPP TS36.331
Nonpatent reference 11: 3GPP R2-094808

SUMMARY OF THE INVENTION

An HeNB and an HNB are required to support various services. For example, by registering mobile terminals with a predetermined HeNB and a predetermined HNB and then allowing only each registered mobile terminal to access the HeNB and HNB cells, an operator can increase the amount of radio resources which this mobile terminal can use so as to enable the mobile terminal to carry out communications at a high speed. The operator sets a higher than normal charge according to the increase. One of the services is thus provided. In order to implement such a service, a CSG (Closed Subscriber Group cell) cell to which only a registered mobile terminal (a mobile terminal which has joined the cell to become a member) can access is introduced. There is a demand to install many CSG (Closed Subscriber Group) cells in a facility, such as a shopping center, an apartment, a school, or a company building. For example, a CSG cell is installed in each store of a shopping center, in each room of an apartment, in each classroom of a school, and in each section room of a company building. A using method of enabling only users who are registered with each CSG cell to use this CSG cell is required.

On the other hand, as another service, there can be considered a service to enable not only a registered mobile terminal but also an unregistered mobile terminal to use a part of the radio resources of such a CSG cell as above. For example, a CSG cell installed in each store of a shopping center is required not only to allow a salesclerk's mobile terminal to register with the CSG to enable high speed communications, but also to allow any customer's mobile terminal which is not registered with this CSG to use the CSG cell. In order to support such a requirement, the use of a "hybrid access mode" (Hybrid access mode) in an HeNB and an HNB has been proposed. The "hybrid access mode" shows an operation form (a third operation mode) of a CSG cell which simultaneously serves both a "closed access mode" (closed access mode) which is a first operation mode in which only registered mobile terminals can access the cell, and an "open access mode" (open access mode) which is a second operation mode and in which unregistered mobile terminals can access the cell. In this case, while it is determined whether to allow each registered mobile terminal to access the cell, any mobile terminal which is not registered with the cell can be allowed to access the cell. Therefore, in many HeNBs and HNBs which are installed in a facility, such as a shopping center or an apartment, CSG cells each of which operates in the open access mode and CSG cells each of which operate in the closed access mode coexist. Furthermore, it is assumed that each of an HeNB and an HNB has a portable size and a portable weight, and it is also required that the installation and withdrawal of these cells can be carried out frequently and with flexibility. Taking these requirements into consideration, radio waves from many cells in various operation modes are simultaneously transmitted to a certain point. More specifically, a situation in which each mobile terminal is located at a position which radio waves from many cells in various operation modes reach the mobile terminal can occur in a facility, such as a shopping center or an apartment.

In the case of a mobile terminal which is located at a position which radio waves from many cells set in different operation modes, like the open access mode, the closed access mode and the hybrid access mode, reach the mobile terminal, there occurs a situation in which the mobile terminal repeatedly makes a search through many cells in the closed access mode which the mobile terminal cannot access (CSG cells), i.e., CSG cells with which the mobile terminal has not been registered for user access, and makes a cell selection of such a CSG cell for a long time. Furthermore, if although the cell which a mobile terminal has selected by making a cell search operates in the hybrid access mode, that is, supports both the closed access mode and the open access mode, the mobile terminal has not been registered for user access to the cell, there occurs a situation in which the mobile terminal determines the mobile terminal cannot access the cell and repeatedly makes a cell search and a cell selection for a long time again. In such a case, there causes a control delay in the system, a reduction in the use efficiency of the radio resources, and a reduction in the signaling efficiency. Furthermore, there arises a problem that the power consumption of a mobile terminal which repeatedly makes a cell search becomes large. These problems are significant when a future planned arrangement of HeNBs and HNBs operating in various modes as mentioned above is assumed. The present invention is made in order to solve these problems.

In accordance with the present invention, there is provided a mobile communication system including mobile terminals each for transmitting and receiving data by using an OFDM (Orthogonal Frequency Division Multiplexing) method as a downlink access method, and by using an SC-FDMA (Single Career Frequency Division Multiple Access) method as an uplink access method, a base station disposed in a specified subscriber cell which is a communication cell which allows a specific one of the above-mentioned mobile terminals or a specific subscriber to use the specified subscriber cell and a base station disposed in an unspecified user cell which is a communication cell which an unspecified one of the above-mentioned mobile terminals or an unspecified user can use, and a base station control apparatus for managing a desired tracking area where the mobile terminals are located via the base stations, and for performing a paging process on the mobile terminals, each of the mobile terminals receiving cell identification information (PCI) assigned to each of the communication cells, for identifying each of the communication cells from the base stations, and selecting a cell with which each of the mobile terminals communicates, wherein the specified subscriber cell can simultaneously employ a first operation mode in which the specified subscriber cell allows the above-mentioned specific mobile terminal or the above-mentioned specific subscriber to use the specified subscriber cell, and a second operation mode in which the above-mentioned specified subscriber cell allows the above-mentioned unspecified mobile terminal or the above-mentioned unspecified user to use the specified subscriber cell, and the above-mentioned cell identification information includes identification information for identifying the above-mentioned specified subscriber cell operating in the above-mentioned second operation mode.

In accordance with the present invention, there is provided a mobile communication system including mobile terminals each for transmitting and receiving data by using an OFDM (Orthogonal Frequency Division Multiplexing) method as a downlink access method, and by using an SC-FDMA (Single Career Frequency Division Multiple Access) method as an uplink access method, a base station disposed in a specified subscriber cell which is a communication cell which allows a specific one of the above-mentioned mobile terminals or a specific subscriber to use the specified subscriber cell and a base station disposed in an unspecified user cell which is a communication cell which an unspecified one of the above-mentioned mobile terminal or an unspecified user can use, and a base station control apparatus for managing a desired tracking area where the above-mentioned mobile terminals are located via the above-mentioned base stations, each of the mobile terminals receiving cell identification information (PCI) for identifying each of the communication cells from the base stations, and selecting a cell with which each of the mobile terminals communicates, and each of the mobile terminal accessing the specified subscriber cell by using access allowance information which is issued when allowed to use the specified subscriber cell, wherein a tracking area of the specified subscriber cell which can simultaneously employ a first operation mode in which the specified subscriber cell allows the specific mobile terminal or the specific subscriber to use the specified subscriber cell, and a second operation mode in which the specified subscriber cell allows the unspecified mobile terminal or the unspecified user to use the specified subscriber cell is managed as a tracking area of the specified subscriber cell operating in the first operation mode, and each of the mobile terminals determines whether or not to access the specified subscriber cell on a basis of a tracking area identifier included in the access allowance information, and mode information showing in which one of the first and second operation modes the specified subscriber cell operates.

Because in the mobile communication system in accordance with the present invention including mobile terminals each for transmitting and receiving data by using an OFDM (Orthogonal Frequency Division Multiplexing) method as a downlink access method, and by using an SC-FDMA (Single Career Frequency Division Multiple Access) method as an uplink access method, a base station disposed in a specified subscriber cell which is a communication cell which allows a specific one of the above-mentioned mobile terminals or a specific subscriber to use the specified subscriber cell and a base station disposed in an unspecified user cell which is a communication cell which an unspecified one of the above-mentioned mobile terminal or an unspecified user can use, and a base station control apparatus for managing a desired tracking area where the mobile terminals are located via the base stations, and for performing a paging process on the mobile terminals, each of the mobile terminals receiving cell identification information (PCI) assigned to each of the communication cells, for identifying each of the communication cells from the base stations, and selecting a cell with which each of the mobile terminals communicates, the specified subscriber cell can simultaneously employ a first operation mode in which the specified subscriber cell allows the above-mentioned specific mobile terminal or the above-mentioned specific subscriber to use the specified subscriber cell, and a second operation mode in which the above-mentioned specified subscriber cell allows the above-mentioned unspecified mobile terminal or the above-mentioned unspecified user to use the specified subscriber cell, and the above-mentioned cell identification information includes identification information for identifying the above-mentioned specified subscriber cell operating in the above-mentioned second operation mode, there can be provided an advantage of being able to perform a search operation at a high speed, and preventing a control delay from occurring in the mobile communication system. There can be provided another advantage of reducing the power consumption of each mobile terminal.

Because in the mobile communication system in accordance with the present invention including mobile terminals each for transmitting and receiving data by using an OFDM (Orthogonal Frequency Division Multiplexing) method as a downlink access method, and by using an SC-FDMA (Single Career Frequency Division Multiple Access) method as an uplink access method, a base station disposed in a specified subscriber cell which is a communication cell which allows a specific one of the above-mentioned mobile terminals or a specific subscriber to use the specified subscriber cell and a base station disposed in an unspecified user cell which is a communication cell which an unspecified one of the above-mentioned mobile terminal or an unspecified user can use, and a base station control apparatus for managing a desired tracking area where the above-mentioned mobile terminals are located via the above-mentioned base stations, each of the mobile terminals receiving cell identification information (PCI) for identifying each of the communication cells from the base stations, and selecting a cell with which each of the mobile terminals communicates, and each of the mobile terminal accessing the specified subscriber cell by using access allowance information which is issued when allowed to use the specified subscriber cell, a tracking area of the specified subscriber cell which can simultaneously employ a first operation mode in which the specified subscriber cell allows the specific mobile terminal or the specific subscriber to use the specified subscriber cell, and a second operation mode in which the specified subscriber cell allows the unspecified mobile terminal or the unspecified user to use the specified subscriber cell is managed as a tracking area of the specified subscriber cell operating in the first operation mode, and each of the mobile terminals determines whether or not to access the specified subscriber cell on a basis of a tracking area identifier included in the access allowance information, and mode information showing in which one of the first and second operation modes the specified subscriber cell operates, there is provided an advantage of enabling each mobile terminal to access a cell in the hybrid access mode regardless of the presence or absence of a white list in the mobile terminal, or the presence or absence of the CSG-ID (TAC) of the cell in the hybrid access mode in the white list.

BRIEF DESCRIPTION OF THE FIGURES

FIG. 5 is an explanatory drawing explaining transport channels for use with the communication system which complies with an LTE method;

FIG. 6 is an explanatory drawing explaining logical channels for use with the communication system which complies with an LTE method;

FIG. 13 is a conceptual diagram of a PCI split in accordance with Embodiment 1;

FIG. 16 is a conceptual diagram of a PCI split in accordance with Embodiment 2;

EMBODIMENTS OF THE INVENTION

Hereafter, in order to explain this invention in greater detail, the preferred embodiments of the present invention will be described with reference to the accompanying drawings.

Embodiment 1

Figure 1:
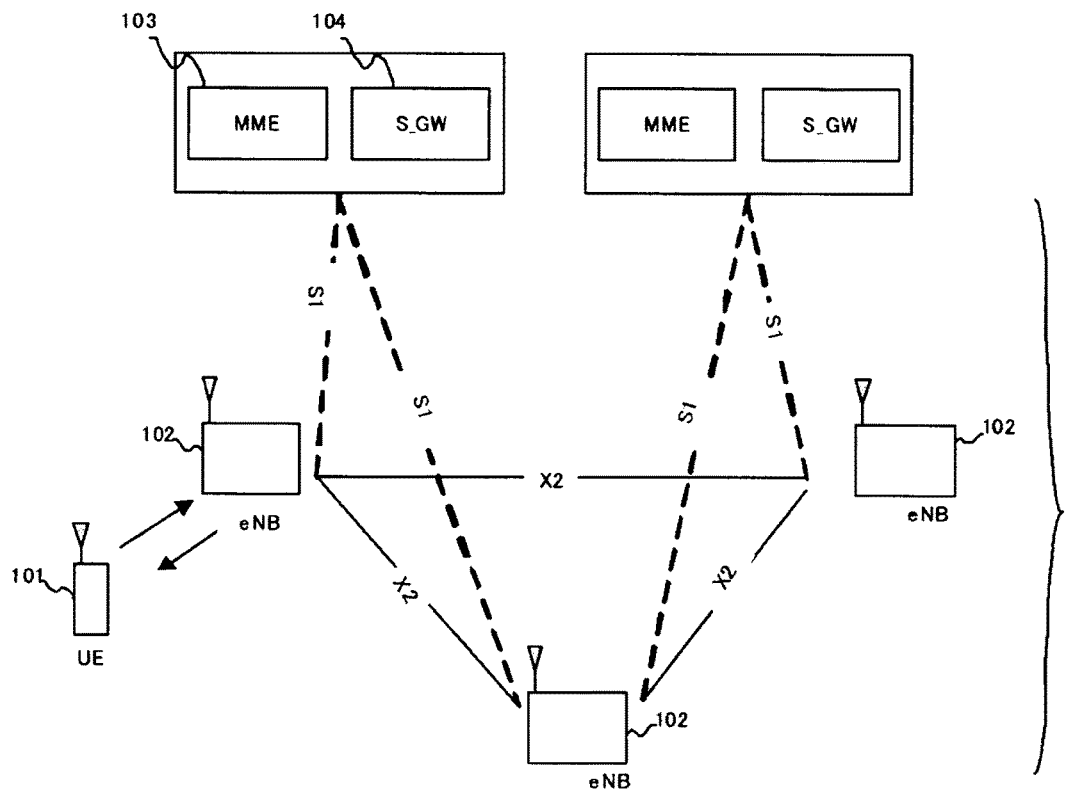
FIG. 1 is an explanatory drawing showing the configuration of a communication system which complies with an LTE method.
Figure 2:
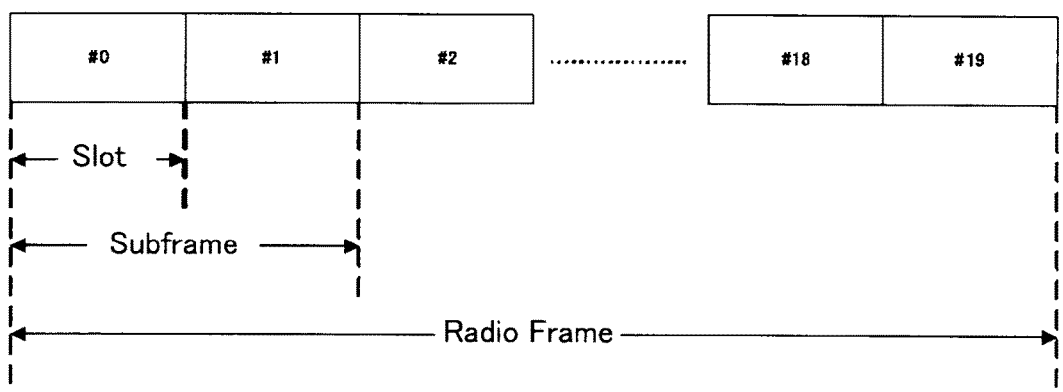
FIG. 2 is an explanatory drawing showing the configuration of a radio frame for use in the communication system which complies with an LTE method.
Figure 3:
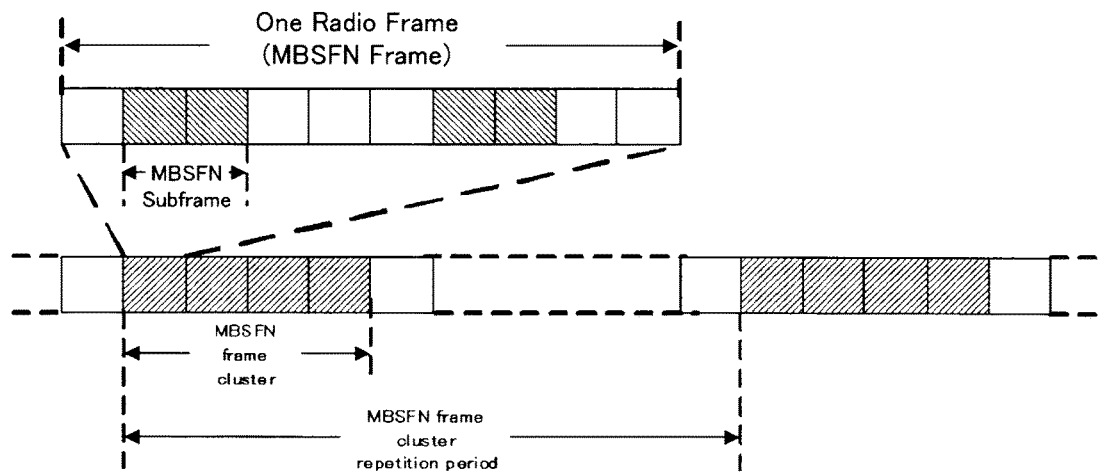
FIG. 3 is an explanatory drawing showing the configuration of an MBSFN (Multimedia Broadcast multicast service Single Frequency Network) frame.
Figure 4:
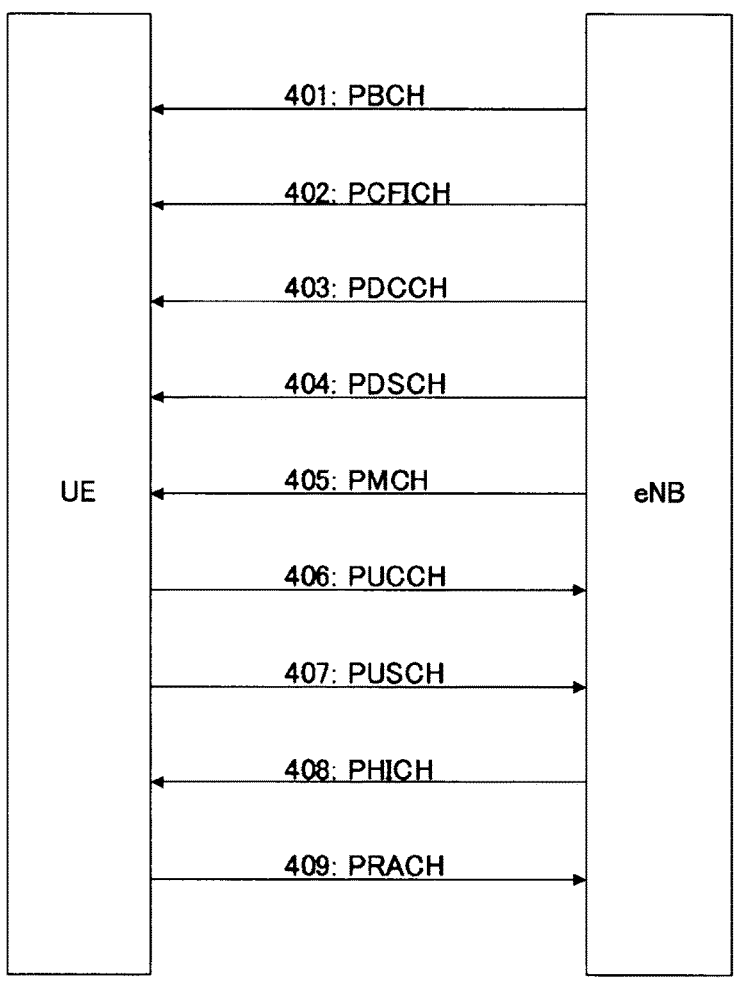
FIG. 4 is an explanatory drawing explaining physical channels for use with the communication system which complies with an LTE method.
Figure 7:
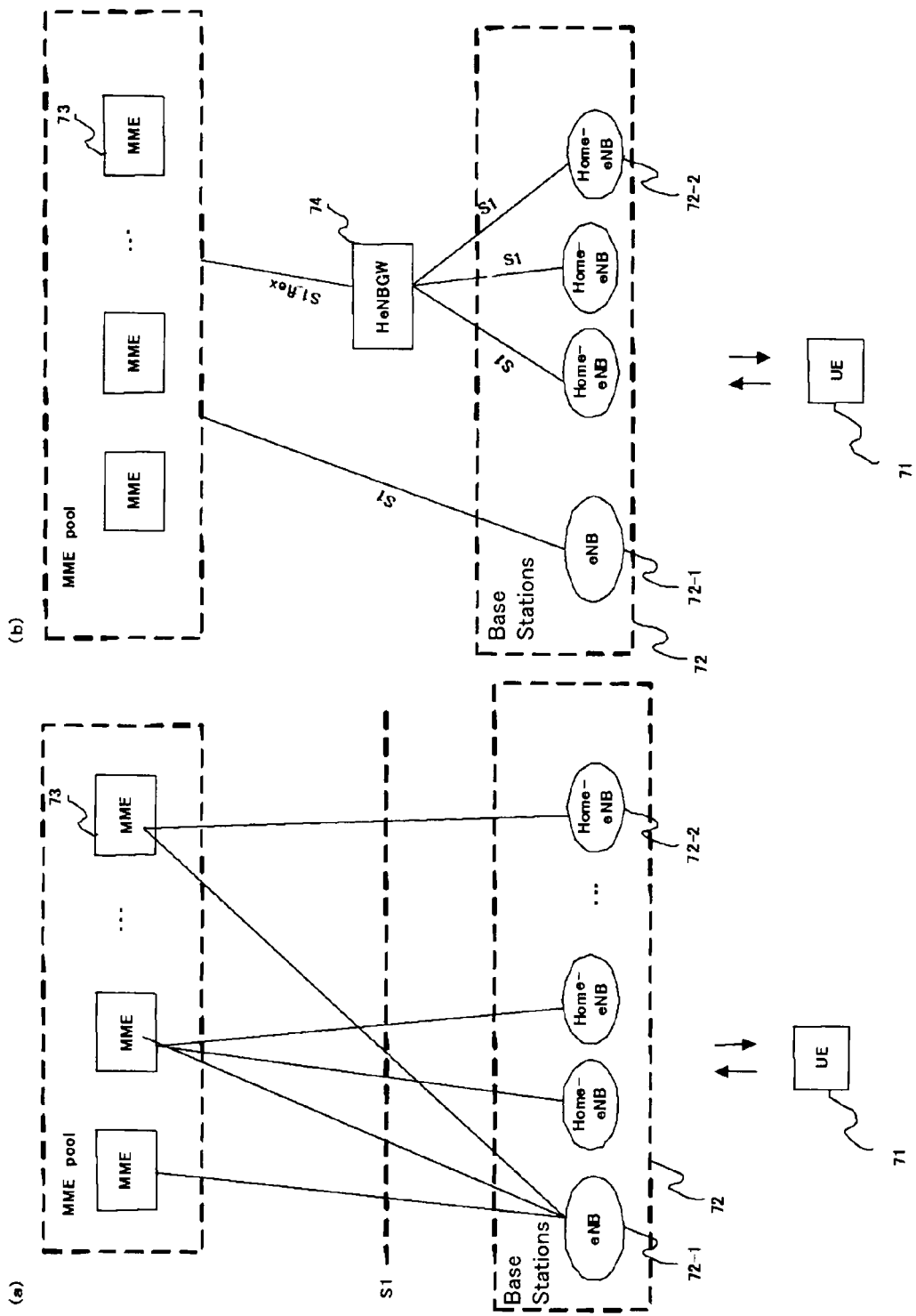
FIG. 7 is a block diagram showing the whole structure of a mobile communication system which has been debated in the 3GPP.

FIG. 7 is a block diagram showing the whole structure of a mobile communication system which complies with an LTE method which has been being debated in the 3GPP. In the 3GPP, the whole structure of a system including a CSG (Closed Subscriber Group) cell (a Home-eNodeB (a Home-eNB or HeNB) of e-UTRAN, or a Home-NB (HNB) of UTRAN) and a non-CSG cell (an eNodeB (eNB) of e-UTRAN, a NodeB (NB) of UTRAN, or a BSS of GERAN) has been being studied, and e-UTRAN having such a structure as shown in FIG. 7(a) or 7(b) has been proposed (refer to nonpatent reference 1 and nonpatent reference 3). The structure shown in FIG. 7(a) will be explained. A mobile terminal (UE) 71 carries out transmission and reception with a base station 72. Each base station 72 is categorized into an eNB (non-CSG cell) 72-1 or a Home-eNB (CSG cell) 72-2.

An eNB 72-1 is connected to an MME 73 via an interface S1, and control information is communicated between the eNB and the MME. A plurality of MMEs are connected to one eNB. A Home-eNB 72-2 is connected to an MME 73 via an interface S1, and control information is communicated between the Home-eNB and the MME. A plurality of Home-eNBs can be connected to one MME.

Next, the structure shown in FIG. 7(*b*) will be explained. A mobile terminal (UE) 71 carries out transmission and reception with a base station 72. Each base station 72 is categorized into an eNB (non-CSG cell) 72-1 or a Home-eNB (CSG cell) 72-2. Like in the case of FIG. 7(*a*), an eNB 72-1 is connected to an MME 73 via an interface S1, and control information is communicated between the eNB and the MME. A plurality of MMEs are connected to one eNB. On the other hand, an Home-eNB 72-2 is connected to an MME 73 via an HeNBGW (Home-eNB GateWay) 74. The Home-eNB and the HeNBGW are connected to each other via an interface S1, and the HeNBGW 74 and the MME 73 are connected to each other via an interface S1 flex. One or more Home-eNBs 72-2 are connected to one HeNBGW 74, and information is communicated between them via S1. Each HeNBGW 74 is connected to one or more MMEs 73, and information is communicated between them via S1_flex.

In the case of using the structure shown in FIG. 7(*b*) and connecting one HeNBGW 74 to a plurality of Home-eNBs belonging to the same CSG-ID to transmit the same information, e.g., registration information from an MME 73 to the plurality of Home-eNBs 72-2 which belong to the same CSG-ID, the information is temporarily transmitted to the HeNBGW 74 and is then transmitted from this HeNBGW to the plurality of Home-eNBs 72-2. As a result, the signaling efficiency can be improved as compared with the case in which the information is transmitted directly to each of the plurality of Home-eNBs 72-2. In contrast, when each Home-eNB 72-2 communicates its individual information to the MME 73, the information is transmitted via the HeNBGW 74, but is simply passed through (penetrated through) the HeNBGW without being processed. As a result, each Home-eNB 72-2 and the MME 73 can communicate with each other as if they are directly connected to each other.

Figure 8:
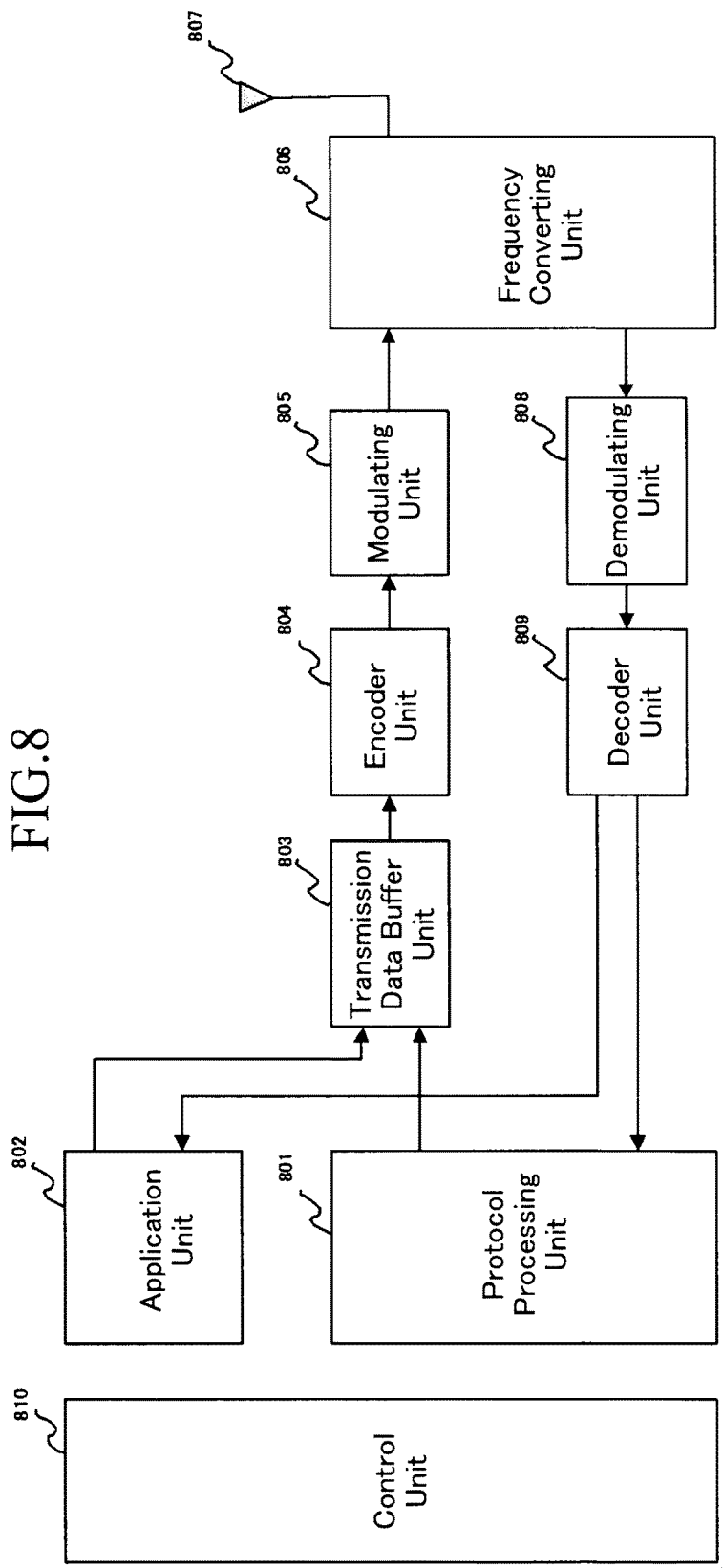
FIG. 8 is a block diagram showing the structure of a mobile terminal 311 in accordance with the present invention.

FIG. 8 is a block diagram showing the structure of a mobile terminal in accordance with the present invention (the terminal 71 shown in FIG. 7). A transmitting process performed by the mobile terminal shown in FIG. 8 will be explained. First, control data from a protocol processing unit 801 and user data from an application unit 802 are stored in a transmission data buffer unit 803. The data stored in the transmission data buffer unit 803 are delivered to an encoder unit 804, and are subjected to an encoding process including an error correction. There can exist data which are outputted directly from the transmission data buffer unit 803 to a modulating unit 805 without being subjected to the encoding process. A modulation process is performed on the data on which the encoding process has been performed by the encoder unit 804 by the modulating unit 805. After the modulated data are converted into a baseband signal, this baseband signal is outputted to a frequency converting unit 806 and is converted into a transmission signal having a radio transmit frequency. After that, the transmission signal is transmitted to a base station 312 via an antenna 807. The mobile terminal 311 also performs a receiving process as follows. A radio signal from the base station 312 is received by the antenna 807. The received signal having a radio receive frequency is converted into a baseband signal by the frequency converting unit 806, and a demodulation process is performed on the baseband signal by a demodulating unit 808. Data which are acquired through the demodulating process are delivered to a decoder unit 809, and are subjected to a decoding process including an error correction. Control data included in the decoded data are delivered to the protocol processing unit 801 while user data included in the decoded data are delivered to the application unit 802. The series of processes carried out by the mobile terminal are controlled by a control unit 810. Therefore, although not shown in the drawing, the control unit 810 is connected to each of the units (801 to 809).

Figure 9:
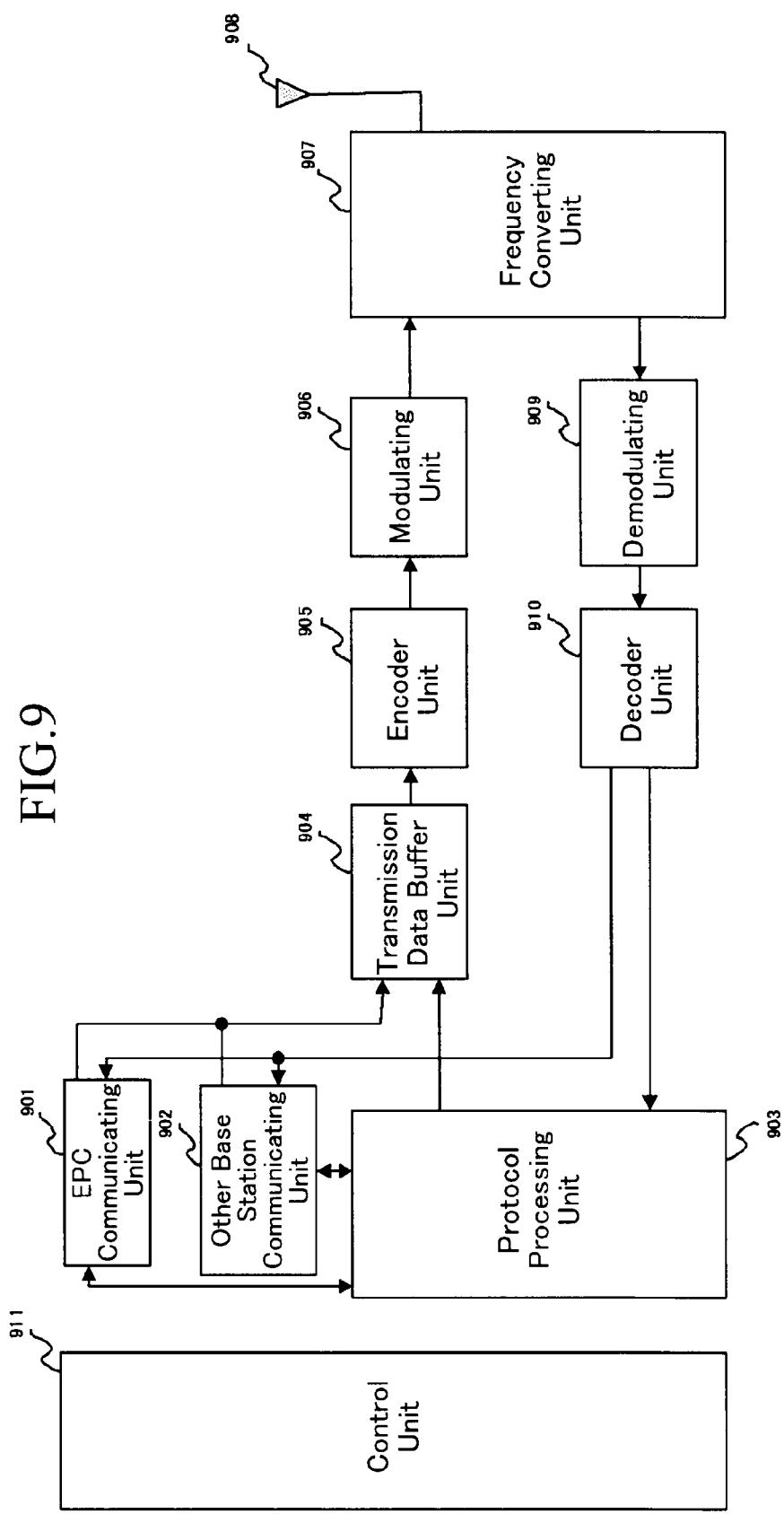
FIG. 9 is a block diagram showing the structure of a base station 312 in accordance with the present invention.

FIG. 9 is a block diagram showing the structure of a base station (a base station 72 shown in FIG. 7) in accordance with the present invention. A transmitting process carried out by the base station shown in FIG. 9 will be explained. An EPC communicating unit 901 transmits and receives data between the base station 72 and EPCs (an MME 73, an HeNBGW 74, etc.). An other base station communicating unit 902 transmits and receives data to and from another base station. Each of the EPC communicating unit 901 and the other base station communicating unit 902 carries out reception and transmission of information from and to a protocol processing unit 903. Control data from the protocol processing unit 903, and user data and control data from the EPC communicating unit 901 and the other base station communicating unit 902 are stored in a transmission data buffer unit 904. The data stored in the transmission data buffer unit 904 are delivered to an encoder unit 905, and are subjected to an encoding process including an error correction. There can exist data which are outputted directly from the transmission data buffer unit 904 to a modulating unit 906 without being subjected to the encoding process. The modulating unit 906 performs a modulation process on the encoded data. After the modulated data are converted into a baseband signal, the baseband signal is outputted to a frequency converting unit 907 and is converted into a transmission signal having a radio transmission frequency. After that, the transmission signal is transmitted from an antenna 908 to one or more mobile terminals 71. Each base station 72 also performs a receiving process as follows. A radio signal from one or more mobile terminals 311 is received by the antenna 908. The received signal having a radio receive frequency is converted into a baseband signal by the frequency converting unit 907, and a demodulation process is performed on the baseband signal by a demodulating unit 909. Data which are acquired through the demodulating process are delivered to a decoder unit 910, and are subjected to a decoding process including an error correction. Control data among the decoded data are delivered to the protocol processing unit 903 or the EPC communicating unit 901 and the other base station communicating unit 902, and user data among the decoded data are delivered to the EPC communicating unit 901 and the other base station communicating unit 902. The series of processes carried out by the base station 72 are controlled by a control unit 911. Therefore, although not shown in the drawing, the control unit 911 is connected to each of the units (901 to 910).

Figure 10:
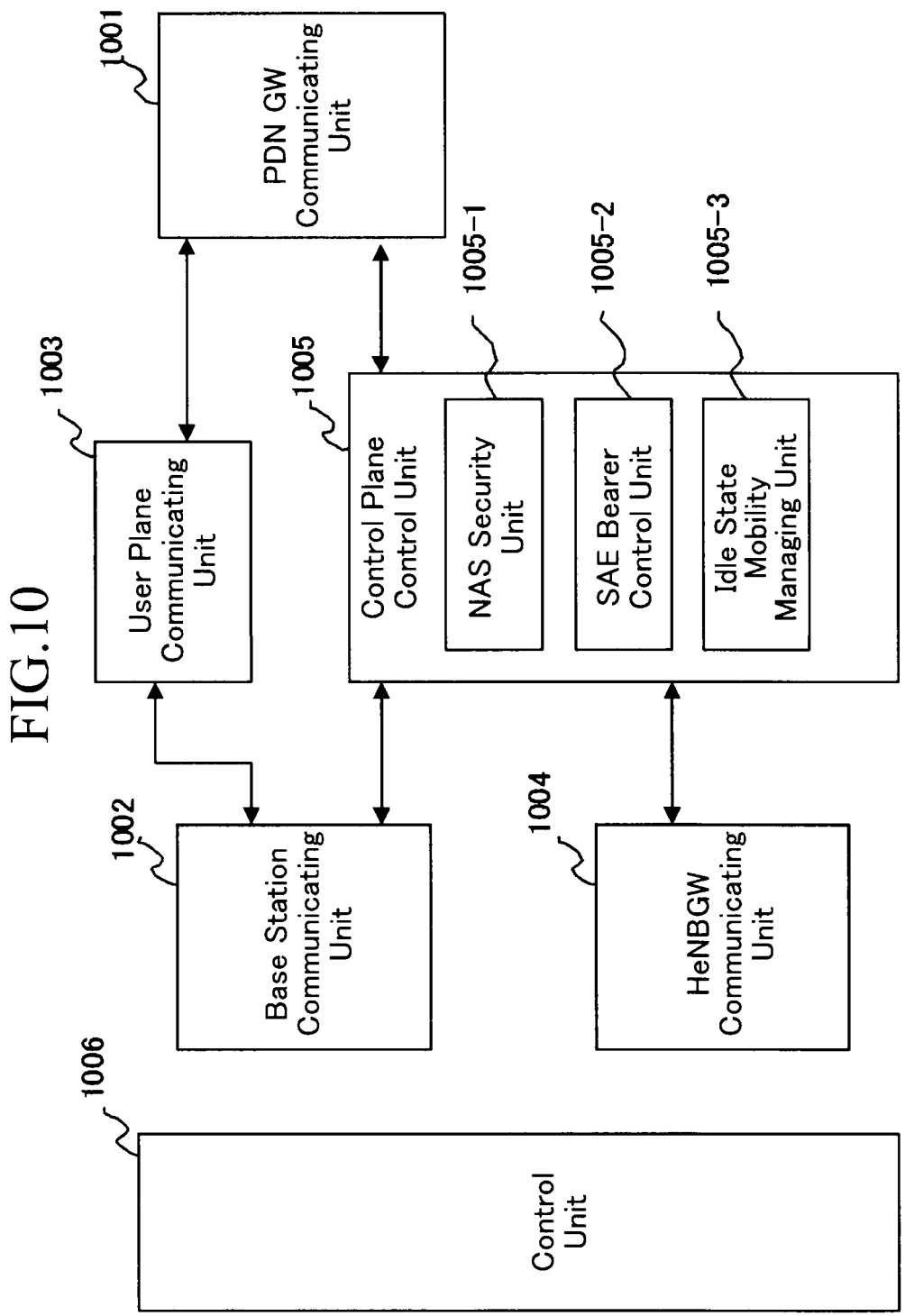
FIG. 10 is a block diagram showing the structure of an MME in accordance with the present invention.

FIG. 10 is a block diagram showing the structure of an MME (Mobility Management Entity) in accordance with the present invention. A PDN GW communicating unit 1001 carries out transmission and reception of data between the MME 73 and a PDN GW. A base station communicating unit 1002 carries out transmission and reception of data between the MME 73 and a base station 72 via an S1 interface. When data received from the PDN GW is user data, the user data is delivered from the PDN GW communicating unit 1001 to the base station communicating unit 1002 via a user plane processing unit 1003, and is then transmitted to one or more base stations 72. When data received from a base station 72 is user data, the user data is delivered from the base station communicating unit 1002 to the PDN GW communicating unit 1001 via the user plane processing unit 1003, and is then transmitted to the PDN GW.

When data received from the PDN GW is control data, the control data is delivered from the PDN GW communicating unit 1001 to a control plane control unit 1005. When data received from a base station 72 is control data, the control data is delivered from the base station communicating unit 1002 to the control plane control unit 1005. An HeNBGW communicating unit 1004 is disposed in the case in which an HeNBGW 74 exists, and transmits and receives data via an interface (IF) between the MME 73 and the HeNBGW 74 according to the information type of the data. Control data received from the HeNBGW communicating unit 1004 is delivered from the HeNBGW communicating unit 1004 to the control plane control unit 1005. The result of a process performed by the control plane control unit 1005 is transmitted to the PDN GW via the PDN GW communicating unit 1001. The result of the process performed by the control plane control unit 1005 is also transmitted, via the base station communicating unit 1002, to one or more base stations 72 via the S1 interface. The result of the process performed by the control plane control unit is further transmitted to one or more HeNBGWs 74 via the HeNBGW communicating unit 1004.

A NAS security unit 1005-1, an SAE bearer control unit 1005-2, and an idle state (Idle State) mobility managing unit 1005-3 are included in the control plane control unit 1005, and perform an entire process on a control plane. The NAS security unit 1005-1 carries out security work for a NAS (Non-Access Stratum) message, etc. The SAE bearer control section 1005-2 carries out management of a SAE (System Architecture Evolution) bearer, etc. The idle state mobility managing unit 1005-3 carries out mobility management of an idle state (an LTE-IDLE state, simply referred to as idle), generation and control of a paging signal at the time of an idle state, addition, deletion, and update of a tracking area (TA) of one or more mobile terminals 71 being served by the base station, a search for the tracking area, management of a tracking area list (TA List), etc. Each MME transmits a paging message to a cell belonging to the tracking area (tracking Area: TA) where UEs is registered to start the paging protocol. The management of the CSG of a Home-eNB 72-2 connected to the MME, the management of CSG-IDs, and the management of a white list can be carried out by the idle state mobility managing unit 1005-3. In the management of CSG-IDs, the management (addition, deletion, update, and search) of a relationship between mobile terminals corresponding to a CSG-ID and CSG cells is carried out. For example, a relationship between one or more mobile terminals which have been registered for user access to a certain CSG-ID has been made, and the CSG cells belonging to this CSG-ID can be managed. In the management of the white list, the management (addition, deletion, update, and search) of a relationship between a mobile terminal and a CSG-ID is carried out. For example, one or more CSG-IDs to which a mobile terminal has been registered for user access can be stored in the white list. Although these managements about CSG can be carried out by another unit included in the MME 73, a method of using tracking area codes (Tracking Area Codes) instead of CSG-IDs, which has been being debated in the 3GPP meeting, can be executed efficiently as long as the managements about CSG are carried out by the idle state mobility managing unit 1005-3. The series of processes carried out by the MME 73 are controlled by a control unit 1006. Therefore, although not shown in the drawing, the control unit 1006 is connected to each of the units (1001 to 1005).

Figure 11:
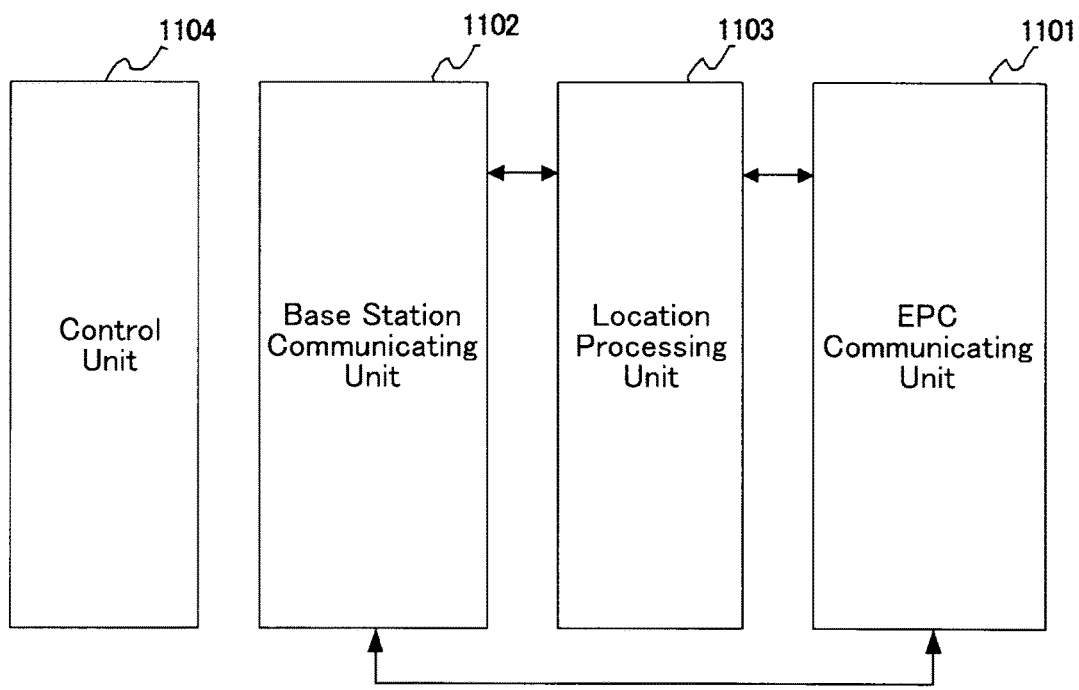
FIG. 11 is a block diagram showing the structure of an HeNBGW in accordance with the present invention.

FIG. 11 is a block diagram showing the structure of an HeNBGW in accordance with the present invention. An EPC communicating unit 1101 transmits and receives data between the HeNBGW 74 and an MME 73 via an S1_flex interface. A base station communicating unit 1102 transmits and receives data between the HeNBGW 74 and Home-eNBs 72-2 via S1 interfaces. A location processing unit 1103 carries out a process of transmitting information such as registration information, among the data from the MME 73 delivered thereto via the EPC communicating unit 1101, to the plurality of Home-eNBs. Data processed by the location processing unit 1103 is delivered to the base station communicating unit 1102, and is then transmitted to one or more Home-eNBs 72-2 via S interfaces. Data which does not have to be processed by the location processing unit 1103, but is simply passed through (penetrated through) the location processing unit is delivered from the EPC communicating unit 1101 to the base station communicating unit 1102, and is then transmitted to one or more Home-eNBs 72-2 via S1 interfaces. The series of processes carried out by the HeN-BGW 74 is controlled by a control unit 1104. Therefore, although not shown in the drawing, the control unit 1104 is connected to each of the units (1101 to 1103).

Figure 12:
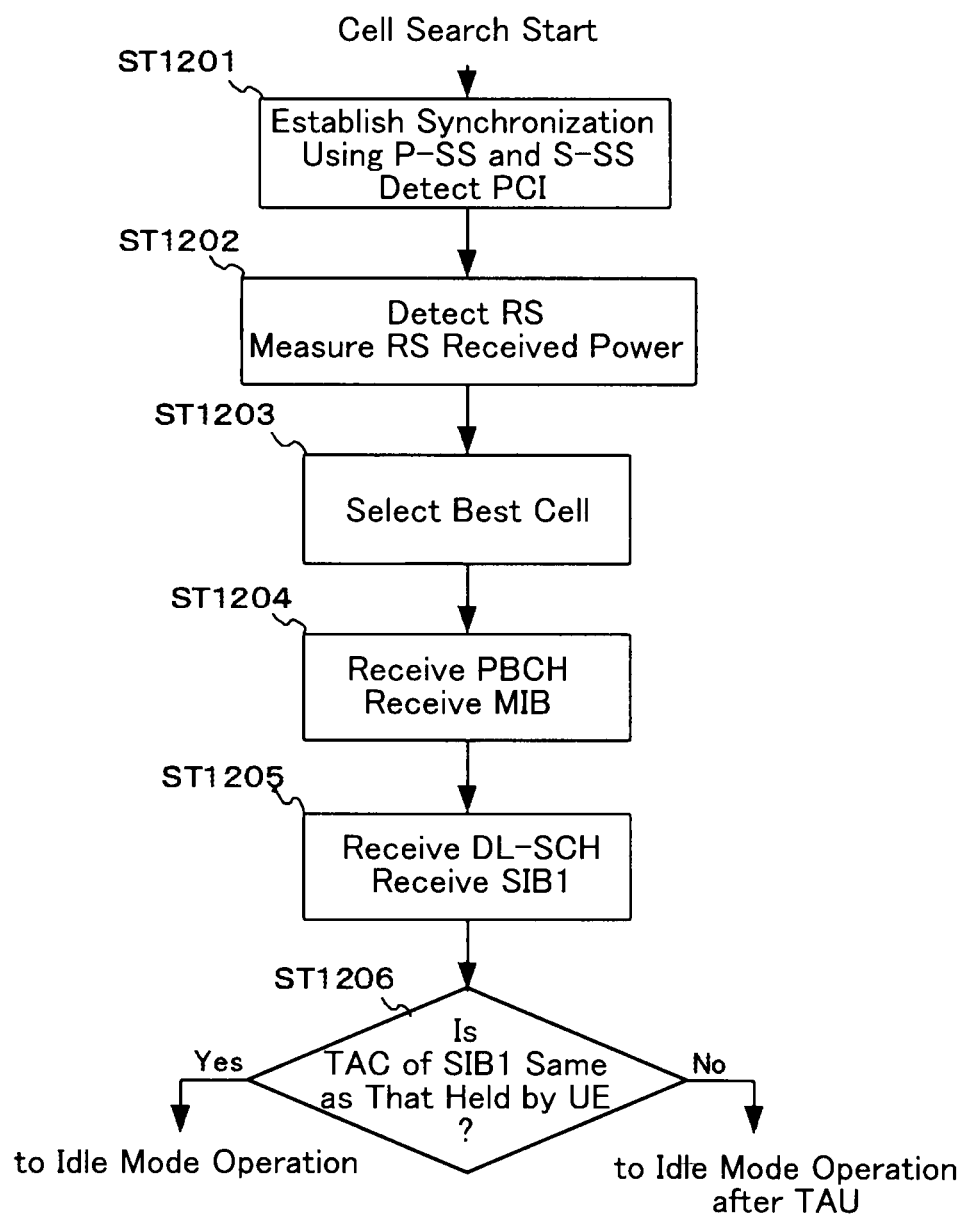
FIG. 12 is a flow chart showing an outline of a cell search made by a mobile terminal (UE) in a communication system which complies with an LTE method.

Next, an example of a typical cell search method for use in the mobile communication system will be shown. FIG. 12 is a flow chart showing an outline of processes from a cell search made by a mobile terminal (UE) to an idle mode operation of the mobile terminal in the communication system which complies with the LTE method. When starting a cell search, the mobile terminal, in step ST1201, establishes time synchronization among slots and among frames by using a first synchronization signal (P-SS) and a second synchronization signal (S-SS) which are transmitted thereto from a neighboring base station. A synchronization code having a one-to-one correspondence with a PCI (Physical Cell Identity) which is assigned to each cell is assigned to both the synchronization signals (SS) P-SS and S-SS. Currently, 504 different PCIs have been examined, and therefore the synchronization is established by using these 504 different PCIs and the PCI of a cell with which the synchronization is established is detected (specified). Next, as to the cell with which the synchronization is established, the reference signal RS (Reference Signal) transmitted from the base station to each cell is detected in step ST1202 and the received power is measured. A code which is in a one-to-one correspondence with the PCI is used as the reference signal RS, and the reference signal RS can be separated from those of other cells by calculating a correlation using the code. By deriving the code for RS of the cell from the PCI specified in ST1201, the reference signal RS can be detected and the RS received power can be measured. Next, in ST1203, from among one or more cells detected until ST1202, the cell having the most reception quality of RS (e.g., the cell providing the highest received power of RS) (best cell) is selected. Next, the mobile terminal receives a PBCH of the best cell in ST1204, and acquires a BCCH which is broadcast information. An MIB (Master Information Block) including cell configuration information is carried on the BCCH on the PBCH. The MIB information includes a DL (downlink) system bandwidth, the number of transmission antennas, an SFN (System Frame Number), for example.

The mobile terminal then, in ST1205, receives a DL-SCH of the cell on the basis of the cell configuration information included in the MIB to acquire an SIB (System Information Block) 1 included in the broadcast information BCCH. The SIB 1 includes information about access to the cell, information about a cell selection, and scheduling information about other SIBs (SIBk; k is an integer satisfying k>=2). A TAC (Tracking Area Code) is also included in the SIB 1. The mobile terminal then, in ST1206, compares the TAC received in ST1205 with the TAC which the mobile terminal has already held. When the result of the comparison shows that they are the same as each other, the mobile terminal enters the idle mode operation for the cell. In contrast, when the result of the comparison shows that they differ from each other, the mobile terminal issues a request to change the TA in order to carry out TAU (Tracking Area Update) to a core network (Core Network, EPC) (including an MME etc.) via the cell. The core network updates the TA on the basis of an identification number of the mobile terminal (the UE-ID of this mobile terminal or the like), as well as the TAU request signal, which are sent from the mobile terminal. After updating the TA, the core network transmits a TAU receipt signal (a TAU accept) to the mobile terminal. The mobile terminal rewrites (updates) the TAC (or the TAC list) held thereby by using the TAC of the cell. After that, the mobile terminal starts the idle mode operation for the cell.

In an LTE or UMTS (Universal Mobile Telecommunication System), the introduction of a CSG (Closed Subscriber Group) cell has been studied. As mentioned above, a CSG cell is accessible only by one or more mobile terminals which are registered with the CSG cell. The CSG cell and the one or more registered mobile terminals construct one CSG. A specific identification number called a CSG-ID is given to each CSG which is constructed in this way. There can exist a plurality of CSG cells in each CSG. When a mobile terminal is registered with one CSG cell, the mobile terminal can access any other CSG cell in the CSG to which the CSG cell belongs. Furthermore, a Home-eNB for use in an LTE or a Home-NB for use in a UMTS can be used as a CSG cell. Each mobile terminal registered with a CSG cell has a white list. Concretely, the white list is stored in an SIM/USIM of each mobile terminal. CSG information about the CSG cell with which each mobile terminal is registered is written in the white list. Concretely, a CSG-ID, a TAI (Tracking Area Identity), a TAC, etc. can be considered as the CSG information. Either one of the CSG-ID and the TAC is enough as long as the CSG-ID is brought into correspondence with the TAC. As an alternative, only a GCI (Global Cell Identity) is enough as long as the CSG-ID, the TAC, and the GCI are brought into correspondence with one another. As can be seen from the above explanation, a mobile terminal which does not have a white list (in the present invention, includes a mobile terminal whose white list is empty) cannot access any CSG cell, but can access only a non-CSG cell. In contrast, a mobile terminal having a white list can access not only a CSG cell having a CSG-ID with which the mobile terminal is registered, but also a non-CSG cell.

A split of all the PCIs (Physical Cell Identities) into PCIs for CSG cells and PCIs for non-CSG cells (referred to as a PCI split) has been debated in the 3GPP (nonpatent reference 5). It has been further debated that the PIC information about PCI split is broadcast, in system information, from a base station to mobile terminals being served by the base station. A fundamental operation of a mobile terminal using the PCI split will be disclosed hereafter. A mobile terminal which does not have the PIC information about PCI split needs to make a cell search by using all the PCIs (e.g., by using all the 504 codes). In contrast, a mobile terminal which has the PIC information about PCI split can make a cell search by using this PIC information about PCI split. Three different modes to access each of an HeNB and an HNB are disclosed by nonpatent reference 6. They are an open access mode (Open access mode), a closed access mode (Closed access mode), and a hybrid access mode (Hybrid access mode). Each of the modes has the following features. In the open access mode, each of an HeNB and an HNB is operated as a normal cell for operators. In the closed access mode, each of an HeNB and an HNB is operated as a CSG cell. This CSG cell can be accessed by only CSG members. In the hybrid access mode, non-CSG members are also allowed to access the CSG cell simultaneously. A real example of the hybrid access mode will be shown hereafter. Hereafter, it is assumed that an HeNB (which can be replaced by an HNB) is arranged in order to improve the coverage in a shopping mall. It is also assumed that this HeNB is made to operate in the hybrid access mode. It is further assumed that each of the owner and the employees of the shopping mall can receive a charging preferential treatment when receiving a service via the HeNB, as long as they are registered with the HeNB. This using method is based on a method of using the closed access mode. In contrast, any customer who is not registered with the HeNB can also receive a service via the HeNB. This using method is based on a method of using the open access mode. As mentioned above, the hybrid access mode is the one in which the cell operates in the closed access mode for registered users, whereas the cell simultaneously operates in the open access mode for unregistered users. Therefore, the hybrid access mode has properties different from those of the open access mode and those of the closed access mode. Signaling about a PCI split is described in nonpatent reference 7. However, there is no description about the hybrid access mode of each of an HeNB and an HNB.

A problem to be solved by this Embodiment 1 will be mentioned hereafter. When an HeNB (which can be replaced by an HNB) is made to operate in the hybrid access mode, the HeNB is a CSG cell even if it operates in the hybrid access mode. It can be therefore considered that a PCI included in the PCI range for CSG cells in the conventional PCI split is assigned to the HeNB which is made to operate in the hybrid access mode. A problem which arises in this case is that after receiving the PIC information about PCI split, a mobile terminal which does not have a white list (a mobile terminal which is not registered with any CSG cell) makes a cell search by using a PCI included in the PCI range for non-CSG cells, and excludes an HeNB to which a PCI included in the PCI range for CSG cells is assigned and which is made to operate in the hybrid access mode from cells which are the target for the cell search operation. The mobile terminal excludes the HeNB from the target to be searched in spite of the fact that the HeNB is made to operate in the hybrid access mode in which even a non-CSG member is allowed to access the HeNB. A problem is therefore that any mobile terminal which does not have a white list and which exists in the coverage of an HeNB which is made to operate in the hybrid access mode cannot make a cell selection of this HeNB. This means that such a mobile terminal becomes unable to carry out communications at a location where it can carry out communications due to a malfunction in the PCI assignment. This problem is a large problem for the mobile communication system.

In contrast with this, assuming that an HeNB which is made to operate in the hybrid access mode is not excluded from the target to be searched in the above-mentioned case, any mobile terminal which does not have a white list performs a cell searching operation on all the cells even after receiving the PIC information about PCI split. A problem is therefore that the control delay of the system increases, and the power consumption of each mobile terminal increases.

There is a demand to install many CSG (Closed Subscriber Group cell) cells in a facility, such as an apartment, a school, or a company building. For example, a CSG cell is installed in each room of an apartment, in each classroom of a school, and in each section room of a company building. A using method of enabling only users who are registered with each CSG cell to use this CSG cell is required. Furthermore, it is assumed that each CSG cell has a portable size and a portable weight, and it is also required that the installation and withdrawal of these CSG cells can be carried out frequently and with flexibility. Taking these requirements into consideration, radio waves from many CSG cells can be simultaneously transmitted to a certain point. More specifically, a situation in which a mobile terminal is located at a position which radio waves from many CSG cells reaches the mobile terminal can occur in a facility, such as a apartment, a school, or a company building.

Furthermore, a CSG cell is installed at a location where radio waves from non-CSG cells do not reach, and it is required that communications with mobile terminals are enabled via the CSG cell. Recently, there are many cases in which radio waves from non-CSG cells do not reach rooms of an apartment, for example. In such a case, a CSG cell is installed in each room of the apartment, the CSG cell installed in each room constructs a CSG and a CSG-ID is assigned to this CSG. For example, there can be a case in which a mobile terminal own by a resident in each room is registered for user access to the CSG cell of the room. In this situation, the mobile terminal enters a state in which it exists at a location where radio waves from non-CSG cells do not reach the mobile terminal, but radio waves from many CSG cells reach the mobile terminal. Furthermore, in such a case, depending upon a radio wave propagation environment, there frequently occurs an event in which the radio wave from the CSG cell to which the mobile terminal has been registered for user access does not reach the mobile terminal, or an event in which the radio wave from the CSG cell to which the mobile terminal has been registered for user access reaches the mobile terminal, but its received power is lower than those of other CSG cells.

Assuming that a mobile terminal which does not have a white list makes a search for an accessible cell through all the cells without excluding an HeNB which is made to operate in the hybrid access mode from the target to be searched even after receiving the PIC information about PCI split, there occurs a situation in which the mobile terminal repeatedly makes a search through many CSG cells which the mobile terminal cannot access (i.e., CSG cells to which the mobile terminal has not been registered for user access), and makes a cell selection of such a CSG cell for a long time if the mobile terminal is located at a position where radio waves from many CSG cells reach the mobile terminal. In such a case, there causes a control delay in the system, a reduction in the use efficiency of radio resources, and a reduction in the signaling efficiency. Furthermore, there arises a problem that the power consumption of such a mobile terminal which repeatedly makes a cell search becomes large. These problems are significant when a future planned arrangement of CSG cells as mentioned above is assumed to be made.

According to this embodiment, the above-mentioned problem is solved by using the following method. In the mobile communication system, by using a PCI split, the PCI range for CSG cells and the PCI range for non-CSG cells are made to overlap each other (they can overlap each other completely or partially). A conceptual diagram is shown in FIG. 13. A conceptual diagram of the PCI split which has been being debated in the 3GPP is shown in FIG. 13(a). A range A denotes all the PCIs. For example, there are 504 different PCIs (504 different codes). For example, the PCI range for CSG cells is denoted by a range B. For example, the PCI range for non-CSG cells is denoted by a range C. A conceptual diagram of the PCI split which is disclosed by this embodiment is shown in FIG. 13(b). A range A denotes all the PCIs. For example, the PCI range for CSG cells is denoted by a range B. For example, the PCI range for non-CSG cells is denoted by a range C. A range in which the PCI range for CSG cells overlaps the PCI range for non-CSG cells is denoted by a range D. In this embodiment, the problem is solved by reserving a PCI range which can be assigned to an HeNB which is made to operate in the hybrid access mode apart from the PCI range for CSG cells and the PCI range for non-CSG cells, against the case of the conventional PCI split.

Or to put the concept shown in FIG. 13(b) another way: the cell identification information (PCI) is classified into one of the following three types of PCIs: a PCI (first category) included in the range B which is assigned to a CSG cell (a specified subscriber cell), a PCI (second category) included in the range C which is assigned to non-CSG cells (unspecified user cells), and a PCI (third category) included in the range D which can be assigned to an HeNB which is made to operate in the hybrid access mode. A PCI included in the range D is assigned to a CSG cell operating in the open mode. In accordance with this embodiment, to an HeNB (which can be replaced by an HNB) which is placed in the hybrid access mode, i.e., in an operating state in which the cell allows access thereto from any mobile terminal, a PCI included in the PCI range (the range D) in which the above-mentioned PCI range for CSG cells and the above-mentioned PCI range for non-CSG cells overlap each other is assigned. Explaining with reference to FIG. 13, a PCI included in the range D is assigned as a PCI for an HeNB which is made to operate in the hybrid access mode.

Furthermore, a PCI included in the PCI range (the range D) in which the PCI range for CSG cells and the PCI range for non-CSG cells overlap each other can be assigned to a CSG cell or a non-CSG cell other than an HeNB which is made to operate in the hybrid access mode. More specifically, the range D which is the PCI range where the PCI range for CSG cells and the PCI range for non-CSG cells overlap each other can be defined as a range to which both a CSG cell (regardless of whether or not this CSG cell operates in the access mode) and a non-CSG cell can be assigned. Or to put the concept shown in FIG. 13(b) another way: the cell identification information (PCI) is classified into one of the following three types of PCIs: a PCI (first category) included in the range B which is assigned to a CSG cell (a specified subscriber cell), a PCI (second category) included in the range C which is assigned to non-CSG cells (unspecified user cells), and a PCI (third category) included in the range D which can be assigned to any one of a CSG cell and a non-CSG cell. As a result, there can be provided an advantage of preventing the introduction of an HeNB which is made to operate in the hybrid access mode from resulting in decrease in the region to which PCIs for CSG cells are assigned and decrease in the region to which PCIs for non-CSG cells are assigned.

Next, an example of the operation of a mobile terminal in accordance with this embodiment will be explained with reference to FIG. 14. The mobile terminal, in step ST1401, receives PIC information about PCI split, which is disclosed in this embodiment, from a base station (a macro cell, an HeNB, an HNB, a CSG cell, a non-CSG cell, or the like) to determine whether or not the mobile terminal has the PIC information about PCI split. When not having the PIC information about PCI split, the mobile terminal makes a transition to step ST1402. In contrast, when having the PIC information about PCI split, the mobile terminal makes a transition to step ST1404. The mobile terminal, in step ST1402, makes a cell search by using all the PCI ranges. The mobile terminal, in step ST1403, determines whether it has made a cell selection. When determining that the mobile terminal has made a cell selection, the mobile terminal ends the processing. When determining that the mobile terminal has not made a cell selection yet, the mobile terminal returns to step ST1401.

An example of the operation of making a cell selection carried out in step ST1403 will be explained in detail with reference to FIG. 15. The mobile terminal, in step ST1501, selects a cell having the highest reception quality of the reference signal (Reference signal: RS) (e.g., a cell providing the highest received power to receive the RS) as the best cell. The mobile terminal, in step ST1502, determines whether the best cell is a CSG cell or a non-CSG cell. The mobile terminal can carry out this determination by using a CSG indicator mapped onto the system information which is broadcast thereto from the base station. When the best cell is a non-CSG cell, the mobile terminal makes a transition to step ST1503. In contrast, when the best cell is a CSG cell, the mobile terminal makes a transition to step ST1508. The mobile terminal, in step ST1503, determines whether or not to give a high priority to a CSG cell to make a cell selection in the current cell search. When not giving a high priority to a CSG cell to make a cell selection, the mobile terminal makes a transition to step ST1504. In contrast, when giving a high priority to a CSG cell to make a cell selection, the mobile terminal makes a transition to step ST1505. The mobile terminal, in step ST1504, selects the cell. After that, the mobile terminal ends the processing. The mobile terminal, in step ST1505, excludes the cell from the target for the cell search, and then makes a transition to step ST1506. The mobile terminal, in step ST1506, determines whether or not to continue the search. In a concrete example of the determination of whether or not to continue the search, when there is another cell which is the target for the cell search, the mobile terminal determines that it continues the search, whereas when there is no any other cell which is the target for the cell search, the mobile terminal determines that it does not continue the search. Furthermore, when an allowed time period has not elapsed before the mobile terminal completes the cell selection since the mobile terminal started the cell search, the mobile terminal determines that it continues the search, whereas when the allowed time period has elapsed, the mobile terminal determines that it does not continue the search. When continuing the search, the mobile terminal makes a transition to step ST1507. In contrast, when not continuing the search, the mobile terminal ends the processing. The mobile terminal, in step ST1507, receives the PIC information about PCI split, which is disclosed in this embodiment, from a base station (a macro cell, an HeNB, an HNB, a CSG cell, a non-CSG cell, or the like), and then determines whether the mobile terminal has the PIC information about PCI split. When not having the PIC information about PCI split, the mobile terminal returns to step ST1501. In contrast, when having the PIC information about PCI split, the mobile terminal makes a transition to step ST1404 of FIG. 14.

The mobile terminal, in step ST1508, determines whether or not it has a CSG-ID in the white list. More specifically, the mobile terminal determines whether or not it has been registered to a CSG cell. When the mobile terminal has a CSG-ID, or when the mobile terminal has been registered with a CSG cell, the mobile terminal makes a transition to step ST1509. In contrast, when the mobile terminal does not have a CSG-ID, or when the mobile terminal has not been registered with a CSG cell, the mobile terminal makes a transition to step ST1510. The mobile terminal, in step ST1509, determines whether it has the CSG-ID of the cell in the white list. More specifically, the mobile terminal determines whether or not it has been registered with the CSG-ID of the cell. When the mobile terminal has the CSG-ID or when the mobile terminal has been registered with the CSG-ID, the mobile terminal makes a transition to step ST1504. In contrast, when the mobile terminal does not have the CSG-ID or when the mobile terminal has not been registered with the CSG-ID, the mobile terminal makes a transition to step ST1510. The mobile terminal, in step ST1510, excludes the cell from the target for the cell search, and makes a transition to step ST1511. The mobile terminal, in step ST1511, determines whether or not to continue the search. In a concrete example of the determination of whether or not to continue the search, when there is another cell which is the target for the cell search, the mobile terminal determines that it continues the search, whereas when there is no any other cell which is the target for the cell search, the mobile terminal determines that it does not continue the search. Furthermore, when an allowed time period has not elapsed before the mobile terminal completes the cell selection since the mobile terminal started the cell search, the mobile terminal determines that it continues the search, whereas when the allowed time period has elapsed, the mobile terminal determines that it does not continue the search. When continuing the search, the mobile terminal makes a transition to step ST1512. In contrast, when not continuing the search, the mobile terminal ends the processing. The mobile terminal, in step ST1512, receives the PIC information about PCI split, which is disclosed in this embodiment, from a base station (a macro cell, an HeNB, an HNB, a CSG cell, a non-CSG cell, or the like), and then determines whether the mobile terminal has the PIC information about PCI split. When not having the PIC information about PCI split, the mobile terminal returns to step ST1501. In contrast, when having the PIC information about PCI split, the mobile terminal makes a transition to step ST1404 of FIG. 14.

The mobile terminal, in step ST1404, determines whether or not it has a CSG-ID in the white list. More specifically, the mobile terminal determines whether or not it has been registered to a CSG cell. When the mobile terminal has a CSG-ID, or when the mobile terminal has been registered with a CSG cell, the mobile terminal makes a transition to step ST1405. In contrast, when the mobile terminal does not have a CSG-ID or when the mobile terminal has not been registered with a CSG-ID, the mobile terminal makes a transition to step ST1409. The mobile terminal, in step ST1405, makes a cell search using a PCI which the mobile terminal determines belongs to the PCI range for CSG cells according to the PIC information about PCI split disclosed in this embodiment, and then makes a transition to step ST1406. The mobile terminal, in step ST1406, determines whether it has made a cell selection. When determining that the mobile terminal has made a cell selection, the mobile terminal ends the processing. In contrast, when determining that the mobile terminal has not made a cell selection yet, the mobile terminal returns to step ST1407. An example of the operation of making a cell selection carried out in step ST1406 will be explained in detail with reference to FIG. 15. The cell selection operation of the mobile terminal in step ST1406 differs from that in step ST1403 in that the mobile terminal has the PIC information about PCI split, makes a cell search by using a PCI belonging to the PCI range for CSG cells, and has a white list. Therefore, after performing the process of step ST1501 in FIG. 15, the mobile terminal determines YES in step ST1502, then determines YES in step ST1508, further carries out the determination of step ST1509, and then advances to the process of step ST1504 or step ST1510. After performing the process of step ST1510, the mobile terminal carries out the determination of step ST1511 and then advances to step ST1512 or ends the processing. The mobile terminal, in step ST1512, determines YES and then makes a transition to step ST1405 of FIG. 14.

The mobile terminal, in step ST1407, determines that any CSG cell to which the mobile terminal has been registered does not exist in the neighborhood, or any HeNB to which the mobile terminal has been registered and which is made to operate in the hybrid access mode does not exist in the neighborhood, makes a cell search by using a PCI which the mobile terminal determines belongs to the PCI range for non-CSG cells according to the PIC information about PCI split disclosed in this embodiment so as to select a non-CSG cell, and then makes a transition to step ST1408. The mobile terminal, in step ST1408, determines whether it has made a cell selection. When determining that the mobile terminal has made a cell selection, the mobile terminal ends the processing. In contrast, when determining that the mobile terminal has not made a cell selection yet, the mobile terminal returns to step ST1405. An example of the operation of making a cell selection carried out in step ST1408 will be explained in detail with reference to FIG. 15. The cell selection operation of the mobile terminal in step ST1408 differs from that in step ST1403 in that the mobile terminal has the PIC information about PCI split, makes a cell search by using a PCI belonging to the PCI range for non-CSG cells, and does not give a high priority to a CSG cell in the current cell search. Therefore, after performing the process of step ST1501 in FIG. 15, the mobile terminal determines NO in step ST1502, then determines NO in step ST1503, and performs the process of step ST1504.

The mobile terminal, in step ST1409, makes a cell search by using a PCI which the mobile terminal determines belongs to the PCI range for non-CSG cells according to the PIC information about PCI split disclosed in this embodiment, and then makes a transition to step ST1410. The mobile terminal, in step ST1410, determines whether it has made a cell selection. When determining that the mobile terminal has made a cell selection, the mobile terminal ends the processing. In contrast, when determining that the mobile terminal has not made a cell selection yet, the mobile terminal returns to step ST1409. An example of the operation of making a cell selection carried out in step ST1410 will be explained in detail with reference to FIG. 15. The cell selection operation of the mobile terminal in step ST1410 differs from that in step ST1403 in that the mobile terminal has the PIC information about PCI split, makes a cell search by using a PCI belonging to the PCI range for non-CSG cells, and does not give a high priority to a CSG cell in the current cell search. Therefore, after performing the process of step ST1501 in FIG. 15, the mobile terminal determines NO in step ST1502, then determines NO in step ST1503, and performs the process of step ST1504.

Next, an example of a method of sending the PIC information about PCI split from the network to a mobile terminal will be explained. Some methods about PIC information about PCI split are described in nonpatent reference 7. However, nonpatent reference 7 does not take into consideration the hybrid access mode. Next, an example of sending of the PIC information about PCI split from the network to a mobile terminal in accordance with this embodiment will be explained. In accordance with this embodiment, the PCI range for CSG cells is made to overlap the PCI range for non-CSG cells through a PCI split. The method of sending the PIC information about PCI split in accordance with this embodiment will be disclosed hereafter. The PCI range for CSG cells and the PCI range for non-CSG cells are informed independently (separately). Because it is necessary to define the range in which they overlap each other in the mobile communication system, the notification of only one of the two PCI ranges (i.e., the PCI range for CSG cells or the PCI range for non-CSG cells) is not adequate. The notification of the PCI range for CSG cells and the PCI range for non-CSG cells independently is not disclosed by nonpatent reference 7. This is because nonpatent reference 7 does not takes into consideration an overlap between the PCI range for CSG cells and the PCI range for non-CSG cells. Furthermore, when sending the two pieces of PIC information about PCI split, the network informs that one of them is the PCI range for CSG cells (an indicator can be used instead), and also informs that the other PIC information about PCI split is the PCI range for non-CSG cells (an indicator can be used instead) (regardless of whether they can be transmitted simultaneously or non-simultaneously). Furthermore, the network can send either one of them. For example, the network can only inform that the first PIC information about PCI split is the PCI range for CSG cells. This is because what is necessary is just to cause the mobile terminal to determine implicitly that the other PIC information about PCI split is the PCI range for non-CSG cells. Furthermore, the network can determine statically the order in which it sends the PCI ranges. In this case, the same advantage can be provided. For example, the network sends the PCI range for CSG cells first, and then sends the PCI range for non-CSG cells. As a result, as compared with the case in which the network informs the mobile terminal that the first PIC information about PCI split is the PCI range for CSG cells, and also informs the mobile terminal that the second PIC information about PCI split is the PCI range for non-CSG cells, the network can reduce the amount of information transmitted therefrom to the mobile terminal, and there can be provided an advantage of making effective use of the radio resources.

Concrete examples of the pieces of PIC information about PCI split sent from a base station to a mobile terminal will be described below. The base station informs a start code and an end code for CSG cells and a start code and an end code for non-CSG cells to the mobile terminal. As an alternative, the base station statically determines to assign a first half to CSG cells, and statically determines the start code (e.g., 0) and statically determines the end code for non-CSG cells (e.g., 503). In this case, the base station informs the end code for CSG cells and the start code for non-CSG cells to the mobile terminal. Even when determining to assign the first half to non-CSG cells, the base station can similarly make a notification. As an alternative, the base station can inform the start code for CSG cells and the number of PCIs in the range for CSG cells, the start code for non-CSG cells and the number of PCIs in the range for non-CSG cells to the mobile terminal. As an alternative, the base station can statically determine to assign the first half to CSG cells, and statically determine the start code (e.g., 0) and statically determine the end code for non-CSG cells (e.g., 503). In this case, the base station informs the number of PCIs in the range for CSG cells and the number of PCIs in the range for non-CSG cells to the mobile terminal. Even when determining to assign the first half to non-CSG cells, the base station can similarly make a notification.

This embodiment can provide the following advantages. A mobile terminal which does not have a white list becomes able to include a non-CSG cell and an HeNB which is made to operate in the hybrid access mode into the target to be searched by making a search by using a PCI belonging to the PCI range for non-CSG cells, More specifically, without having to make a search by using a PCI belonging to the PCI range for CSG cells, a mobile terminal which does not have a white list becomes able to include an HeNB which is made to operate in the hybrid access mode into the target to be searched. In accordance with a conventional technology, in order to include an HeNB which is made to operate in the hybrid access mode into the target to be searched, a mobile terminal which does not have a white list has to include all the PCI ranges into the target to be searched. In contrast, in accordance with this embodiment, when detecting a PCI (step ST1201 of FIG. 12), such a mobile terminal can perform a cell searching operation on cells except CSG cells which the mobile terminal cannot access because the mobile terminal has not been registered with the CSG cells. In contrast, in accordance with the conventional technology, each mobile terminal cannot know whether a cell is a non-CSG cell or a CSG cell unless it receives SIB1 which is system information. Furthermore, each mobile terminal cannot know whether a cell is made to operate in the hybrid access mode unless it receives SIB1 which is system information. Therefore, each mobile terminal cannot make a cell search while excluding CSG cells and so on from the target to be searched, and cannot make a cell selection of an HeNB which is made to operate in the hybrid mode until receiving the system information (SIB1) (step ST1205 of FIG. 12).

Thus, the use of this embodiment can provide an advantage of being able to perform the search operation at a high speed. This can provide another advantage of preventing a control delay from occurring in the mobile communication system. This embodiment can provide a further advantage of reducing the power consumption of each mobile terminal. Furthermore, focusing attention on the operation of each mobile terminal in accordance with this embodiment, a mobile terminal which has a white list has only to make a cell search by using a PCI belonging to the PCI range for CSG cells, while a mobile terminal which does not have a white list has only to make a cell search by using a PCI belonging to the PCI range for non-CSG cells. Therefore, the introduction of an HeNB which is made to operate in the hybrid access mode can eliminate the necessity to change the operation of each mobile terminal. As a result, there can be provided an advantage of preventing increase in the complexity of the mobile communication system.

Embodiment 2

This embodiment discloses another solution to the same problem as that shown in Embodiment 1. This embodiment solves the problem by reserving, as a PCI range which can be assigned to an HeNB which is made to operate in a hybrid access mode, a range apart from a PCI range for CSG cells and a PCI range for non-CSG cells, against the case of using the conventional PCI split. The PCI range of a mobile communication system is split into three portions. By splitting the PCI range into three portions, a range apart from the PCI range for CSG cells and the PCI range for non-CSG cells can be disposed. In the mobile communication system, a PCI range for an HeNB which is made to operate in the hybrid access mode is newly disposed. In the mobile communication system, the PCI range for an HeNB which is made to operate in the hybrid access mode is disposed separately from the PCI range for CSG cells and the PCI range for non-CSG cells through a PCI split. A conceptual diagram is shown in FIG. 16. A conceptual diagram of the PCI split which has been being debated in the 3GPP is shown in FIG. 16(a). A range A denotes all the PCIs. For example, there are 504 different PCIs (504 different codes). For example, the PCI range for CSG cells is denoted by a range B. For example, the PCI range for non-CSG cells is denoted by a range C. A conceptual diagram of the PCI split which is disclosed by this embodiment is shown in FIG. 16(b). A range A denotes all the PCIs. For example, the PCI range for CSG cells is denoted by a range B. For example, the PCI range for non-CSG cells is denoted by a range C. The PCI range for an HeNB which is made to operate in the hybrid access mode is denoted by a range D.

Figure 17:
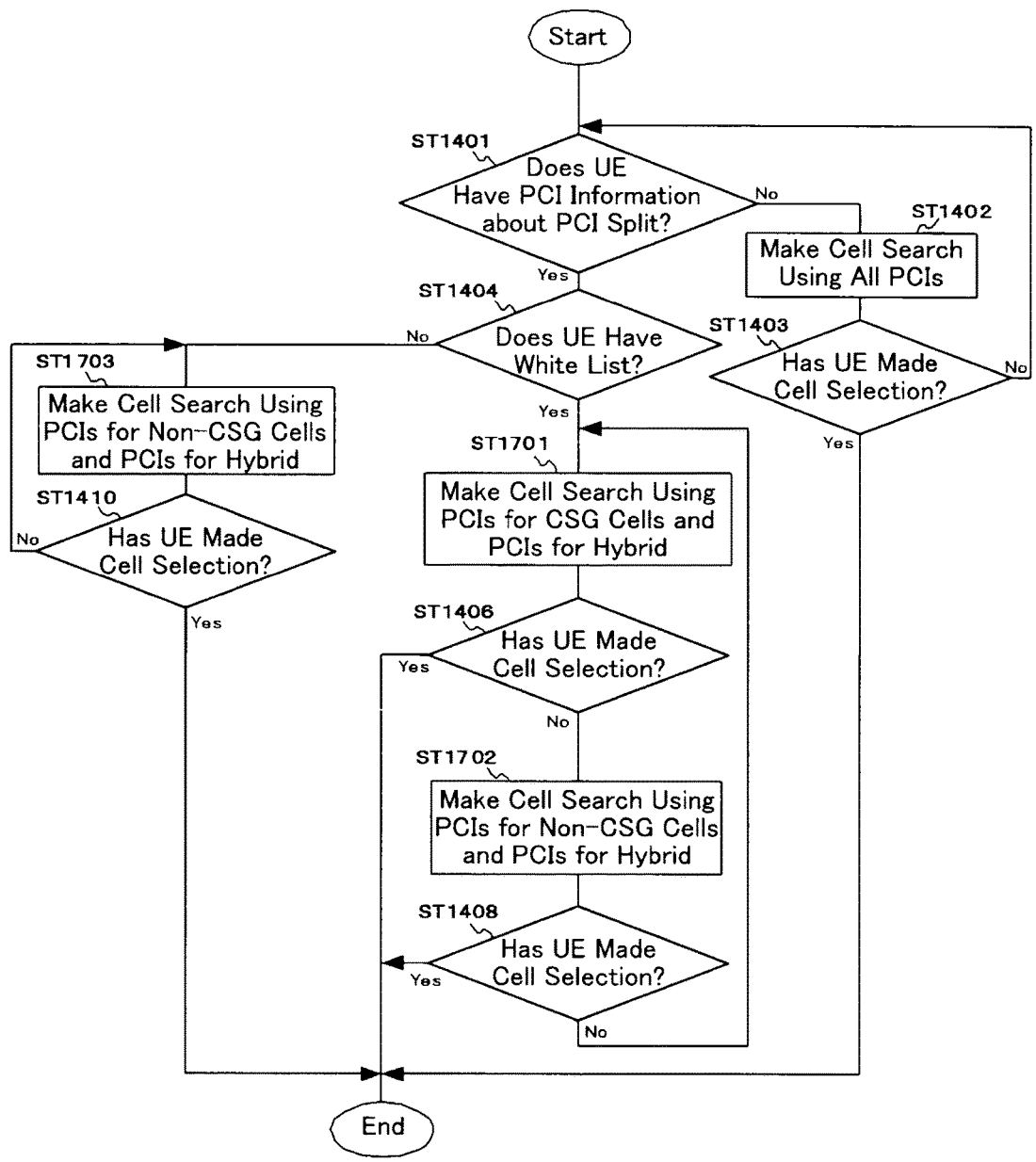
FIG. 17 is a flowchart showing a process carried out by a mobile terminal in accordance with Embodiment 2.
Figure 18:
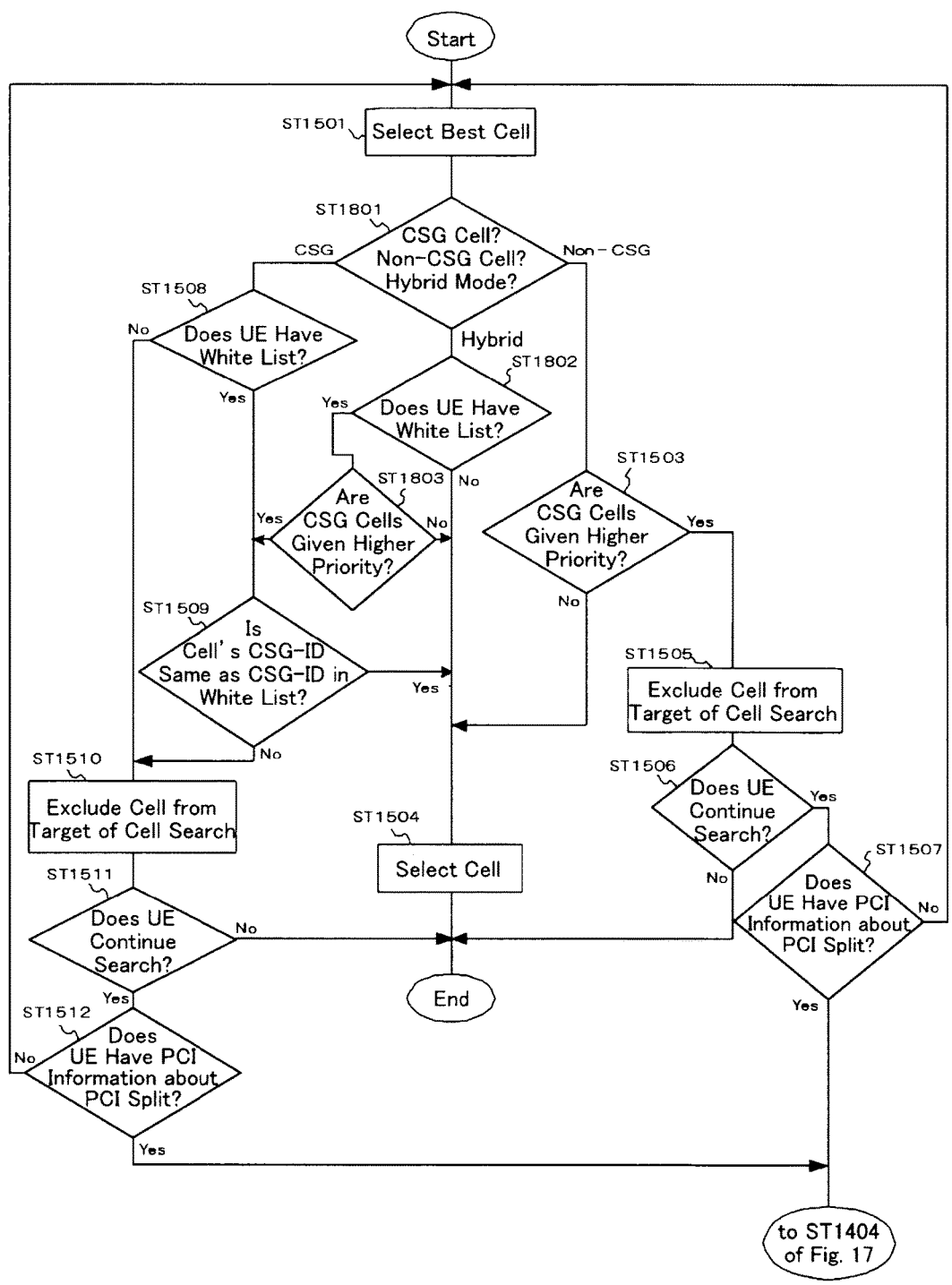
FIG. 18 is a flowchart showing a cell selection process performed by the mobile terminal in accordance with Embodiment 2.

Next, an example of the operation of a mobile terminal in accordance with this embodiment will be explained with reference to FIG. 17. FIG. 17 is similar to FIG. 14. Therefore, the explanation of steps having the same step numbers as those shown in FIG. 14 will be omitted hereafter. The mobile terminal, in step ST1401, receives PIC information about PCI split, which is disclosed in this embodiment, from a base station (a macro cell, an HeNB, an HNB, a CSG cell, a non-CSG cell, or the like) to determine whether or not the mobile terminal has the PIC information about PCI split. When not having the PIC information about PCI split, the mobile terminal makes a transition to step ST1402. In contrast, when having the PIC information about PCI split, the mobile terminal makes a transition to step ST1404. An example of the operation of making a cell selection carried out in step ST1403 will be explained in detail with reference to FIG. 18. FIG. 18 is similar to FIG. 15. Therefore, the explanation of steps having the same step numbers as those shown in FIG. 15 will be omitted hereafter. The mobile terminal, in step ST1501, selects a cell having the highest reception quality of a reference signal (Reference signal: RS) (e.g., a cell providing the highest received power to receive the RS) as a best cell. The mobile terminal, in step ST1801, determines whether the best cell is a CSG cell, a non-CSG cell, or an HeNB which is made to operate in the hybrid access mode. The mobile terminal can carry out this determination by using a CSG indicator mapped onto system information which is broadcast thereto from the base station. The mobile terminal can alternatively carry out the determination by using a hybrid access indicator mapped onto the system information which broadcast thereto from the base station. When the best cell is a non-CSG cell, the mobile terminal makes a transition to step ST1503. When the best cell is a CSG cell, the mobile terminal makes a transition to step ST1508. In contrast, when the best cell is an HeNB which is made to operate in the hybrid access mode, the mobile terminal makes a transition to step ST1802.

The mobile terminal, in step ST1507, receives the PIC information about PCI split, which is disclosed in this embodiment, from a base station (a macro cell, an HeNB, an HNB, a CSG cell, a non-CSG cell, or the like), and then determines whether the mobile terminal has the PIC information about PCI split. When not having the PIC information about PCI split, the mobile terminal returns to step ST1501. In contrast, when having the PIC information about PCI split, the mobile terminal makes a transition to step ST1404 of FIG. 17. The mobile terminal, in step ST1802, determines whether or not it has a CSG-ID in the white list. More specifically, the mobile terminal determines whether or not it has been registered to a CSG cell. When the mobile terminal has a CSG-ID, or when the mobile terminal has been registered with a CSG cell, the mobile terminal makes a transition to step ST1803. In contrast, when the mobile terminal does not have a CSG-ID, or when the mobile terminal has not been registered with a CSG cell, the mobile terminal makes a transition to step ST1504. The mobile terminal, in step ST1803, determines whether or not to give a high priority to a CSG cell to make a cell selection. When not giving a high priority to a CSG cell to make a cell selection, the mobile terminal makes a transition to step ST1504. In contrast, when giving a high priority to a CSG cell to make a cell selection, the mobile terminal makes a transition to step ST1509. The mobile terminal, in step ST1512, receives the PIC information about PCI split, which is disclosed in this embodiment, from a base station (a macro cell, an HeNB, an HNB, a CSG cell, a non-CSG cell, or the like), and then determines whether the mobile terminal has the PIC information about PCI split. When not having the PIC information about PCI split, the mobile terminal returns to step ST1501. In contrast, when having the PIC information about PCI split, the mobile terminal makes a transition to step ST1404 of FIG. 17.

The mobile terminal, in step ST1404, determines whether or not it has a CSG-ID in the white list. More specifically, the mobile terminal determines whether or not it has been registered to a CSG cell. When the mobile terminal has a CSG-ID, or when the mobile terminal has been registered with a CSG cell, the mobile terminal makes a transition to step ST1701. In contrast, when the mobile terminal does not have a CSG-ID, or when the mobile terminal has not been registered with a CSG cell, the mobile terminal makes a transition to step ST1703. The mobile terminal, in step ST1701, makes a cell search by using a PCI which the mobile terminal determines belongs to the PCI range for CSG cells according to the PIC information about PCI split disclosed in this embodiment, and a PCI which the mobile terminal also determines belongs to the PCI range for an HeNB which is made to operate in the hybrid access mode, and then makes a transition to step ST1406. The mobile terminal, in step ST1406, determines whether it has made a cell selection. When determining that the mobile terminal has made a cell selection, the mobile terminal ends the processing. In contrast, when determining that the mobile terminal has not made a cell selection yet, the mobile terminal makes a transition to step ST1702. An example of the operation of making a cell selection carried out in step ST1406 will be explained in detail with reference to FIG. 18. The cell selection operation of the mobile terminal in step ST1406 differs from that in step ST1403 in that the mobile terminal has the PIC information about PCI split, makes a cell search by using a PCI belonging to the PCI range for non-CSG cells and a PCI belonging to the PCI range for an HeNB which is made to operate in the hybrid access mode, and has the white list. Therefore, after performing the process of step ST1501 in FIG. 18, the mobile terminal, in step ST1801, determines that the best cell is a CSG cell and then advances to step ST1508, or determines that the best cell is an HeNB which is made to operate in the hybrid access mode, and then advances to step ST1802. The mobile terminal, in step ST1508, determines YES and then advances to step ST1509. The mobile terminal alternatively, in step ST1802, determines YES. The mobile terminal, in step ST1803, determines YES and performs the determination of step ST1509, and then advances to the process of step ST1504 or step ST1510. After performing the process of step ST1510, the mobile terminal performs the determination of step ST1511, and then performs the process of step ST1512 or ends the processing. The mobile terminal, in step ST1512, determines YES.

The mobile terminal, in step ST1702, determines that any CSG cell to which the mobile terminal has been registered does not exist in the neighborhood, or any HeNB to which the mobile terminal has been registered and which is made to operate in the hybrid access mode does not exist in the neighborhood, makes a cell search by using a PCI which the mobile terminal determines belongs to the PCI range for non-CSG cells according to the PIC information about PCI split disclosed in this embodiment and a PCI which the mobile terminal also determines belongs to the PCI range for an HeNB which is made to operate in the hybrid access mode so as to select a non-CSG cell or an HeNB which is made to operate in the hybrid access mode and with which the mobile terminal has not been registered, and then makes a transition to step ST1408. The mobile terminal, in step ST1408, determines whether it has made a cell selection. When determining that the mobile terminal has made a cell selection, the mobile terminal ends the processing. In contrast, when determining that the mobile terminal has not made a cell selection yet, the mobile terminal makes a transition to step ST1701. An example of the operation of making a cell selection carried out in step ST1408 will be explained in detail with reference to FIG. 18. The cell selection operation of the mobile terminal in step ST1408 differs from that in step ST1403 in that the mobile terminal has the PIC information about PCI split, makes a cell search by using a PCI belonging to the PCI range for non-CSG cells and a PCI belonging to the PCI range for an HeNB which is made to operate in the hybrid access mode, and does not give a high priority to a CSG cell in the current cell search. Therefore, after performing the process of step ST1501 in FIG. 18, the mobile terminal, in step ST1801, determines that the best cell is a non-CSG cell and then advances to step ST1503, or determines that the best cell is an HeNB which is made to operate in the hybrid access mode, and then advances to step ST1802. The mobile terminal, in step ST1503, determines NO and then advances to step ST1504. The mobile terminal alternatively, in step ST1802, determines NO and then advances to step ST1504.

The mobile terminal, in step ST1703, makes a cell search by using a PCI which the mobile terminal determines belongs to the PCI range for non-CSG cells according to the PIC information about PCI split disclosed in this embodiment and a PCI which the mobile terminal also determines belongs to the PCI range for an HeNB which is made to operate in the hybrid access mode, and then makes a transition to step ST1410. The mobile terminal, in step ST1410, determines whether it has made a cell selection. When determining that the mobile terminal has made a cell selection, the mobile terminal ends the processing. In contrast, when determining that the mobile terminal has not made a cell selection yet, the mobile terminal returns to step ST1703. An example of the operation of making a cell selection carried out in step ST1410 will be explained in detail with reference to FIG. 18. The cell selection operation of the mobile terminal in step ST1410 differs from that in step ST1403 in that the mobile terminal has the PIC information about PCI split, but does not have a white list, makes a cell search by using a PCI belonging to the PCI range for non-CSG cells and a PCI belonging to the PCI range for an HeNB which is made to operate in the hybrid access mode, and does not give a high priority to a CSG cell in the current cell search. Therefore, after performing the process of step ST1501 in FIG. 18, the mobile terminal, in step ST1801, determines that the best cell is a non-CSG cell and then advances to step ST1503, or determines that the best cell is an HeNB which is made to operate in the hybrid access mode, and then advances to step ST1802. The mobile terminal, in step ST1503, determines NO and then advances to step ST1504. The mobile terminal alternatively, in step ST1802, determines NO and then advances to step ST1504.

Next, an example of a method of sending the PIC information about PCI split from the network to a mobile terminal will be explained. Some methods about PIC information about PCI split are described in nonpatent reference 7. However, nonpatent reference 7 does not take into consideration the hybrid access mode. In accordance with this embodiment, the PCI range for CSG cells, the PCI range for non-CSG cells, and the PCI range for an HeNB which is made to operate in the hybrid access mode are informed independently (separately) through the PCI split. The notification of the PCI range for CSG cells and the PCI range for non-CSG cells independently is not disclosed by nonpatent reference 7. Furthermore, when sending the three pieces of PIC information about PCI split, the network informs that the first PIC split information is the PCI range for CSG cells (an indicator can be used instead), also informs that the second PIC information about PCI split is the PCI range for non-CSG cells (an indicator can be used instead), and further informs that the third PIC information about PCI split is the PCI range for an HeNB which is made to operate in the hybrid access mode (an indicator can be used instead) (regardless of whether they can be transmitted simultaneously or non-simultaneously). Furthermore, the network can statically determine the order in which it sends the PCI ranges. In this case, the same advantages can be provided. For example, the network sends the PCI range for CSG cells first, then sends the PCI range for non-CSG cells second, and sends the PCI range for an HeNB which is made to operate in the hybrid access mode third. As a result, as compared with the case in which the network informs the mobile terminal that the PIC information about PCI split is the PCI range for CSG cells, also informs the mobile terminal that the PIC information about PCI split is the PCI range for non-CSG cells, and further informs the mobile terminal that the PIC information about PCI split is the PCI range for an HeNB which is made to operate in the hybrid access mode third, the network can reduce the amount of information transmitted therefrom to the mobile terminal, and there can be provided an advantage of making effective use of the radio resources. As concrete examples of the pieces of PIC information about PCI split informed from the base station to the mobile terminal, a one of the same methods as those shown in Embodiment 1 can be used. Therefore, the explanation of the concrete examples of the pieces of PIC information about PCI split will be omitted hereafter.

Another example of the notification method will be explained hereafter. A case in which the range D of FIG. 16(b) is the range of PCIs which can be assigned to an HeNB which is made to operate in the hybrid access mode will be considered. In this case, only the PCI range for an HeNB which is made to operate in the hybrid access mode third is informed as the PIC information about PCI split informed from the base station to the mobile terminal. Then, for example, it is determined statically that the region before (less than) the PCI range for an HeNB which is made to operate in the hybrid access mode, i.e., the range B of FIG. 16(b) is defined as the PCI range for CSG cells, and the region after (greater than) the PCI range for an HeNB which is made to operate in the hybrid access mode, i.e., the range C of FIG. 16(b) is defined as the PCI range for non-CSG cells. Because the same method as that shown in Embodiment 1 can be used as a concrete example of the PIC information about PCI split, the explanation of a concrete example of the PIC information about PCI split will be omitted hereafter. As a result, as compared with the method of informing the PCI range for CSG cells, the PCI range for non-CSG cells, and the PCI range for an HeNB which is made to operate in the hybrid access mode, which are defined through the above-mentioned PCI split, independently (separately), the amount of information transmitted from the network to the mobile terminal can be reduced, and there can be provided an advantage of making effective use of the radio resources. As an alternative, the above-mentioned method can be applied with either the PCI range for CSG cells or the PCI range for non-CSG cells being selected as the PIC information about PCI split informed from the base station to the mobile terminal.

This embodiment can provide the following advantages. A mobile terminal which does not have a white list becomes able to include non-CSG cells and an HeNB which is made to operate in the hybrid access mode into the target to be searched by making a search by using a PCI belonging to the PCI range for non-CSG cells. More specifically, without having to make a search by using a PCI belonging to the PCI range for CSG cells, a mobile terminal which does not have a white list becomes able to include an HeNB which is made to operate in the hybrid access mode into the target to be searched. In accordance with a conventional technology, in order to include an HeNB which is made to operate in the hybrid access mode into the target to be searched, a mobile terminal which does not have a white list has to include all the PCI ranges into the target to be searched. In contrast, in accordance with this embodiment, when detecting a PCI (step ST1201 of FIG. 12), such a mobile terminal can perform a cell searching operation on cells except CSG cells which the mobile terminal cannot access because the mobile terminal has not been registered with the CSG cells. In contrast, in accordance with the conventional technology, each mobile terminal cannot know whether a cell is a non-CSG cell or a CSG cell unless it receives SIB1 which is system information. Furthermore, each mobile terminal cannot know whether a cell is made to operate in the hybrid access mode unless it receives SIB1 which is system information. Therefore, each mobile terminal cannot make a cell search while excluding CSG cells and so on from the target to be searched, and cannot make a cell selection of an HeNB which is made to operate in the hybrid mode until receiving the system information (SIB1) (step ST1205 of FIG. 12). Thus, the use of this embodiment can provide an advantage of being able to perform the search operation at a high speed. This can provide another advantage of preventing a control delay from occurring in the mobile communication system. This embodiment can provide a further advantage of reducing the power consumption of each mobile terminal.

Embodiment 3

This embodiment discloses another solution to the same problem as that shown in Embodiment 1. In accordance with Embodiment 1 and Embodiment 2, the problem with the conventional PCI split is solved by reserving, as the PCI range which is assigned to an HeNB which is made to operate in the hybrid access mode, a range apart from the conventional PCI range for CSG cells and the conventional PCI range for non-CSG cells. In accordance with this embodiment, there is provided another solution to the conventional PCI split, which differs from the method of reserving, as the PCI range which is assigned to an HeNB which is made to operate in the hybrid access mode, a range apart from the conventional PCI range for CSG cells and the conventional PCI range for non-CSG cells (another solution different from those shown in Embodiment 1 and Embodiment 2). A PCI for non-CSG cells is assigned to an HeNB which is made to operate in the hybrid access mode in a mobile communication system. Instead of assigning a PCI belonging to the PCI range for non-CSG cells which is defined through the conventional PCI split only to a non-CSG cell, like in the case of using a conventional technology, a PCI belonging to the PCI range for non-CSG cells is assigned to a non-CSG cell and an HeNB which is made to operate in the hybrid access mode. A concept behind this embodiment will be explained with reference to FIG. 16. A conceptual diagram of the PCI split which has been being debated in the 3GPP is shown in FIG. 16(*a*). A range A denotes all the PCIs. For example, there are 504 different PCIs (504 different codes). For example, the PCI range for CSG cells is denoted by a range B. For example, the PCI range for non-CSG cells is denoted by a range C. In accordance with this embodiment, a PCI belonging to the range B is assigned to a CSG cell, for example. Furthermore, a PCI belonging to the range C is assigned to a non-CSG cell and an HeNB which is made to operate in the hybrid access mode.

Figure 19:
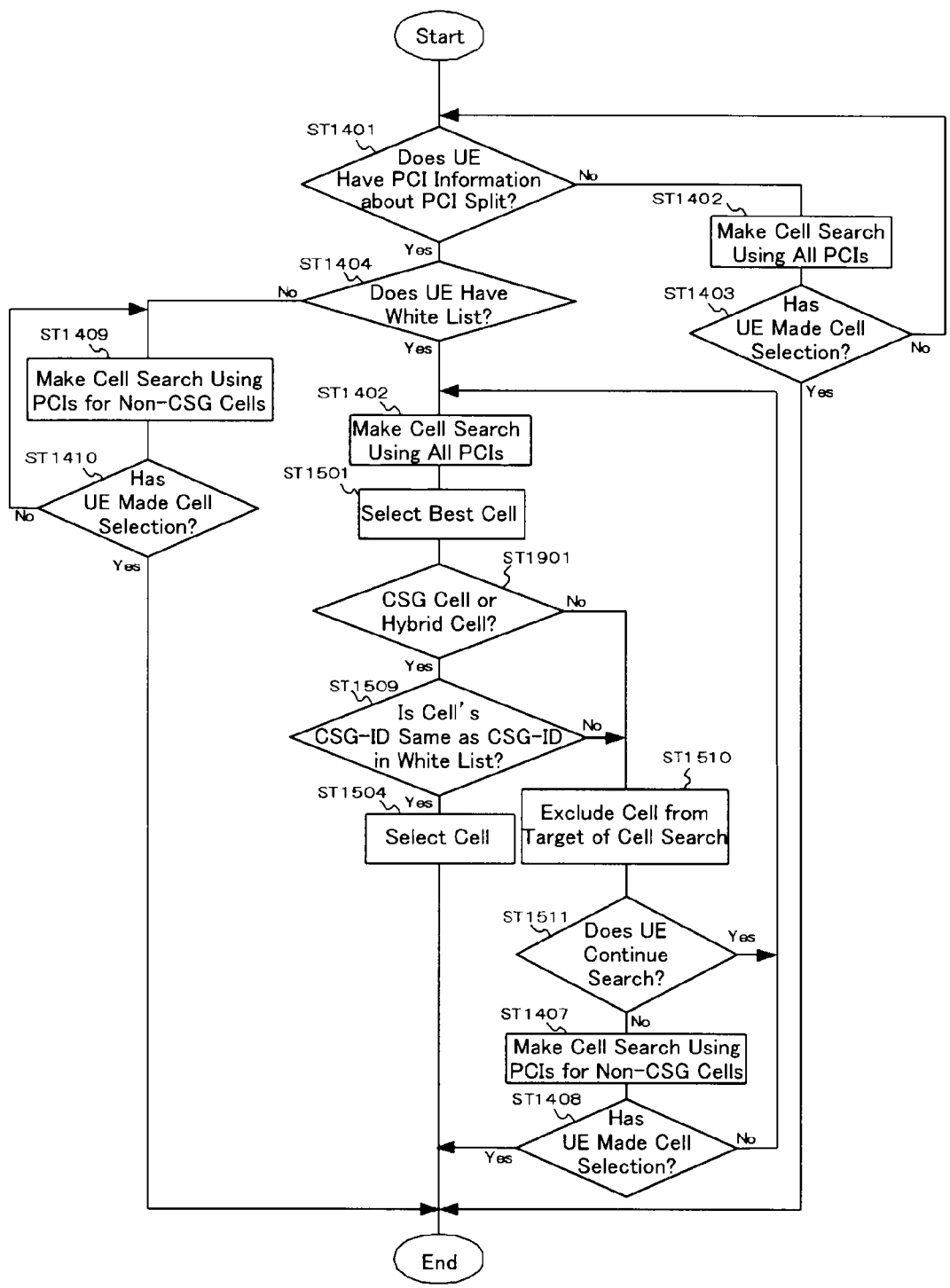
FIG. 19 is a flow chart showing a process carried out by a mobile terminal in accordance with Embodiment 3.

Next, an example of the operation of a mobile terminal in accordance with this embodiment will be explained with reference to FIG. 19. FIG. 19 has portions similar to those of FIGS. 14 and 15. Therefore, the explanation of steps having the same step numbers as those shown in FIGS. 14 and 15 will be omitted hereafter. The mobile terminal, in step ST1901, determines whether a best cell in question is a CSG cell, a non-CSG cell, or an HeNB which is made to operate in the hybrid access mode. The mobile terminal can carry out this determination by using a CSG indicator mapped onto system information which is broadcast thereto from the base station. The mobile terminal can alternatively carry out the determination by using a hybrid access indicator mapped onto the system information which broadcast thereto from the base station. When the best cell is a non-CSG cell, the mobile terminal makes a transition to step ST1510. In contrast, when the best cell is a CSG cell or an HeNB which is made to operate in the hybrid access mode, the mobile terminal makes a transition to step ST1509.

This embodiment can provide the following advantages. A mobile terminal which does not have a white list becomes able to include non-CSG cells and an HeNB which is made to operate in the hybrid access mode into the target to be searched by simply making a search by using a PCI belonging to the PCI range for non-CSG cells. More specifically, without having to make a search by using a PCI belonging to the PCI range for CSG cells, a mobile terminal which does not have a white list becomes able to include an HeNB which is made to operate in the hybrid access mode into the target to be searched. In accordance with a conventional technology, in order to include an HeNB which is made to operate in the hybrid access mode into the target to be searched, a mobile terminal which does not have a white list has to include all the PCI ranges into the target to be searched. In contrast, in accordance with this embodiment, when detecting a PCI (step ST1201 of FIG. 12), such a mobile terminal can perform a cell searching operation on cells except CSG cells which the mobile terminal cannot access because the mobile terminal has not been registered with the CSG cells. In contrast, in accordance with the conventional technology, each mobile terminal cannot know whether a cell is a non-CSG cell or a CSG cell unless it receives SIB1 which is system information. Furthermore, each mobile terminal cannot know whether a cell is made to operate in the hybrid access mode unless it receives SIB1 which is system information. Therefore, each mobile terminal cannot make a cell search while excluding CSG cells and so on from the target to be searched, and cannot make a cell selection of an HeNB which is made to operate in the hybrid mode until receiving the system information (SIB1) (step ST1205 of FIG. 12). Thus, the use of this embodiment can provide an advantage of being able to perform the search operation at a high speed. This can provide another advantage of preventing a control delay from occurring in the mobile communication system. This embodiment can provide a further advantage of reducing the power consumption of each mobile terminal. Furthermore, as a result, the introduction of an HeNB which is made to operate in the hybrid access mode can eliminate the necessity to change the method of PCI split. As a result, there can be provided an advantage of preventing increase in the complexity of the mobile communication system.

Variant 1 of Embodiment 3

Although the solution according to above-mentioned Embodiment 3 achieves an speedup in the cell searching operation of a mobile terminal which does not have a white list as compared with the conventional technology, the solution according to above-mentioned Embodiment 3 does not achieve an speedup in the cell searching operation of a mobile terminal having a white list. Concretely, there is a case in which by simply making a cell search by using the PCI range for CSG cells, a mobile terminal having a white list cannot select an HeNB which is made to operate in the hybrid access mode through the cell search. Such a mobile terminal having a white list has to make a cell search by using all the PCI ranges even when acquiring the PIC information about PCI split in order to avoid the situation in which the mobile terminal cannot select an HeNB which is made to operate in the hybrid access mode. It can be considered that when a registered mobile terminal communicates with a CSG cell to which the mobile terminal has been registered, the user having a white list desires to give a higher priority to a CSG cell than to a non-CSG cell to cause the mobile terminal to make a cell selection if the mobile communication system provides a charging preferential treatment. A problem is, however, that because when making a cell search by using all the PCI ranges, the mobile terminal makes a cell selection without discriminating between CSG cells and non-CSG cells, it takes a long time to select a CSG cell (or makes a cell reselection).

This variant discloses a method of solving the above-mentioned problem. A base station informs whether an HeNB which is made to operate in the hybrid access mode exists in neighboring cells (referred to as a "neighboring hybrid status" from here on to mobile terminals being served thereby. The base station informs whether an HeNB which is made to operate in the hybrid access mode exists in a neighboring area surrounding the cell of the base station or cells which are the target for measurement to mobile terminals being served thereby. Concretely, a 1-bit indicator is provided, and this indicator can be set to "1" when an HeNB which is made to operate in the hybrid access mode exists, whereas the indicator can be set to "0" when an HeNB which is made to operate in the hybrid access mode does not exist (needless to say, the indicator can have an inverse relationship with the above-mentioned indicator value).

A concrete example of a notification method of notifying the neighboring hybrid status will be shown hereafter. The neighboring hybrid status is mapped onto a broadcast control channel (BCCH) which is a logical channel, and the broadcast control channel is further mapped onto a broadcast channel (BCH) which is a transport channel and the broadcast channel is mapped onto a physical broadcast channel (PBCH) which is a physical channel, so that the neighboring hybrid status is informed to the mobile terminals. As an alternative, the neighboring hybrid status is mapped onto master information, the master information is mapped onto a master information block (MIB), and the master information block is mapped onto a broadcast control channel (BCCH) which is a logical channel. The broadcast control channel is further mapped onto a broadcast channel (BCH) which is a transport channel and the broadcast channel is mapped onto a physical broadcast channel (PBCH) which is a physical channel, so that the neighboring hybrid status is informed to the mobile terminals. When the neighboring hybrid status is mapped onto the MIB, the following advantages can be provided. For example, in a communication system which complies with an LTE method, minimum broadcast information which needs to be received during operations from a cell search operation to an idle mode operation is the MIB or an SIB1. Therefore, by including the neighboring hybrid status into the minimum broadcast information which needs to be received during the operations from the cell search operation to the idle mode operation, each mobile terminal becomes able to acquire the neighboring hybrid status with low power for a short time without having to acquire other broadcast information blocks.

The neighboring hybrid status is mapped onto a broadcast control channel (BCCH) which is a logical channel, the broadcast control channel is mapped onto a downlink shared channel (DL-SCH) which is a transport channel, and the downlink shared channel is mapped onto a physical downlink shared channel (PDSCH) which is a physical channel, so that the neighboring hybrid status is informed to the mobile terminal. As an alternative, the neighboring hybrid status is mapped onto system information, the system information is mapped onto a system information block (SIB), and the system information block is mapped onto a broadcast control channel (BCCH) which is a logical channel. The broadcast control channel is further mapped onto a downlink shared channel (DL-SCH) which is a transport channel and the downlink shared channel is mapped onto a physical downlink shared channel (PDSCH) which is a physical channel, so that the neighboring hybrid status is informed to the mobile terminal. When the neighboring hybrid status is mapped onto the SIB1 among the system information, the following advantages can be provided. For example, in a communication system which complies with an LTE method, minimum broadcast information which needs to be received during operations from a cell search operation to an idle mode operation is the MIB or the SIB1. Therefore, by including the neighboring hybrid status into the minimum broadcast information which needs to be received during the operations from the cell search operation to the idle mode operation, each mobile terminal becomes able to acquire the neighboring hybrid status with low power for a short time without having to acquire other broadcast information blocks. Furthermore, the 3GPP has been holding a debate shown below. The 3GPP provides the following future directions: a CSG indicator indicating that the cell is a CSG cell is mapped onto the SIB1; a hybrid access indicator for discriminating the hybrid access mode is mapped onto the SIB1; and Cell reselection common information (cellReselectionInfoCommon) is mapped onto the SIB1. Under the circumstances, the mapping of the neighboring hybrid status which is the information which each mobile terminal uses when determining whether or not to carry out a cell searching operation so as to search for an HeNB which is made to operate in the hybrid access mode onto the SIB1 makes it possible for each mobile terminal to acquire the parameters which the mobile terminal uses when performing the cell search process by simply receiving the same system information. Therefore, there can be provided an advantage of preventing increase in the complexity of the operation of the mobile terminal, and preventing a control delay from occurring in the mobile communication system.

When the neighboring hybrid status is mapped onto an SIB4 included in the system information, the following advantages can be provided. The 3GPP currently provides the following future direction: an intra frequency neighboring cell list (intraFreqNeighbouringCellList) is mapped onto the SIB4. Under the circumstances, each mobile terminal is enabled to acquire the parameters which the mobile terminal uses when performing a process of acquiring information about the conditions of neighboring cells by simply receiving the same system information. Therefore, there can be provided an advantage of preventing increase in the complexity of the operation of the mobile terminal, and preventing a control delay from occurring in the mobile communication system. Furthermore, an HeNB which is made to operate in the hybrid access mode can be included in the intra frequency neighboring cell list. Furthermore, an indicator showing whether or not the cell is an HeNB which is made to operate in the hybrid access mode is provided for each cell in the intra frequency neighboring cell list. When the neighboring hybrid status is mapped onto an SIB9 included in the system information, the following advantages can be provided. The 3GPP currently provides the following future direction: an identifier (a home eNB identifier (HNBID)) of an HeNB is mapped onto the SIB9. Under the circumstances, each mobile terminal is enabled to acquire the parameters which the mobile terminal uses when performing a process of acquiring information about an HeNB by simply receiving the same system information. Therefore, there can be provided an advantage of preventing increase in the complexity of the operation of the mobile terminal, and preventing a control delay from occurring in the mobile communication system.

As an alternative, the neighboring hybrid status, i.e., a parameter about commonly-recognized physical resources is mapped onto a common control channel (CCCH) which is a logical channel, a dedicated control channel (DCCH), a multicast control channel (MCCH), or a multicast traffic channel (MTCH). Furthermore, the channel is mapped onto a downlink shared channel (DL-SCH) which is a transport channel, and the downlink shared channel is mapped onto the physical downlink shared channel (PDSCH) which is a physical channel, so that the neighboring hybrid status is informed to the mobile terminals.

Figure 20:
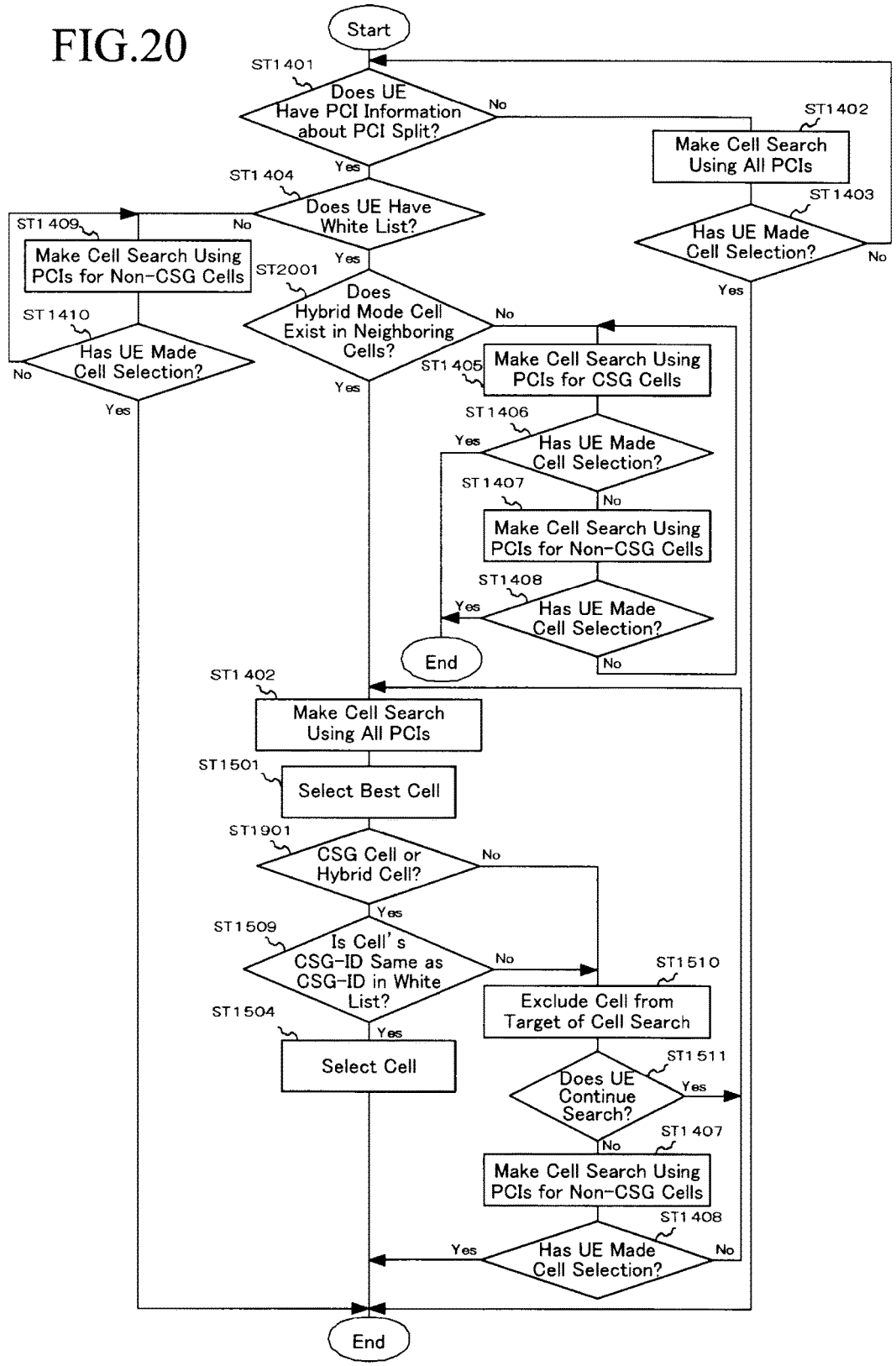
FIG. 20 is a flow chart showing a process carried out by a mobile terminal according to a variant of Embodiment 3.

Next, an example of the operation of a mobile terminal according to this variant will be explained with reference to FIG. 20. FIG. 20 has portions similar to FIGS. 14, 15 and 19.

Figure 14:
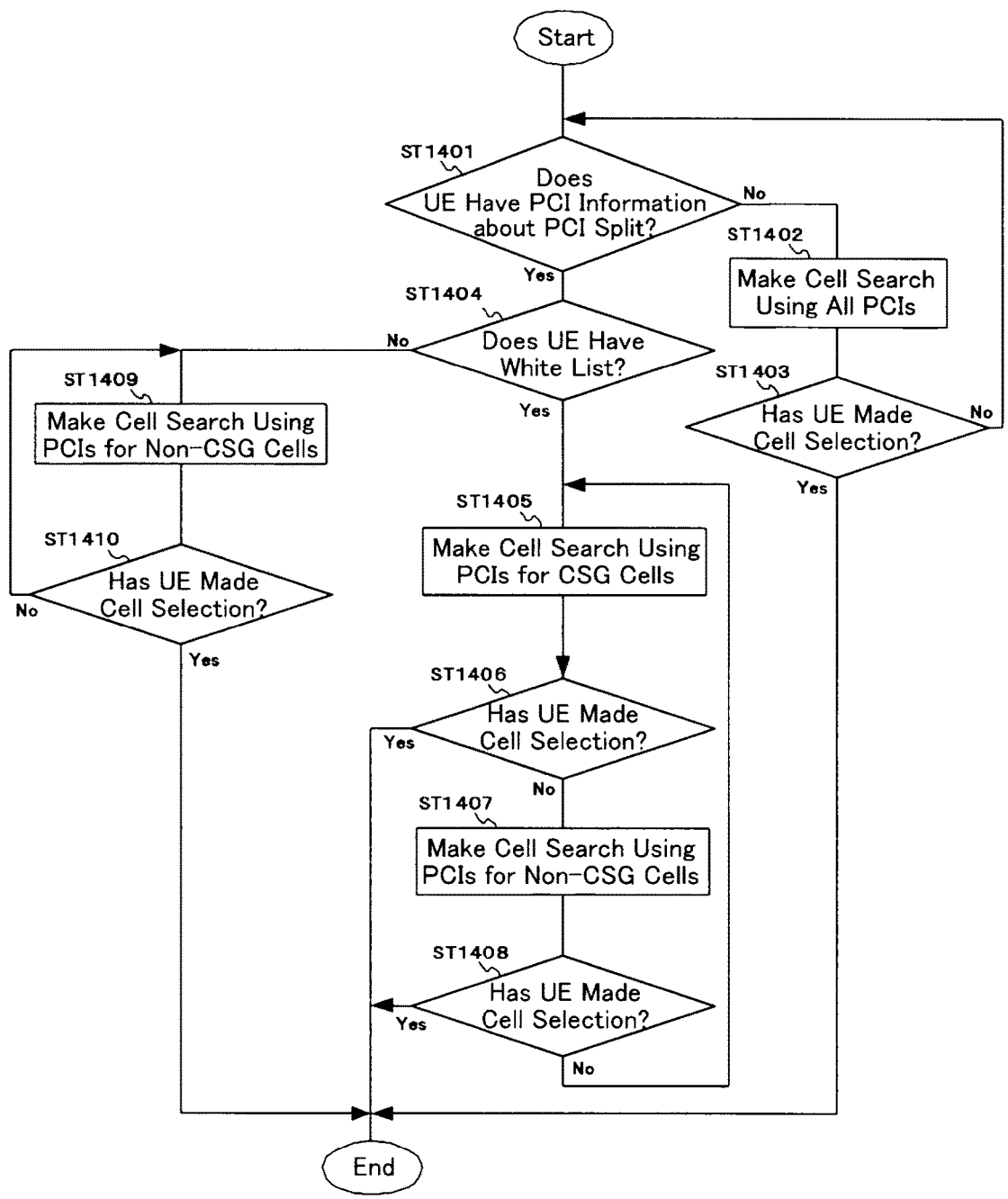
FIG. 14 is a flowchart showing a process carried out by a mobile terminal in accordance with Embodiment 1.
Figure 15:
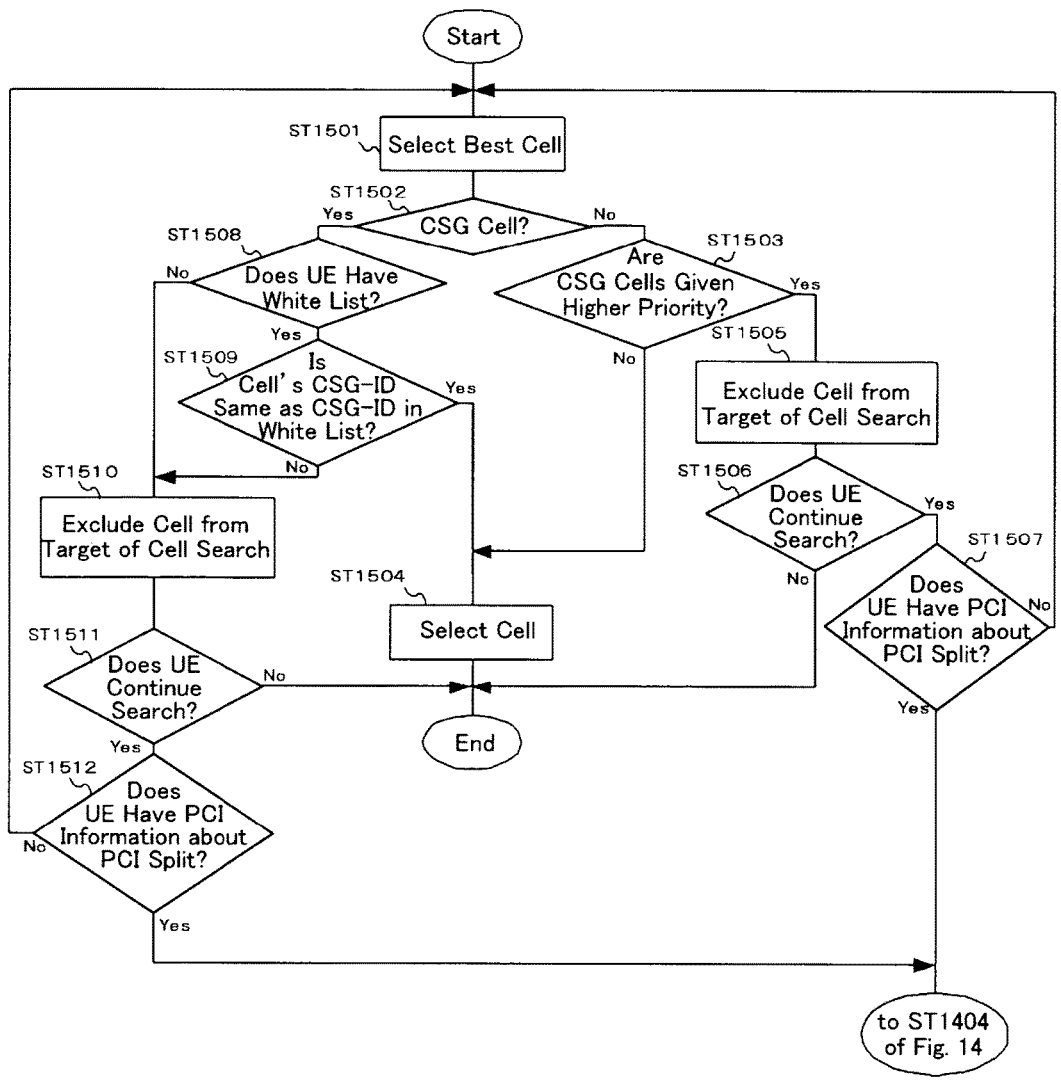
FIG. 15 is a flowchart showing a cell selection process performed by the mobile terminal in accordance with Embodiment 1.

Therefore, the explanation of steps having the same step numbers as those shown in FIGS. 14, 15, and 19 will be omitted hereafter. The mobile terminal, in step ST2001, determines whether an HeNB which is made to operate in the hybrid access mode exists in neighboring cells (or cells which are the target for measurement). The mobile terminal can carry out this determination by using the "neighboring hybrid status" which is mapped onto the information broadcast thereto from the base station, and which is disclosed in this variant. When an HeNB which is made to operate in the hybrid access mode exists in neighboring cells, the mobile terminal makes a transition to step ST1402. In contrast, when any HeNB which is made to operate in the hybrid access mode does not exist in neighboring cells, the mobile terminal makes a transition to step ST1405.

In addition to the advantages provided by Embodiment 3, this variant can provide the following advantages. This variant can achieve a speedup in the cell searching operation of a mobile terminal having a white list. A mobile terminal having a white list becomes unnecessary to make a search by using a PCI belonging to the PCI range for non-CSG cells in an environment where any HeNB which is made to operate in the hybrid access mode does not exist. This can provide an advantage of being able to carry out the search operation at a high speed. This can provide a further advantage of preventing a control delay from occurring in the mobile communication system. Furthermore, there can be provided an advantage of reducing the power consumption of each mobile terminal.

Embodiment 4

Nonpatent reference 7 describes a signaling method of signaling PIC information about PCI split. In the signaling method shown by nonpatent reference 7, it is necessary to inform a code value with a start code or an enumerated value. For example, when 504 different codes exist in all of the PCIs, 9 bits are required in order to represent each of the 504 different codes. In this embodiment, a method of informing PIC information about PCI split from a base station to a mobile terminal which differs from the method disclosed by nonpatent reference 7 will be disclosed. According to this embodiment, the PIC information about PCI split is shown by the "divisor" and the "remainder" on division of a PCI code by the divisor. As a concrete example, (the PCI code) MOD X=Y is provided. The values of X and Y show the PIC information about PCI split. For example, when X is set to 2, the PIC information about PCI split having Y=0 shows a PCI code for CSG cells and the PIC information about PCI split having Y=1 shows a PCI code for non-CSG cells. As a result, the PIC information about PCI split which is sent from the base station to the mobile terminal by using radio resources has the X value, the Y value for CSG cells, and the Y value for non-CSG cells. Therefore, there can be provided an advantage of reducing the amount of information and making effective use of the radio resources as compared with the method of informing the code value which is disclosed by nonpatent reference 7. Furthermore, by simply determining to assign Y=0 to non-CSG cells statically or semi-statically, the base station has only to send only the X value and the Y value for CSG cells to the mobile terminal. As a result, the amount of information can be further reduced, and effective use of the radio resources can be made. Furthermore, there is provided an advantage of being able to easily change the ratio of the PCI range for CSG cells and the PCI range for non-CSG cells by changing the X value. For example, what is necessary is just to set X to 3, to use Y=0 and 1 for CSG cells, and to use Y=2 for non-CSG cells. As a result, the PCI range for CSG cells can be widened to be twice as wide as the PCI range for non-CSG cells. This embodiment can be applied to Embodiment 1, Embodiment 2, and Embodiment 3. In Embodiment 1, the PCI range for CSG cells and the PCI range for non-CSG cells are determined through the PCI split in such a way that they overlap each other. When this embodiment is applied to Embodiment 1, what is necessary is just to assign a Y value to both the PCI range for CSG cells and the PCI range for non-CSG cells duplicatedly. For example, what is necessary is just to set X to "3", to use Y=0 and Y=1 for CSG cells, and to use Y=1 and Y=2 for non-CSG cells.

Embodiment 5

In the 3GPP, a hybrid access mode has been newly proposed for an HNB or an HeNB (nonpatent reference 6). The hybrid access mode supports a closed access mode and an open access mode simultaneously. A CSG cell is usually placed in the closed access mode, and a mobile terminal which has been registered with this CSG is permitted to access the CSG cell. Any mobile terminal which has not been registered with this CSG is prohibited from accessing the CSG cell. In contrast, the open access mode is the one in which any mobile terminal which has not been registered with the CSG can access a cell in the open access mode, and this cell serves as a non-CSG cell. Therefore, a cell in the hybrid access mode needs to cause a mobile terminal which has been registered with the CSG to access thereto as the closed access mode, and to cause a mobile terminal which has not been registered with the CSG to access thereto as the open access mode. In contrast, it is determined as to a tracking area (TA) to which a CSG cell in the closed access mode belongs that one or more cells belonging to one CSG have to belong to an identical TA, unlike in the case of a TA to which a non-CSG in the open access mode belongs (nonpatent reference 8). Furthermore, a CSG-ID is assigned to each CSG. Each of one or more CSG cells included in one CSG carries the identical TAC on broadcast information, and then broadcasts this broadcast information to mobile terminals being served thereby. As mentioned above, if each CSG-ID is brought into correspondence with a TAC, each mobile terminal which has been registered with this CSG can know the TA of this cell and the CSG-ID of this cell by simply receiving the TAC which is carried on the broadcast information from this cell.

Figure 21:
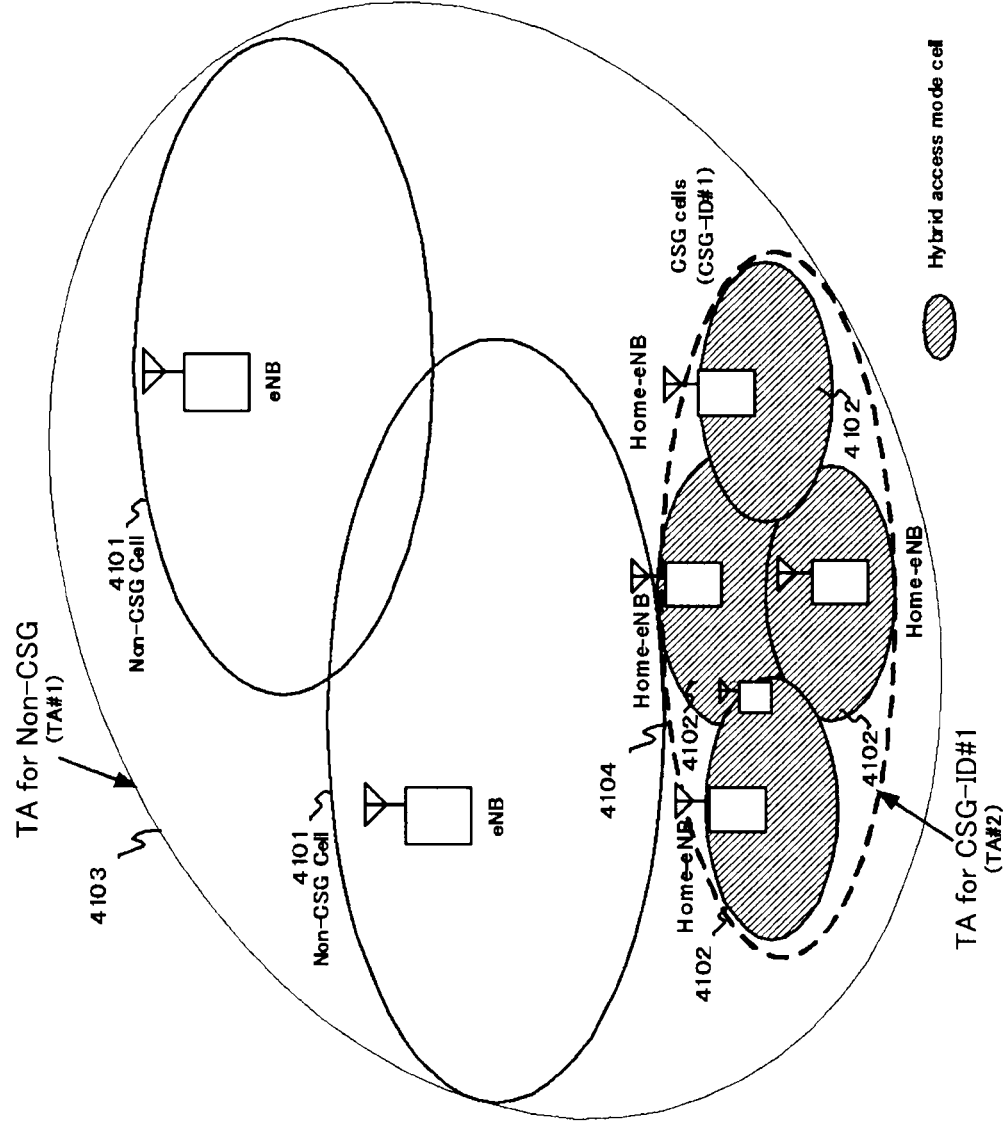
FIG. 21 is a conceptual diagram in a case in which a cell in a hybrid access mode belongs to two TAs.

Because a cell in the hybrid access mode thus has to simultaneously support both the closed access mode and the open access mode which provide different TAs, there arises a problem of how to configure the TA of a cell in the hybrid access mode, and a further problem of how to inform the TAC assigned to the TA to mobile terminals being served by the cell. These problems have not even been debated in the 3GPP. A case in which a conventional method of configuring a TA is also applied to a cell in the hybrid access mode will be examined. First, in order to enable a cell in the hybrid access mode to operate also in the closed access mode, this cell is made to belong to the tracking area (TA) to which cells included in the CSG to which the above-mentioned cell belongs belong. In addition, in order to enable the cell to operate also in the open access mode, this cell is made to belong to a TA to which non-CSG cells belong. More specifically, a cell in the hybrid access mode is made to belong to two TAs. FIG. 21 is a conceptual diagram showing that a cell in the hybrid access mode belongs to two TAs. 4101 denotes a non-CSG cell and 4102 denotes a cell in the hybrid access mode. A TA for non-CSG cells is denoted by TA#1. Because each hybrid access mode cell (4102) is used also in the open access mode, this cell (4102) is made to belong to the TA for non-CSG cells (TA#1 (4103)). In addition, because each hybrid access mode cell (4102) is used also in the closed access mode, the identifier of the CSG in this case is defined as CSG-ID#1, for example, and this cell is made to belong to a TA corresponding to the CSG-ID#1 (TA#2 (4104)). More specifically, each hybrid access mode cell (4102) is made to belong to the two TAs (TA#1 and TA#2). Because each hybrid access mode cell is thus made to belong to the two TAs, each hybrid access mode cell can simultaneously support both the closed access mode and the open access mode.

Figure 22:
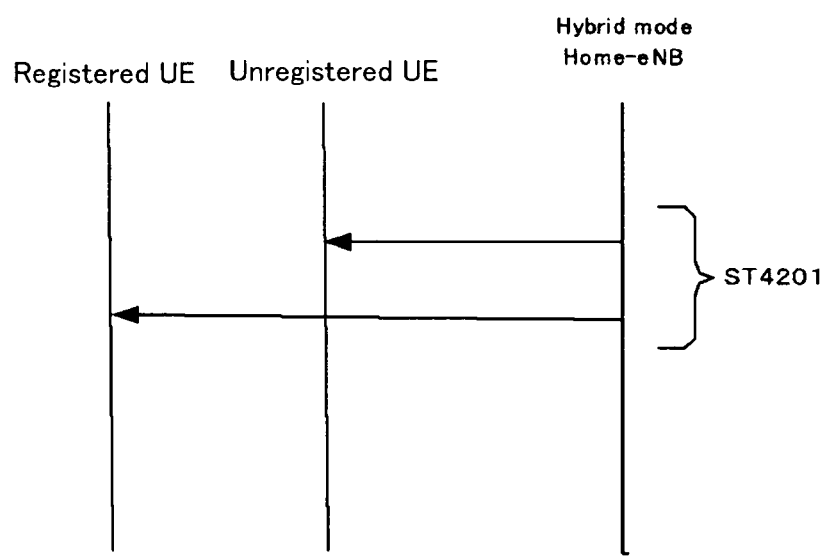
FIG. 22 is a view showing a notification method of notifying a TAC in a case of applying a conventional method.
Figure 23:
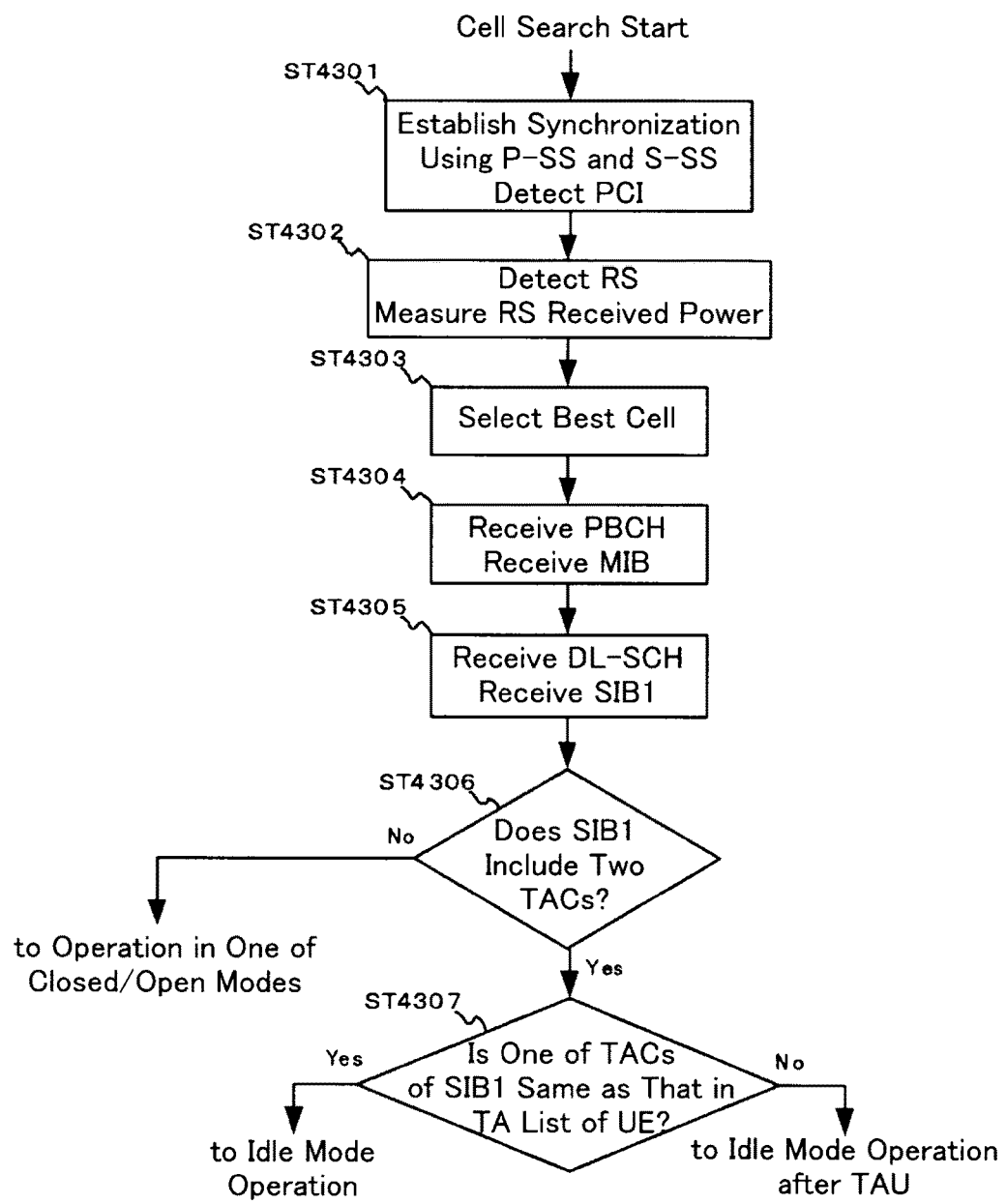
FIG. 23 is a flow chart of an operation of a mobile terminal including from a cell search and a cell selection up to an idle mode operation in the case of applying the conventional method.

Next, a method of informing a TAC in the case of applying the conventional method will be shown. The method of informing a TAC in the case of applying the conventional method is shown in FIG. 22. Because a hybrid access mode cell belongs to two TAs, this cell, in ST4201, broadcasts the TA identifiers (TAC#1 and TAC#2) of the two TAs (TA#1 and TA#2), as broadcast information (BCCH (TAC#1, TAC#2)) via a broadcast channel BCCH, to mobile terminals being served thereby (registered UEs and unregistered UEs). It has been determined by the 3GPP that a TAC is mapped onto the SIB1. Therefore, the two TACs are mapped onto the SIB1. A flow chart of an operation of a mobile terminal including from a cell search and a cell selection up to an idle mode operation in the case of applying the conventional method will be shown in FIG. 23. In the figure, steps of ST4301 to ST4305 are the same as those shown in FIG. 12. The mobile terminal, in ST4306, receives the SIB1 from this cell and decodes the SIB1 to determine whether one or two TACs are included in the SIB1. When only one TAC is included in the SIB1, the mobile terminal can determine that the cell is not a hybrid access mode cell, but a normal closed access mode cell or a normal open access mode cell, and then makes a transition to an operation in either one of the modes. When two TACs are included in the SIB1, the mobile terminal can determine that the cell is a hybrid access mode cell and then makes a transition to ST4307. The mobile terminal, in ST4307, determines whether or not each of the two TACs broadcast from this cell is the same as a TAC in a TA list stored therein. When one of the two TACs broadcast from this cell is the same as a TAC in the TA list, the mobile terminal becomes able to make a transition to an idle mode operation for this cell. Even when neither of the two TACs broadcast from this cell is the same as any TAC in the TA list, the mobile terminal determines that it can access this cell, and can make a transition to an idle mode operation after TAU because the mobile terminal knows from the determination of ST4306 that the above-mentioned cell is a hybrid access mode cell. More specifically, when the cell which the mobile terminal has selected through the cell selection is a hybrid access mode cell, the mobile terminal becomes able to make a transition to an idle mode operation for this cell regardless of the presence or absence of a white list, or the presence or absence of a CSG-ID in the closed access mode of the cell.

However, when the conventional method is applied in this way, each cell belongs to two TAs, and has to transmit broadcast information to mobile terminals being served thereby with two TACs being included in the broadcast information. Because a TAC is information for identifying a tracking area, a TAC requires a large number of bits corresponds to the total number of tracking areas. Furthermore, the base station repeatedly transmits the SIB1 to mobile terminals being served thereby at short time intervals. Therefore, an increase in the number of TACs to be broadcast leads to an increase in the amount of broadcast information, and then leads to an increase in the amount of signaling. Furthermore, because each cell needs to transmit a paging signal to all terminals belonging to a plurality of TAs, the load of the transmission of the paging signal also increases. This increase in the amount of signaling required for each cell to transmit the broadcast information and the paging signal causes increase in the amount of signaling in the whole system, and this results in reduction in the use efficiency of the radio resources. Conventionally, it has been also examined that an MME which manages non-CSG cells differs from an MME which manages CSG cells. In such a case, because there are different MMEs which control TAs, respectively, and each of the MMEs needs to individually transmit a signal to each hybrid access mode cell, the control becomes complicated. Furthermore, the amount of signals transmitted between the core network (MMEs) and each cell increases. In order to solve these problems, in accordance with the present invention, there is provided a method of making a cell in the hybrid access mode belong to a certain TA, and making this cell broadcast one TAC to mobile terminals.

Figure 24:
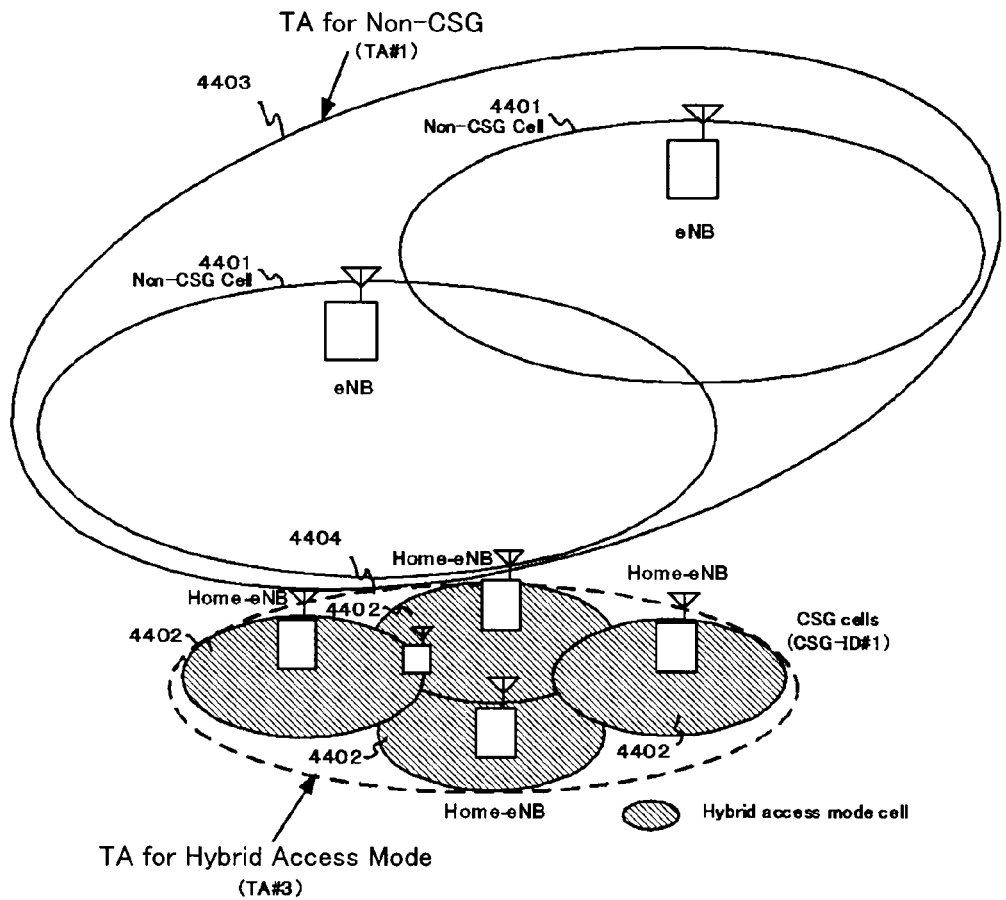
FIG. 24 is a conceptual diagram in a case of newly disposing a TA to which a hybrid access mode cell belongs.
Figure 25:
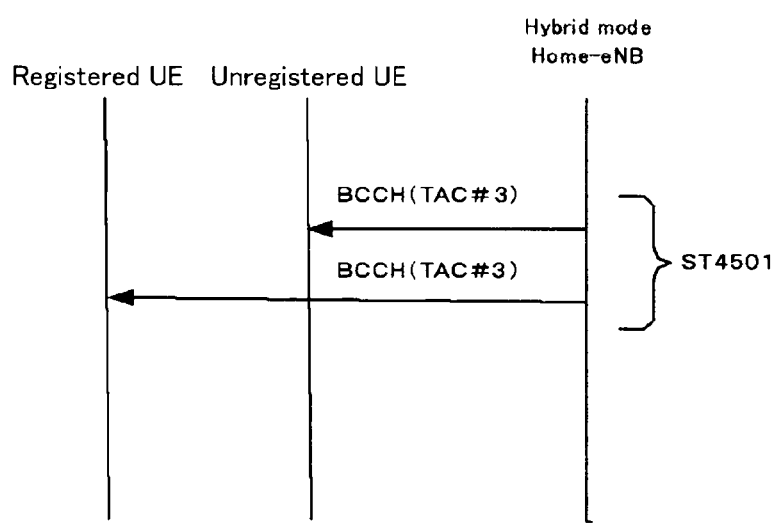
FIG. 25 is a view explaining a notification method of notifying a TAC from a hybrid access mode cell in accordance with Embodiment 5.

In accordance with this embodiment, as a TA to which a cell in the hybrid access mode belongs, TAs to which hybrid access mode cells can belong are newly disposed, each hybrid access mode cell is made to belong to one of these TAs, and broadcasts an identifier (TAC) of this TA to which the hybrid access mode cell belongs. FIG. 24 shows a conceptual diagram in the case of newly disposing a TA to which hybrid access mode cells can belong. 4401 denotes a non-CSG cell, and 4402 denotes a cell in the hybrid access mode. A TA for non-CSG cells is denoted by TA#1. Although each hybrid access mode cell (4402) is used also in the open access mode, this cell (4402) is made not to belong to a TA for non-CSG cells (TA#1 (4403)) in this embodiment. Because each hybrid access mode cell (4402) is used also in the closed access mode, this cell is also made not to belong to a TA corresponding to a CSG-ID#1 when the identifier of the CSG in this case is defined as the CSG-ID#1, for example. Then, a TA for hybrid access mode cells is newly disposed, and each hybrid access mode cell (4402) is made to belong to this TA (e.g., TA#3 (4404)). Next, a method of informing a TAC in accordance with this embodiment will be disclosed. An example of the method of informing a TAC from a hybrid access mode cell is shown in FIG. 25. Because each hybrid access mode cell belongs to the TA for hybrid access mode which is newly disposed, this cell, in ST4501, broadcasts only the TA identifier (TAC#3) of the above-mentioned TA for hybrid access mode to mobile terminals being served thereby while carrying the TA identifier on broadcast information. By doing in this way, as broadcast information from an arbitrary cell, in the case in which this cell is a cell operating only in the closed access mode, one TAC corresponding to the CSG-ID is broadcast to mobile terminals being served by the cell, in the case in which the cell is a hybrid access mode cell, one newly disposed TAC for hybrid access mode is broadcast to mobile terminals being served by the cell, or in the case in which this cell is a non-CSG cell, one TAC for non-CSG cells is broadcast to mobile terminals being served by the cell.

An example of an operation of a mobile terminal including from a cell search and a cell selection up to an idle mode operation will be shown below. A mobile terminal which has received a TAC broadcast from a selected cell carries out up to a process of ST4305 of FIG. 23 in the case of applying the conventional method in the same way. Unlike in the case of using the conventional method in ST4306 of FIG. 23, the mobile terminal determines whether or not this TAC is a TAC for hybrid access mode cells. It is preferable that an assigned range of TACs used for cells in the hybrid access mode is predetermined. By predetermining the range of TACs used for cells in the hybrid access mode, mobile terminals, HNBs, HeNBs, and the core network can share this TAC assignment information without signaling of this TAC assignment information and so on.

When the above-mentioned TAC is not a TAC for hybrid access mode cells, the mobile terminal can determine that the cell is a normal closed access mode cell or a normal open access mode cell, and then makes a transition to an operation in each of the modes. In contrast, when the above-mentioned TAC is a TAC for hybrid access mode cells, the mobile terminal can determine that the cell is a hybrid access mode cell, and therefore makes a transition to ST4307 shown in FIG. 23. The mobile terminal, in ST4307, determines whether the single TAC broadcast from the cell is the same as a TAC in the TA list stored therein, unlike in the case of applying the conventional method, and, when determining that the single TAC broadcast from this cell is the same as a TAC in the TA list, becomes able to make a transition to an idle mode operation for the cell. Even when determining that the single TAC broadcast from the cell is the same as any TAC in the TA list, the mobile terminal determines that it can access this cell, and can make a transition to an idle mode operation after TAU because the mobile terminal knows that the above-mentioned cell is a hybrid access mode cell from the determination of ST4306 of whether or not the above-mentioned TAC is a TAC for hybrid access mode cells. More specifically, when the cell which the mobile terminal has selected through the cell selection is a hybrid access mode cell, the mobile terminal becomes able to make a transition to an idle mode operation for the cell regardless of the presence or absence of a white list, or the presence or absence of a CSG-ID in the closed access mode of this cell.

Because the mobile terminal is enabled to recognize that the cell also supports the open access mode by thus disposing a TAC for hybrid access mode cells, the mobile terminal determines that it can access the cell regardless of the presence or absence of a white list and can make a transition to an idle mode operation after TAU. Also when the above-mentioned cell is a hybrid access mode cell, what is necessary is just to enable the mobile terminal to access this cell, to enable establishment of an RRC connection, and to enable transmission of a TAU request. The core network which has received the TAU request from this mobile terminal causes this mobile terminal to operate in the closed access mode when this mobile terminal is registered with a CSG in the closed access mode which is supported by hybrid access mode cells. In contrast, when the mobile terminal is not registered with the CSG, the core network causes this mobile terminal to operate in the open access mode which is supported by hybrid access mode cells. As mentioned above, because a TAC is disposed for hybrid access mode cells and each mobile terminal is enabled to access a hybrid access mode cell, the core network can determine whether to cause each mobile terminal to operate in the closed access mode or in the open access mode to receive a service which the core network provides in the closed access mode or in the open access mode and perform a setting according to the determination.

In this embodiment, by disposing a TAC for hybrid access mode cells, each mobile terminal becomes able to recognize that a cell in question also supports the open access mode. Therefore, each mobile terminal determines that it can access the cell regardless of the presence or absence of a white list. However, because each hybrid access mode cell is not assumed to be a non-CSG cell, when a mobile terminal does not have a white list or when a CSG-ID (TAC) in the white list differs from a TAC broadcast from the cell, there arises a problem that the mobile terminal is prohibited from accessing this cell. Hereafter, a method for solving this problem will be disclosed. A method of using a CSG indicator which is disclosed in Embodiment 6 and which a cell broadcasts while including the CSG indicator into broadcast information is applied to each hybrid access mode cell. In this embodiment, each cell in the hybrid access mode has a CSG indicator set to indicate that the cell is not a CSG. More specifically, each cell in the hybrid access mode sets a CSG indicator for a non-CSG cell. As a result, each mobile terminal becomes able to determine this cell as a non-CSG cell or a cell in the hybrid access mode, and this cell serves as a "suitable cell" and each mobile terminal can access this cell. As a result, each mobile terminal can make a request for an RRC connection with this cell, can establish an RRC connection with this cell, can make a TAU request, via this cell, of the core network and can receive a TAU receipt signal from the core network, and can make a transition to an idle mode operation.

Another method will be disclosed. The method disclosed in Embodiment 7 is applied to hybrid access mode cells. In a concrete example, when a cell operates in the hybrid access mode, regardless of the presence or absence of a white list in each mobile terminal or the presence or absence of the CSG-ID (TAC) of this cell in the white list, the cell allows each mobile terminal to access the cell as a "suitable cell". In order to determine whether or not a cell operates in the hybrid access mode, the TAC of a TA for hybrid access mode cells, which is disposed in this embodiment, is used. As a result, when a cell which a mobile terminal has selected by making a cell selection is a hybrid access mode cell, the mobile terminal can access the cell regardless of the presence or absence of a white list. As a result, the mobile terminal can make a request for an RRC connection with this cell, can establish an RRC connection with this cell, can make a TAU request, via this cell, of the core network and can receive a TAU receipt signal from the core network, and can make a transition to an idle mode operation.

The use of the first method mentioned above can provide an advantage of being able to solve the problem without changing the conventional access restricting method. The use of the second method mentioned above can provide an advantage of eliminating the necessity to provide a CSG indicator, allowing anything to be set as a CSG indicator regardless of the access restriction, or eliminating a CSG indicator. This problem arises similarly when broadcasting two TACs from each hybrid access mode cell by using the conventional method. In order to solve this problem, either of the above-mentioned two methods can be applied. In accordance with the second method, what is necessary to determine if the TAC of a TA for hybrid access mode cells is used in order to determine whether the cell operates in the hybrid access mode is just to determine whether or not two TACs are included in the SIB1 in order to determine whether or not the cell operates in the hybrid access mode. As a result, when the cell which the mobile terminal has selected by making a cell selection is a hybrid access mode cell, the mobile terminal can access the cell regardless of the presence or absence of a white list. The above-mentioned advantages are also provided.

The use of any one of the methods disclosed in this embodiment provides an advantage of enabling a mobile terminal which has selected a hybrid access mode cell to access the hybrid access mode cell regardless of the presence or absence of a white list in the mobile terminal itself while preventing an increase of the amount of signaling, a reduction in the use efficiency of the radio resources, further preventing the control by each MME and the control by each base station from becoming complicated, and also preventing an increase in the amount of signals transmitted between the core network (MMES) and each cell, these problems being shown as the ones arising in the case of applying the conventional method. Furthermore, because a TAC for hybrid access mode cells is newly disposed, each mobile terminal becomes able to determine whether the cell selected thereby is a hybrid access mode cell, a closed access mode cell or an open access mode cell by using the TAC, as mentioned above. Therefore, a hybrid access indicator, as will be mentioned below, showing either the hybrid mode or the closed mode becomes unnecessary. In order to define, as a TAC for hybrid access mode cells, a TAC which is transmitted from a cell in the hybrid access mode, there is no correspondence between the TAC and a CSG-ID in the case in which the cell is made to operate in the closed access mode. Therefore, when a mobile terminal displays the CSG-IDs of CSG cells which the mobile terminal has found when making a cell search on the screen thereof and the user makes a manual selection to select a cell having a desired CSG-ID from the CSG-IDs, for example, the user cannot make a manual selection to select a hybrid access mode cell which can be made to operate in the closed access mode. Therefore, in order to solve this problem, each hybrid access mode cell can broadcast its CSG-ID to mobile terminals being served thereby on broadcast information, separately. As a result, each hybrid access mode cell can be made to operate also in the closed access mode.

Embodiment 6

In order to solve the problem which arises in the case of applying the conventional method described in Embodiment 5, this embodiment discloses a method, which is different from that disclosed in Embodiment 5, of making a cell in a hybrid access mode belong to a single TA, and broadcast a single TAC. In the case of the method disclosed by Embodiment 5, when all cells in a CSG are set to be hybrid access mode cells, it is preferable to manage all the cells by using one MME or one HeNBGW. In contrast, when only some of all the cells are set to be hybrid access mode cells, it is preferable to dispose an MME or an HeNBGW for individually managing only the cells to manage these cells. However, when the number of hybrid access mode cells increases in this case, there arises a problem that the number of MMEs increases, and therefore the control becomes complicated and the management of TAs also becomes complicated. Furthermore, although some TAs to which hybrid access mode cells belong can be managed collectively by a single MME in order to reduce the number of MMEs, the TA is not suitable as a TA which transmits a paging signal in this case. Furthermore, in the case in which a range of TAs which are newly disposed for hybrid access mode and which are assigned to TA identifiers TAC is predetermined, it becomes unable to deal with a change in the number of hybrid access mode cells with flexibility. When informing semi-static assignment information to mobile terminals, a problem of when to inform the assignment information and from which cell the assignment information is informed arises in the notification method. In some cases, an increase in the control amount and an increase in the amount of signaling occur.

Figure 26:
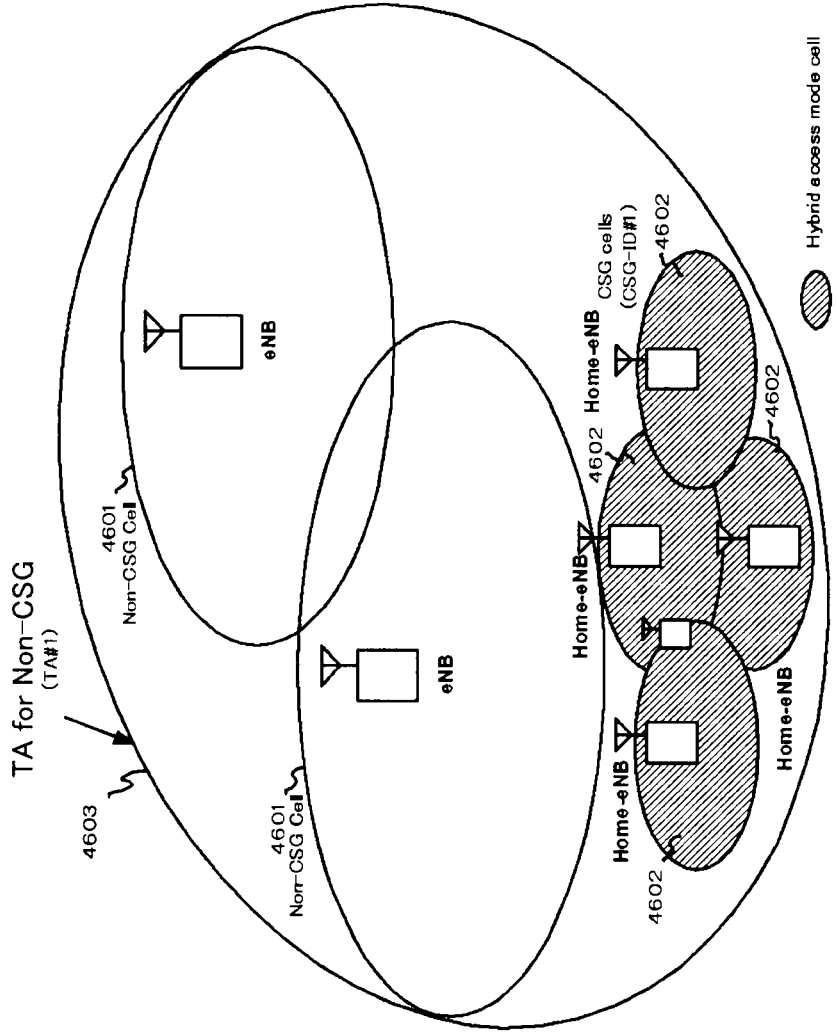
FIG. 26 is a conceptual diagram in a case of making a TA to which hybrid access mode cells belong to a TA for non-CSG cells.
Figure 27:
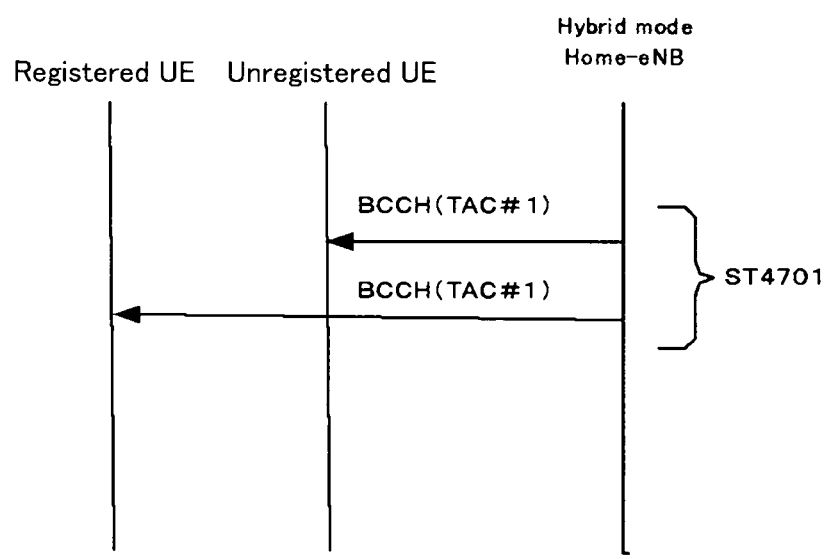
FIG. 27 is a view explaining a notification method of notifying a TAC from a hybrid access mode cell in accordance with Embodiment 6.

In this embodiment, in order to solve the problem in the case of applying the conventional method, and the problem which arises in above-mentioned Embodiment 5, a method of making a cell in the hybrid access mode belong to a TA for non-CSG cells, and then making the hybrid access mode cell broadcast an identifier (TAC) of this TA will be disclosed. A conceptual diagram in the case of making a cell in the hybrid access mode belong to a TA for non-CSG cells is shown in FIG. 26. 4601 denotes a non-CSG cell and 4602 denotes a cell in the hybrid access mode. A TA for non-CSG cells is denoted by TA#1. Although each hybrid access mode cell (4602) is used also in a closed access mode, this cell is also made not to belong to a TA corresponding to a CSG-ID#1 when the identifier of the CSG in this case is defined as the CSG-ID#1, for example. In accordance with the method disclosed in this embodiment, each hybrid access mode cell (4602) is made to belong to the TA for non-CSG cells (TA#1 (4603)). Next, a method of notifying a TAC in accordance with this embodiment will be disclosed. An example of the method of notifying a TAC from a hybrid access mode cell is shown in FIG. 27. Because the hybrid access mode cell belongs to the TA for non-CSG cells, this cell, in ST4701, broadcasts broadcast information to mobile terminals being served thereby by carrying only the single TA identifier (TAC#1) of this TA for non-CSG cells on the broadcast information. By doing in this way, an arbitrary cell broadcasts, as broadcast information therefrom, a single TAC corresponding to a CSG-ID to mobile terminals being served thereby when the cell operates only in the closed access mode, or broadcasts a single TAC for non-CSG cells to mobile terminals being served thereby when the cell is a non-CSG cell or a hybrid access mode cell.

Figure 28:
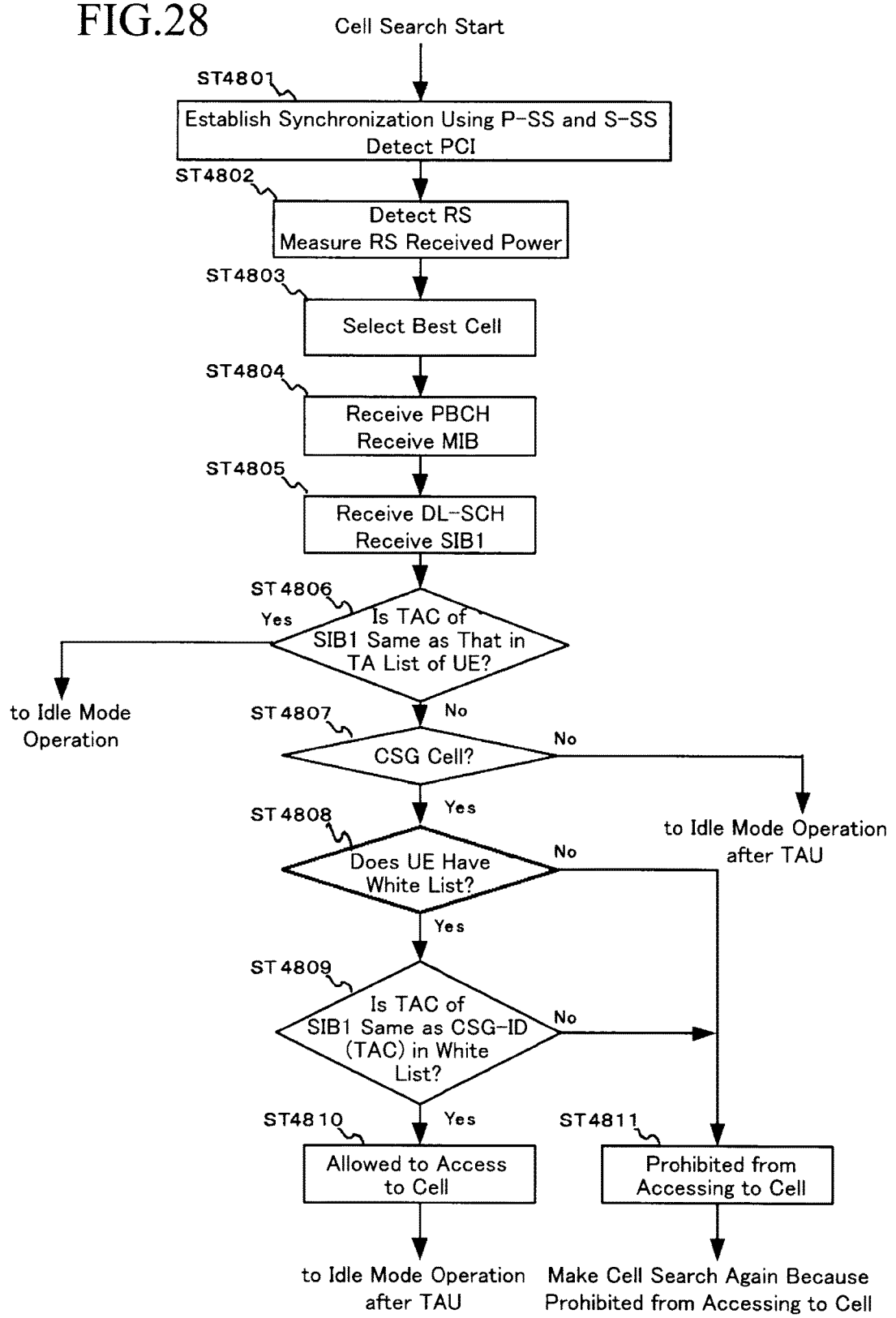
FIG. 28 is a view for explaining an operation of a mobile terminal including from a cell search and a cell selection up to an idle mode operation.

An example of an operation of a mobile terminal including from a cell search and a cell selection up to an idle mode operation in this embodiment will be shown in FIG. 28. Because steps of ST4801 to ST4806 are the same as those of ST1201 to ST1206 of FIG. 12, the explanation of these steps will be omitted hereafter. The mobile terminal which has received a TAC broadcast from the cell selected thereby makes a transition to ST4807 when, in ST4806, determining that the TAC in the SIB1 is not the same as a TAC in a TA list of the UE, and determines whether or not the above-mentioned cell is a CSG cell. The determination of whether or not the above-mentioned cell is a CSG cell is carried out by using a CSG indicator which has been proposed by the 3GPP, and which the cell broadcasts by including the indicator into broadcast information (nonpatent reference 10). In this embodiment, each cell in the hybrid access mode does has a CSG indicator set to indicate that the cell is not a CSG. More specifically, each cell in the hybrid access mode has a CSG indicator set to indicate that the cell is a non-CSG cell. For example, the CSG indicator is shown by 1 bit, and the CSG indicator is set to "1" when the cell is a CSG cell, whereas the CSG indicator is set to "0" when the cell is a non-CSG cell. In this case, when the cell is in the hybrid access mode, "0" showing that the cell is a non-CSG cell is set to the CSG indicator. As a result, the mobile terminal can determine whether or not the above-mentioned cell is a closed access mode cell. When, in ST4807, determining that the CSG indicator shows that the cell is not a CSG cell, the mobile terminal becomes able to determine this cell as a non-CSG cell or a cell in the hybrid access mode, and this cell serves as a "suitable cell" and the mobile terminal can access this cell. As a result, the mobile terminal can make a request for an RRC connection with this cell, can establish an RRC connection with this cell, can make a TAU request, via this cell, of the core network and can receive a TAU receipt signal from the core network, and can make a transition to an idle mode operation. The core network which has received the TAU request from this mobile terminal causes this mobile terminal to operate in the closed access mode when this mobile terminal is registered with a CSG in the closed access mode which is supported by the hybrid access mode cell. In contrast, when the mobile terminal is not registered with the CSG, the core network causes this mobile terminal to operate in an open access mode. As mentioned above, according to the method disclosed in this embodiment, the core network can determine whether to cause each mobile terminal to operate in the closed access mode or in the open access mode to receive a service which the core network provides in the closed access mode or in the open access mode and perform a setting according to the determination.

In contrast, when, in ST4807, determining that the CSG indicator shows that the cell is a CSG cell, the mobile terminal can determine that this cell is a cell in the closed access mode, and then makes a transition to ST4808. The mobile terminal, in ST4808, determines whether the mobile terminal has a white list, and, when having a white list, makes a transition to ST4809. The mobile terminal, in ST4809, determines whether or not the TAC of the SIB1 acquired in ST4805 is the same as a CSG-ID (TAC) in the white list. When the TAC of the SIB1 is the same as the CSG-ID in the white list, the mobile terminal makes a transition to ST4810. At this time, because the mobile terminal is allowed to access this cell, the mobile terminal makes a transition to an idle mode operation after TAU. In contrast, when, in ST4808, determining that the mobile terminal does not have a white list, or when, in ST4809, determining that the result of the comparison between the TACs shows that they are not the same, the mobile terminal makes a transition to ST4811, and then makes a transition to a cell search again because it is prohibited from accessing the cell.

The use of any one of the methods disclosed in this embodiment provides an advantage of enabling a mobile terminal which has selected a hybrid access mode cell to access the hybrid access mode cell regardless of the presence or absence of a white list in the mobile terminal itself while preventing an increase of the amount of signaling, a reduction in the use efficiency of the radio resources, further preventing the control by each MME and the control by each base station from becoming complicated, and also preventing an increase in the amount of signals transmitted between the core network (MMEs) and each cell, these problems being shown as the ones arising in the case of applying the conventional method. As a TAC which is transmitted from a cell in the hybrid access mode is a TAC for non-CSG, there is no correspondence between the TAC and a CSG-ID in the case in which the cell is made to operate in the closed access mode. Therefore, when a mobile terminal displays the CSG-IDs of CSG cells which the mobile terminal has found when making a cell search on the screen thereof and the user makes a manual selection to select a cell having a desired CSG-ID from the CSG-IDs, for example, the user cannot make a manual selection to select a hybrid access mode cell which can be made to operate in the closed access mode. Therefore, in order to solve this problem, each hybrid access mode cell can broadcast its CSG-ID to mobile terminals being served thereby on broadcast information, separately. As a result, each hybrid access mode cell can be made to operate also in the closed access mode.

As disclosed above, the core network can determine whether to cause each mobile terminal to operate in the closed access mode or in the open access mode to receive a service which the core network provides in the closed access mode or in the open access mode and perform a setting according to the determination. There can be a case in which each mobile terminal desires to give a higher priority to either the closed access mode or the open access mode. In such a case, if the core network determines and sets the mode in which the core network provides a service, each mobile terminal may not enter the mode to which the mobile terminal has given a higher priority. In order to solve this problem, each mobile terminal maps mode information showing the mode to which the mobile terminal desires to give a higher priority on either an RRC connection request or a TAU request, and transmits this request to the core network via a hybrid access mode cell. Concretely, information showing either open access mode priority or closed access mode priority can be used as the mode information, and can be 1 bit data which is set to either "1" showing the open access mode priority or "0" showing the closed access mode priority. By doing in this way, each mobile terminal informs the core network that it desires to use which one of the open access mode and the closed access mode on a priority basis, and the core network becomes able to determine the mode which it sets to the above-mentioned mobile terminal by using the mode information showing the mode to which the mobile terminal desires to give a higher priority. The method of setting the mode information showing the mode to which each mobile terminal desires to give a higher priority, and allowing each mobile terminal to inform the mode information to the core network can be applied not only to this embodiment, but also to a case in which one of the open access mode and the closed access mode each mobile terminal being served by a hybrid access mode cell uses on a priority basis is shown. For example, the above-mentioned method can also be applied to Embodiment 5 and Embodiment 7.

In this embodiment, when all cells in a CSG are set to be hybrid access mode cells, by making all the cells belong to an identical TA for non-CSGs, it becomes able to manage this TA by using one MME or one HeNBGW. Furthermore, also when only some of all the cells are set to be hybrid access mode cells, by making some of all the cells belong to a TA for neighboring non-CSG cells, it is necessary to dispose neither an MME nor an HeNBGW separately, and therefore it becomes able to manage them by using an existing MME or HeNBGW. Therefore, there is provided an advantage of preventing a problem that the number of MMEs increases and the control and management of TAs become complicated from arising. There is provided another advantage of being able to make a TA in which a paging signal is transmitted be suitable as an area in which a paging signal is transmitted by making each hybrid access mode cell belong to the TA for neighboring non-CSG cells. Furthermore, it is not necessary to predetermine a range of TAs which are newly disposed for hybrid access mode and which are assigned to TA identifiers, unlike in the case of Embodiment 5, and each hybrid access mode cell has only to broadcast the TAC to mobile terminals being served thereby by using the broadcast information. Therefore, the use of the TA can be achieved with flexibility.

Embodiment 7

In this embodiment, a method of making a cell in a hybrid access mode (Hybrid access mode) belong to a single TA, and also making this cell broadcast a single tracking area code (Tracking Area Code TAC), which differs from those in accordance with Embodiment 5 and Embodiment 6, will be disclosed. In this embodiment, in order to solve the problem arising in the case of applying the conventional method, a method of making a cell in the hybrid access mode belong to a TA for non-CSG cells, and then making the hybrid access mode cell broadcast an identifier (TAC) of this TA will be disclosed. Furthermore, in the case of using the method disclosed by Embodiment 5 or Embodiment 6, the tracking area code broadcast from a cell in the hybrid access mode to mobile terminals being served by the cell is not the TAC which is brought into correspondence with a CSG-ID. Therefore, when a CSG-ID is required separately, the CSG-ID has to be broadcast in addition to the TAC while being carried on the broadcast information. Therefore, the broadcast information from this cell increases by this CSG-ID, and therefore the amount of signaling increases. Furthermore, in the case of using the method disclosed by Embodiment 6, non-CSG cells each of which is not a hybrid access mode cell can be made to belong to the same TA. In such a case, a paging signal destined for mobile terminals each of which is made to operate in a closed access mode in a hybrid access mode cell is transmitted not only to the cell in the hybrid access mode but also to all the non-CSG cells belonging to the same TA. Therefore, the load for transmitting the paging signal increases in the system, and the use efficiency of the radio resources is reduced. Furthermore, although some cells in a CSG can be set to the hybrid access mode, in this case there arises a problem that communications of information are required between an MME for managing a TA to which hybrid access mode cells and non-CSG cells belong and an MME for managing CSG cells, and therefore the amount of communications increases.

Figure 29:
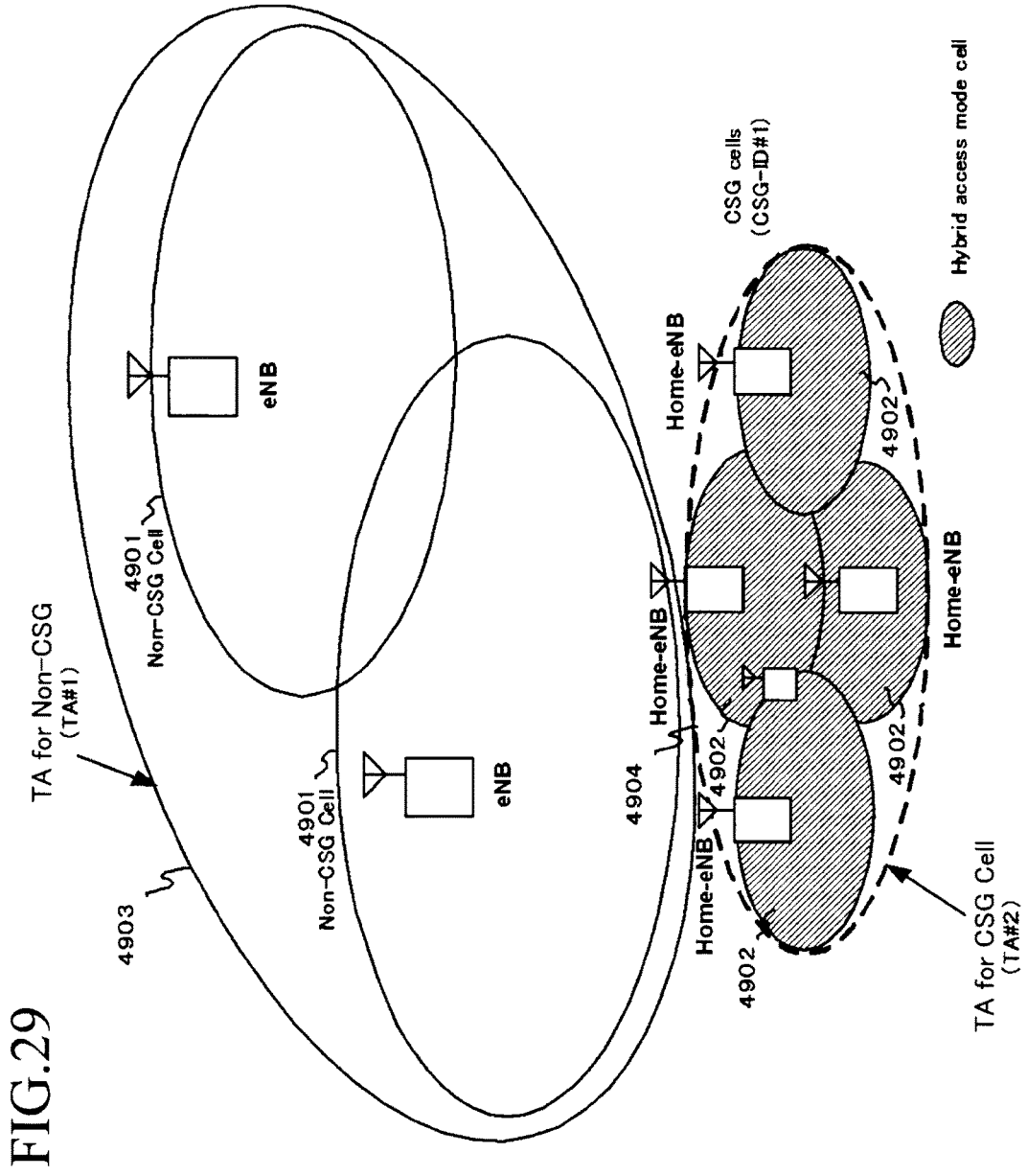
FIG. 29 is a conceptual diagram in a case of making a TA to which hybrid access mode cells belong to a TA for CSG cells.
Figure 30:
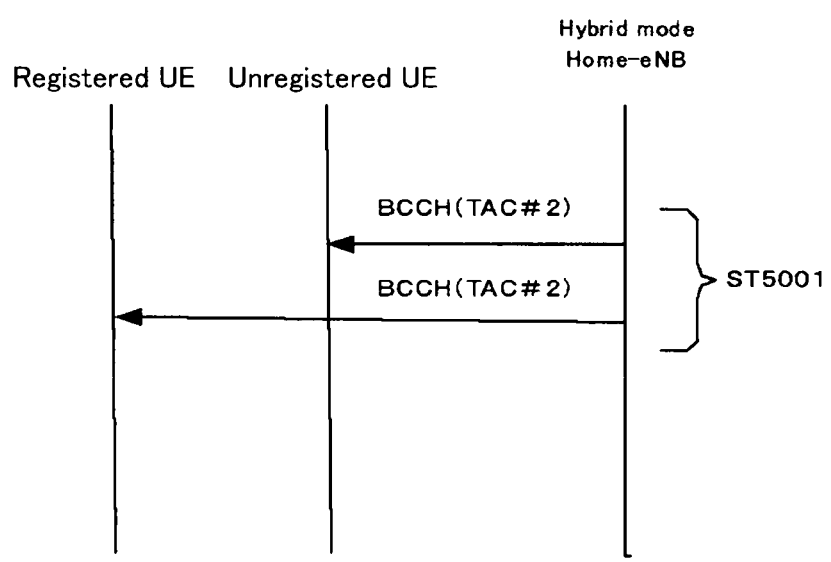
FIG. 30 is a view explaining a notification method of notifying a TAC from a hybrid access mode cell in accordance with Embodiment 7.

In this embodiment, in order to solve the problem previously explained, the method of making a cell in the hybrid access mode belong to a TA for CSG cells, and then making the hybrid access mode cell broadcast an identifier (TAC) of this TA will be disclosed. An example of the case of making a cell in the hybrid access mode belong to a TA for CSG cells will be shown in FIG. 29. 4901 denotes a non-CSG cell and 4902 denotes a cell in the hybrid access mode. A TA for non-CSG cells is denoted by TA#1 (4903). Although each hybrid access mode cell (4902) is used also in an open access mode, this cell is also made to belong to a TA (TA#2) (4904) corresponding to a CSG-ID#1 when the identifier of the CSG in the case in which the cell is used also in the closed access mode is defined as the CSG-ID#1. Next, a method of informing a TAC in accordance with this embodiment will be disclosed. An example of the method of informing a TAC from a hybrid access mode cell will be shown in FIG. 30. Because the hybrid access mode cell belongs to the TA for CSG cells, this cell, in ST5001, broadcasts broadcast information to mobile terminals being served thereby by carrying only the single TA identifier (TAC#2) of this TA for CSG cells on the broadcast information. By doing in this way, an arbitrary cell broadcasts, as broadcast information therefrom, a single TAC corresponding to a CSG-ID to mobile terminals being served thereby when the cell operates only in the closed access mode or is a hybrid access mode cell, or broadcasts a single TAC for non-CSG cells to mobile terminals being served thereby when the cell is a non-CSG cell.

Because an example of a flow chart showing an operation performed by a mobile terminal including up to an idle mode operation when each cell in the hybrid access mode belongs to a TA to which a CSG at the time of the closed access mode belongs is the same as that shown in FIG. 28, the operation will be explained with reference to FIG. 28. Because steps of ST4801 to ST4806 are the same as those of ST1201 to ST1206 of FIG. 12, the explanation of the steps will be omitted hereafter. The mobile terminal which has received a TAC broadcast from a cell selected thereby makes a transition to ST4807 when, in ST4806, determining that the TAC in the SIB1 is not the same as a TAC in a TA list of the UE, and determines whether or not the above-mentioned cell is a CSG cell. The determination of whether or not the above-mentioned cell is a CSG cell can be carried out by using a CSG indicator which has been proposed by the 3GPP, and which the cell broadcasts by including the indicator into the broadcast information. In this embodiment, each cell in the hybrid access mode sets a CSG indicator for a CSG. More specifically, each cell in the hybrid access mode sets a CSG indicator for CSG cells. For example, the CSG indicator is shown by 1 bit, and "1" is set to the CSG indicator when the cell is a CSG cell, whereas "0" is set to the CSG indicator when the cell is a non-CSG cell. In this case, when the cell is in the hybrid access mode, "1" showing that the cell is a CSG cell is set to the CSG indicator. As a result, the mobile terminal can determine whether or not the above-mentioned cell is an open access mode cell. In this embodiment, when, in ST4807, determining that the CSG indicator shows that the cell is a non-CSG cell, the mobile terminal makes a transition to a branch shown by No in the figure, and then transmits a TAU request to a core network via this cell and makes a request to change the TA. The core network updates the TA on the basis of the identification number of the mobile terminal, and transmits a TAU receipt signal to the mobile terminal. The mobile terminal which has received the TAU receipt signal rewrites (updates) the TA list (or the TAC or a TAC list) held thereby according to the TAC of the cell. After that, the mobile terminal starts the idle mode operation for this cell.

When, in ST4807, determining that the CSG indicator shows that the cell is a CSG cell, the mobile terminal can determine that the cell is a cell in the hybrid access mode that supports the closed access mode or a cell in the closed access mode, and then makes a transition to ST4808. The mobile terminal, in ST4808, determines whether the mobile terminal itself has a white list. When determining that the mobile terminal itself has a white list, the mobile terminal, in ST4809, compares the TAC (CSG-ID) included in the SIB1 received thereby with each TAC (CSG-ID) in the white list which the mobile terminal has. When comparing the TAC (CSG-ID) included in the SIB1 with each TAC (CSG-ID) in the white list and then finding the same TAC in the white list, the mobile terminal, in ST4810, determines that the above-mentioned CSG cell is a "suitable cell" (suitable cell), and is allowed to access this CSG cell. The mobile terminal which is allowed to access the cell transmits a TAU request to the core network via this cell, and then makes a request to change the TA. After performing the transmission of the TAU request and then receiving a TAU receipt signal, the mobile terminal rewrites the TA list, and, after that, starts an idle mode operation for this cell.

In contrast, when the result of the comparison of ST4809 between the TAC (CSG-ID) included in the SIB1 received thereby and each TAC (CSG-ID) in the white list which the mobile terminal has shows that the same TAC as that included in the SIB1 does not exist in the white list, the mobile terminal, in ST4810, determines that the above-mentioned CSG cell is not a "suitable cell", and is prohibited from accessing this CSG cell. This is because useless access from the mobile terminal to the CSG cell, e.g., a request to establish an RRC connection and transmission of a TAU request needs to be eliminated to eliminate needless use of the radio resources. It is assumed that a large number of CSG cells will be installed in a mobile communication system, such as LTE or UMTS, in the future. When a mobile terminal does not have a white list at the time of searching for a CSG cell, or when only CSG-IDs different from the CSG-ID of the cell which the mobile terminal has searched for exist in the white list, that is, when this mobile terminal has not been registered with this CSG, the mobile terminal is not allowed to access this CSG cell after all even if an allowance to access this CSG cell is provided for the mobile terminal. For example, an RRC establishment rejection (reject) signal or a TAU rejection (reject) signal is transmitted from this CSG cell or the network to the mobile terminal, and radio resources are needlessly used simply. When the number of CSG cells increases in the future, such needless use of radio resources becomes a problem in the system. Therefore, when a mobile terminal does not have a white list at the time of searching for a CSG cell, or when only CSG-IDs different from the CSG-ID of the cell which the mobile terminal has searched for exist in the white list, as mentioned above, the mobile communication system prohibits the mobile terminal from accessing this CSG cell by setting this CSG cell not to be a "suitable cell". Therefore, the mobile terminal which is, in ST4811, prohibited from accessing the above-mentioned cell with this cell being set not to be a "suitable cell" cannot access the cell and has to make a cell search again. Furthermore, also when the mobile terminal, in ST4808, determines that the mobile terminal itself does not have a white list, the mobile terminal, in ST4811, is prohibited from accessing the cell because this cell is set not to be a "suitable cell". Also in this case, the mobile terminal cannot access the cell and has to make a cell search again.

As mentioned above, when a cell in the hybrid access mode is not assumed to be a non-CSG cell or when a cell in the hybrid access mode is assumed to be a CSG cell, there arises a problem that a mobile terminal which does not have a white list or which does not have the CSG-ID (TAC) of the cell in the hybrid access mode even if the mobile terminal has a white list cannot access this cell in the hybrid access mode, though this cell in the hybrid access mode supports the open access mode. For example, in this embodiment, when the CSG indicator broadcast from this hybrid access mode cell is set to "1" showing that the cell is a CSG cell, the cell is assumed to be a CSG cell. Therefore, the problem described above arises. This problem arises not only in this embodiment but also in the case in which the cell in the hybrid access mode is not assumed to be a non-CSG cell or the cell in the hybrid access mode is assumed to be a CSG cell.

Figure 31:
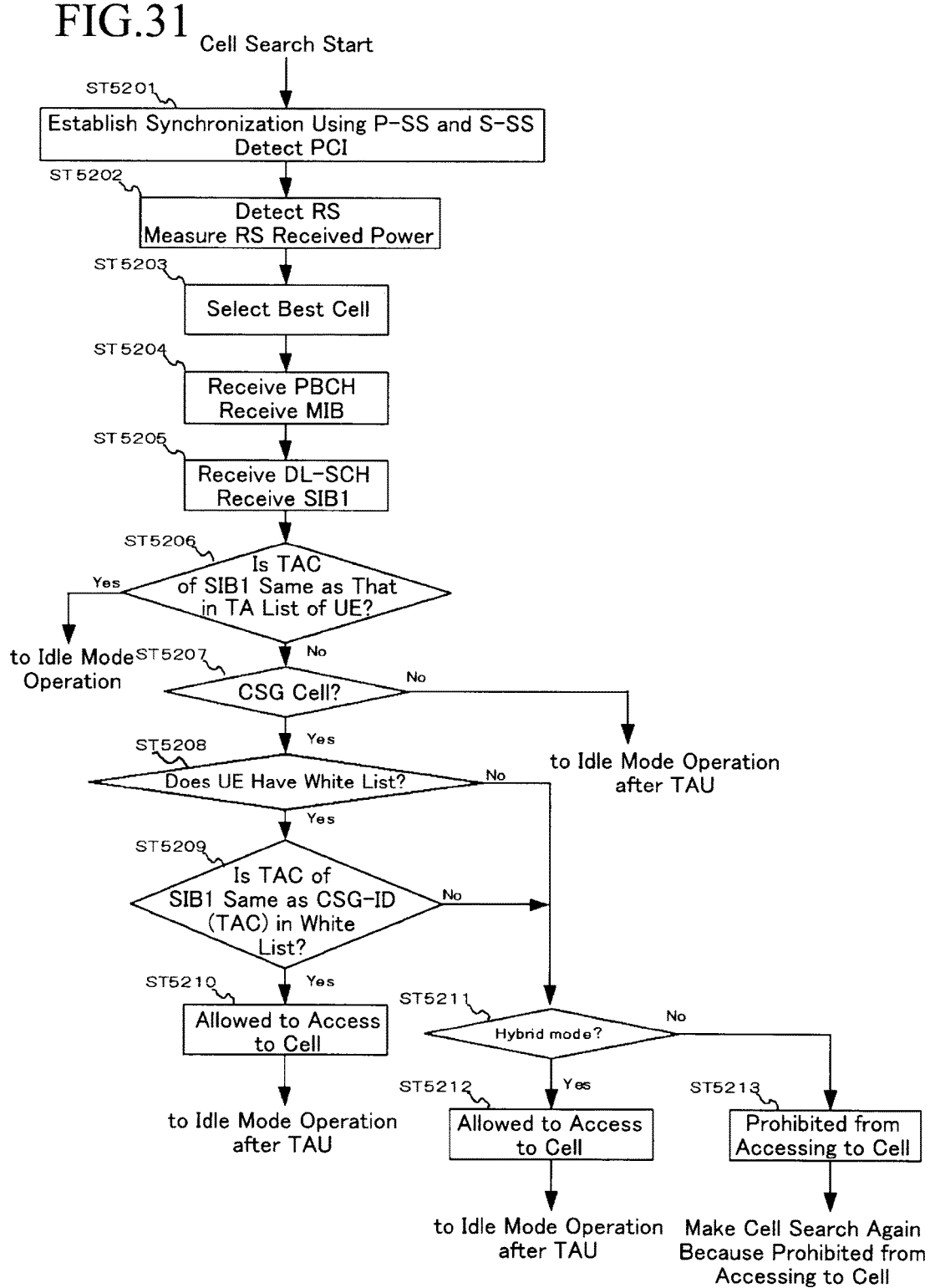
FIG. 31 is a flow chart of an operation of a mobile terminal in accordance with Embodiment 7 including up to an idle mode operation on which an access restriction is imposed.

In order to solve this problem, a restriction imposed on access to this cell is determined by using mode information about the cell. In order to solve this problem, a restriction imposed on access to this cell is alternatively determined by using TAC (CSG-ID) information included in broadcast information and mode information about the cell. In a concrete example of the access restriction, when the mode information about the cell shows the hybrid access mode, the cell is determined to be a "suitable cell" and access to this cell is allowed regardless of the presence or absence of a white list in the mobile terminal, or the presence or absence of the CSG-ID (TAC) of the cell in the white list. In contrast, when the mode information about the cell does not show the hybrid access mode, a conventional access restriction is imposed on access to the cell. As a result, the problem that though a cell in the hybrid access mode supports the open access mode, a mobile terminal cannot access the cell in the hybrid access mode can be solved. An example of a flow chart showing an operation performed by a mobile terminal including up to an idle mode operation is shown in FIG. 31. As shown in this figure, steps in ST5211 to ST5213 of FIG. 31 differ from the step in ST4811 and the subsequent steps in the flow chart shown in FIG. 28. The different portions will be explained mainly. The mobile terminal, in ST5209, compares a TAC (CSG-ID) included in an SIB1 received thereby with each TAC (CSG-ID) in the white list which the mobile terminal has. When comparing the TAC (CSG-ID) included in the SIB1 with each TAC (CSG-ID) in the white list and then finding the same TAC in the white list, the mobile terminal, in ST5210, determines that a CSG cell in question is a "suitable cell", and is allowed to access this CSG cell. The mobile terminal which is allowed to access the cell transmits a TAU request to the core network via this cell, and then makes a request to change the TA. After performing the transmission of the TAU request and then receiving a TAU receipt signal, the mobile terminal rewrites the TA list, and, after that, starts an idle mode operation for this cell.

In contrast, when the result of the comparison of ST5209 between the TAC (CSG-ID) included in the SIB1 received thereby and each TAC (CSG-ID) in the white list which the mobile terminal has shows that the same TAC as that included in the SIB1 does not exist in the white list, or when, in ST5208, determining that the mobile terminal does not have a white list, the mobile terminal, in ST5211, determines whether or not the above-mentioned CSG cell is in the hybrid access mode. In this embodiment, when the mode information about the cell shows the hybrid access mode, in order to allow access to this cell as a "suitable cell" regardless of the presence or absence of a white list in the mobile terminal, or the presence or absence of the CSG-ID (TAC) of the cell in the white list, the mobile terminal, in ST5212, is allowed to access the cell. The mobile terminal which is allowed to access the cell carries out transmission of a TAU request to the core network, reception of a TAU receipt signal, and rewriting of the TA list via this cell, and, after that, starts an idle mode operation for this cell.

The mobile terminal, in ST5211, determines whether or not this cell is in the hybrid access mode, and, when the mode information about the cell does not show the hybrid access mode, determines this cell not to be a "suitable cell" because the mobile terminal does not have a white list or the CSG-ID (TAC) of this cell does not exist in the white list due to the conventional access restriction. Therefore, the mobile terminal, in ST5213, is prohibited from accessing the cell, and has to make a cell search again.

As mentioned above, each mobile terminal according to this embodiment can access a cell in the hybrid access mode regardless of the presence or absence of a white list in the mobile terminal, or the presence or absence of the CSG-ID (TAC) of the cell in the hybrid access mode in the white list. As a result, each mobile terminal can carry out transmission of a TAU request to the core network, reception of a TAU receipt signal, and rewriting of the TA list thereof via the cell in the hybrid access mode, and, after that, can start an idle mode operation for the cell in the hybrid access mode.

Figure 32:
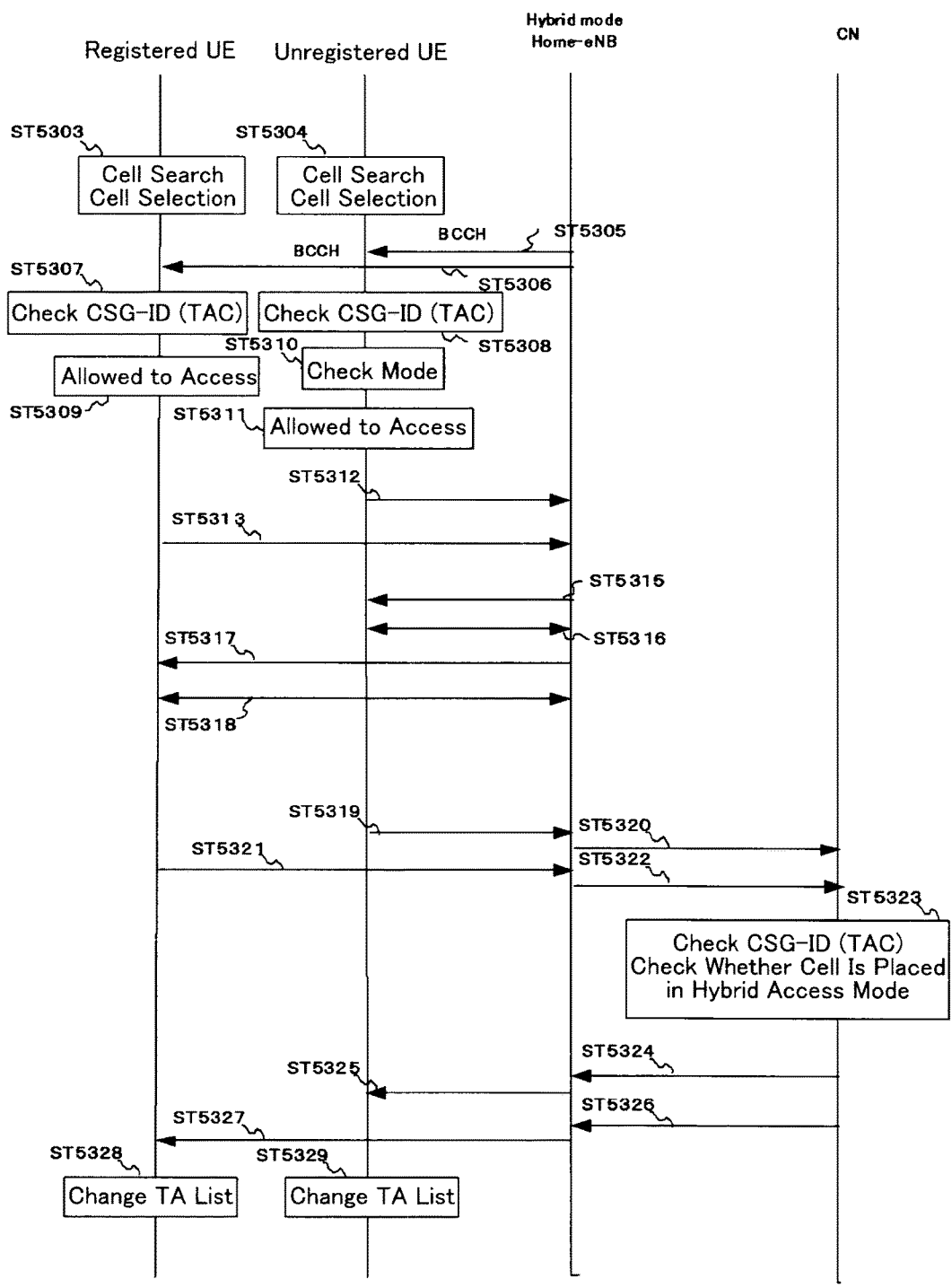
FIG. 32 is a view showing a sequence of a mobile terminal including up to reception of a TAU receipt signal (TAU accept)

An example of a sequence including up to a step of a mobile terminal receiving a TAU receipt signal (a TAU accept) in this embodiment is shown in FIG. 32. A mobile terminal which has been registered for user access to a cell in the hybrid access mode (i.e., a registered mobile terminal)

and a mobile terminal which has not been registered for user access to a cell in the hybrid access mode (i.e., an unregistered mobile terminal) are shown in the figure. The registered mobile terminal and the unregistered mobile terminal carry out a cell search and a cell selection in ST5303 and ST5304, respectively, to select the cell in the hybrid access mode. The registered mobile terminal and the unregistered mobile terminal receive broadcast information from this cell in ST5305 and ST5306, respectively. The registered mobile terminal and the unregistered mobile terminal which has received the broadcast information check the CSG-ID (TAC) of this cell included in the broadcast information in ST5307 and ST5308, respectively. Each of them carries out this check by operating in the same way that a mobile terminal operates in the steps of ST5206 to ST5209 shown in FIG. 31 to compare the CSG-ID (TAC) included in the broadcast information received thereby with each CSG-ID (TAC) in the white list Because the registered mobile terminal is allowed to access the cell (ST5309), the registered mobile terminal, in ST5313, transmits an RRC connection establishment request (RRC Connection Request) to the cell. In contrast, the unregistered mobile terminal, in ST5310, carries out a mode check. Because the selected cell is a cell in the hybrid access mode, the unregistered mobile terminal is allowed to access the cell, too (ST5311), and, in ST5313, transmits an RRC connection establishment request (RRC Connection Request) to the cell. The cell that has received the RRC connection establishment request from each of the mobile terminals transmits an RRC connection accept signal (RRC Connection Accept) to each of the mobile terminals in ST5315 and ST5317. As a result, as shown in ST5316 and ST5318 (RRC Connection Establishment), an RRC connection is established between each of the registered mobile terminal and the unregistered mobile terminal, and the cell. The mobile terminals with which RRC connections have been established transmit TAU requests to the core network (CN) (an MME and an HeNBGW) via this cell in ST5319 and ST5320, and ST5321 and ST5322, respectively. At this time, a mobile terminal identifier (a mobile terminal identification number, a mobile terminal identification code, UE-ID, IMSI, or the like) is carried on the TAU request from each of the mobile terminals. Furthermore, an identifier (a cell identification number, a cell identification code, Cell-ID, GCI, or the like) of the cell is carried on each TAU request (ST5320, ST5322) from this cell to the core network. The core network, in ST5323, checks whether or not each of the mobile terminals is included in the CSG-ID of the CSG to which this cell belongs on the basis of the TAU request transmitted from each of the mobile terminals and the mobile terminal identifier included in the TAU request.

At this time, the core network also checks whether or not the cell which has transmitted this TAU thereto is a cell in the hybrid access mode. In the case in which the cell is a cell in the hybrid access mode, the core network transmits the TAU accept signal to each of the mobile terminals regardless of the presence or absence of a white list in each of the mobile terminals which has transmitted the TAU request, or the presence or absence of the CSG-ID (TAC) of the cell in the hybrid access mode in the white list. The core network can inform TA list information to each of the mobile terminals while including the TA list information in the TAU accept signal. As an alternative, the core network can inform the TA list to each of the mobile terminals by using a NAS message different from the TAU accept signal. The core network which has received the TAU from each of the mobile terminals makes this mobile terminal operate in the closed access mode when this mobile terminal has been registered with a CSG in the closed access mode which is supported by hybrid access mode cells. Otherwise, the core network makes the mobile terminal operate in the open access mode. As mentioned above, according to the method disclosed in this embodiment, the core network can determine whether to cause each mobile terminal to operate in the closed access mode or in the open access mode to receive a service which the core network provides in the closed access mode or in the open access mode and perform a setting according to the determination. When the cell is not a cell in the hybrid access mode, the core network checks whether or not each mobile terminal is included in the CSG-ID of the CSG to which this cell belongs, like in the case of a conventional mobile communication system, and, when the mobile terminal is included in the CSG-ID of the CSG to which this cell belongs, transmits a TAU accept signal to the mobile terminal, whereas when the mobile terminal is not included in the CSG-ID of the CSG to which this cell belongs, the core network transmits a TAU reject signal to the mobile terminal. In the example shown in the figure, because the cell is a hybrid access mode cell, the core network, in ST5323, grants (accepts) the TAU request from each of the mobile terminals regardless of the presence or absence of a white list in each of the mobile terminals, or the presence or absence of the CSG-ID (TAC) of the cell in the hybrid access mode in the white list, and then transmits a TAU accept signal to each of the mobile terminals via the cell (ST5324 and ST5325, and ST5326 and ST5327, TAU Accept (notification of the TA list)). The mobile terminals which have received the TAU accept signal update the TA list received from the core network in ST5328 and ST5329, respectively.

By doing in the above-disclosed way, a hybrid access mode cell can be used as a cell in the open access mode, each mobile terminal can access this cell regardless of the presence or absence of a white list in the mobile terminal, or the presence or absence of the CSG-ID (TAC) of the cell in the hybrid access mode in the white list, can also establish an RRC connection, can further carry out transmission of a TAU request signal, reception of a TAU accept signal, and reception of a TA list, and can rewrite the TA list. Furthermore, after that, each mobile terminal can start an idle mode operation for this cell.

Figure 33:
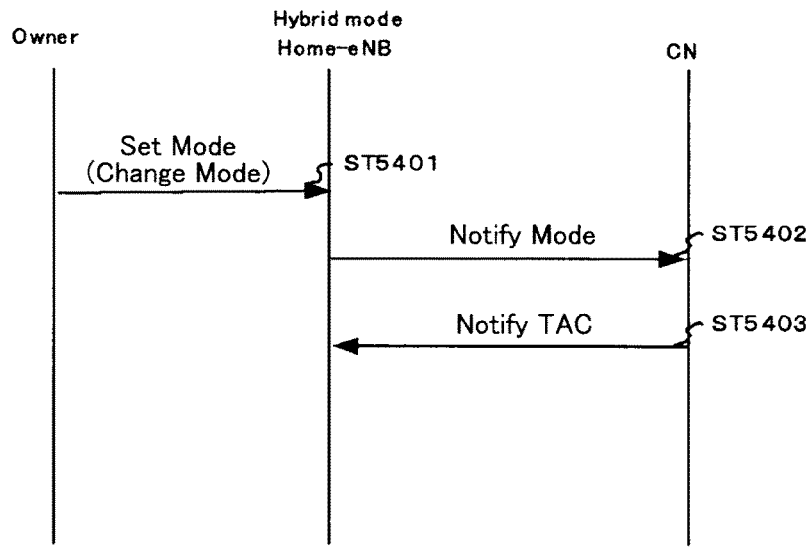
FIG. 33 is a view showing a method of determining an access mode which is executed by the owner of an HNB or HeNB.

As disclosed in FIG. 32, the core network, in ST5323, also checks whether or not the cell which has transmitted the TAU request thereto is a cell in the hybrid access mode. In the case in which the mode which is determined when the cell is installed for the first time is used as the mode of this cell, the core network can carry out the above-mentioned check by simply inputting the mode to the core network in advance. However, it is required that the mode of this cell can be changed with flexibility. In this embodiment, a mode setting method in the case of enabling a change in the mode setting with flexibility, and a method of determining whether or not the cell which has transmitted the TAU request to the core network (an MME and an HeNBGW) is a cell in the hybrid access mode will be disclosed. In ST5320 and ST5322, the mode information about a cell is provided on the TAU request signal to be transmitted to the core network via the cell in the hybrid access mode. By doing in this way, the core network can also check whether or not the cell which has transmitted the TAU request is a cell in the hybrid access mode. Another method will be shown below. In FIG. 33, the case in which the owner of an HNB or an HeNB determines the access mode will be disclosed. The owner, in ST5401, makes a mode setting for the HeNB (or can make a mode setting for the HNB). The HeNB for which a mode setting has been made informs the mode set in ST5402 to the core network. The core network to which the set mode is informed determines to which TA this cell belongs according to the set mode, and, in ST5403, informs the TAC to this cell. The core network can inform the mode and the TAC to the cell by using a NAS message. As an alternative, the core network can inform the mode and the TAC to the cell via a broadband channel or the like. As a result, the core network becomes able to recognize to which mode this cell is set. Furthermore, the TAC according to the set mode is assigned to the cell from the network.

Figure 34:
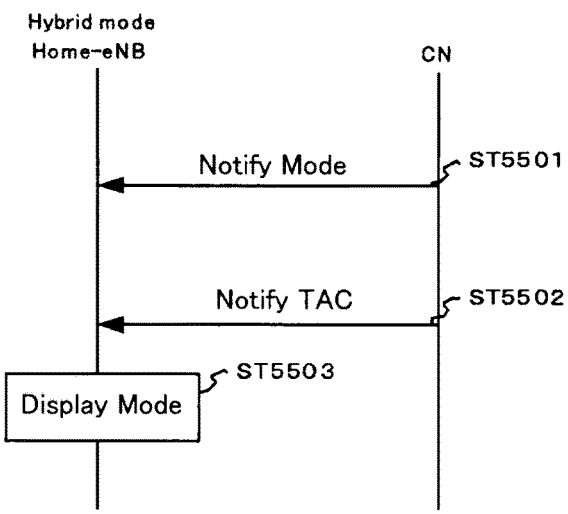
FIG. 34 is a view showing a method of making a mode setting of a cell which is executed by a network operator.

A method which is used in the case in which a network operator makes a mode setting for the cell will be disclosed in FIG. 34. The network operator, in ST5501, informs the set mode from the network to this cell. The network also determines the TA to which this cell belongs according to the mode which the network operator has set, and then, in ST5502, informs the TAC of this TA to the cell. The core network can inform the mode and the TAC to the cell by using a NAS message. As an alternative, the core network can inform the mode and the TAC to the cell via a broadband line. Each of the methods disclosed in FIGS. 33 and 34 is performed before the cell transmits the TAC by using broadcast information for the first time. For example, each of the methods disclosed in FIGS. 33 and 34 is performed when making an initial setting after the HeNB or the HNB has been installed. Furthermore, it is preferable that after any one of the methods disclosed in FIGS. 33 and 34 is executed, the broadcast information which the cell broadcasts is changed and the changed broadcast information is transmitted while the TAC included in the above-mentioned broadcast information is replaced by the TAC informed from the core network and this TAC is transmitted instead. By using any one of the methods disclosed in FIGS. 33 and 34, the core network, in ST5323, becomes able to also check whether or not the cell which has transmitted the TAU request thereto is a cell in the hybrid access mode, as disclosed in FIG. 32. Furthermore, each of these methods can be applied also to a mode setting which is made when the cell is installed for the first time. In accordance with any one of the methods disclosed in this embodiment, all the cells in one CSG can be set to the same mode, or the same mode can be set only to one or more cells in one CSG. By applying any one of the methods disclosed above to these cases, a mode setting (mode change) can be made for a cell which is the target for the mode setting (mode change) with flexibility, and the core network becomes able to recognize the mode of this cell.

The use of any one of the methods disclosed in this embodiment provides an advantage of enabling a mobile terminal which has selected a hybrid access mode cell to access the hybrid access mode cell regardless of the presence or absence of a white list in the mobile terminal itself while preventing an increase of the amount of signaling, a reduction in the use efficiency of the radio resources, further preventing the control by each MME and the control by each base station from becoming complicated, and also preventing an increase in the amount of signals transmitted between the core network (MMEs) and each cell, these problems being shown as the problems arising in the case of applying the conventional method. In addition, because a cell in the hybrid access mode belongs to the TA of a CSG, the TAC broadcast from this cell to mobile terminals being served by the cell is intended for the CSG, and is brought into correspondence with the CSG-ID. Therefore, if the TAC is transmitted, as broadcast information, from the cell, it becomes unnecessary to transmit the CSG-ID separately. As a result, there is provided an advantage of preventing an increase in the amount of signaling. Furthermore, each hybrid access mode cell belongs to the TA of a CSG. Therefore, a cell included in this CSG can transmit a paging signal to mobile terminals being served thereby therefrom. Therefore, there is provided an advantage of being able to prevent an increase in the load of paging signals on the system. Furthermore, as previously mentioned, some cells in one CSG can be set to the hybrid access mode, or all the cells can be set to the hybrid access mode. Therefore, there is provided an advantage of being able to carry out flexible management of the modes of cells.

Embodiment 8

In Embodiment 7, it is disclosed that the TA of a hybrid access mode cell is set to the one to which a CSG at the time when the cell is in the closed access mode belongs, and a restriction imposed on access to this cell is determined by using TAC (CSG-ID) information included in broadcast information and mode information about the cell. It is further disclosed that as a concrete example of the method of determining the access restriction, when the mode information about the cell shows the hybrid access mode, each mobile terminal is allowed to access this cell as a "suitable cell" regardless of the presence or absence of a white list in the mobile terminal, or the presence or absence of the CSG-ID (TAC) of the cell in the white list, whereas when the mode information about the cell does not show the hybrid access mode, a conventional access restriction is imposed on access to the cell. In this embodiment, a method of using, as the mode information about a cell, a hybrid access indicator included in broadcast information from this cell in the method of determining the access restriction which is disclosed as a concrete example of Embodiment 7 will be disclosed.

In the 3GPP, a concrete example of a service in each access mode of a cell has been examined. A concrete example of a service in the closed access mode will be shown below. By allowing only a registered mobile terminal to access the cell, the amount of radio resources which this mobile terminal can use is increased so as to enable the mobile terminal to carry out communications at a high speed. An operator sets a higher than normal charge according to the increase. The service is thus provided. In contrast, a cell in the hybrid access mode provides simultaneously both a service in the closed access mode and a service in the open access mode. In this case, only a registered mobile terminal is not necessarily allowed to access the cell. A mobile terminal in the open access mode uses the radio resources of this cell, too. Therefore, the transmission rate in the closed access mode in a cell in the hybrid access mode becomes lower than that in a closed access mode cell. The operator sets a lower than normal charge according to this reduction. Such proper use of the different services has been studied. Therefore, each mobile terminal needs to be able to determine whether to further select a closed access mode cell or a hybrid access mode cell from among cells which the mobile terminal has found and selected through a cell search and a cell selection. Therefore, in the 3GPP, a method of carrying an indicator (hybrid access indicator) showing that the access mode of a cell is hybrid or closed on broadcast information, and broadcasting this broadcast information to mobile terminals being served by the cell has been proposed (nonpatent reference 9).

Figure 35:
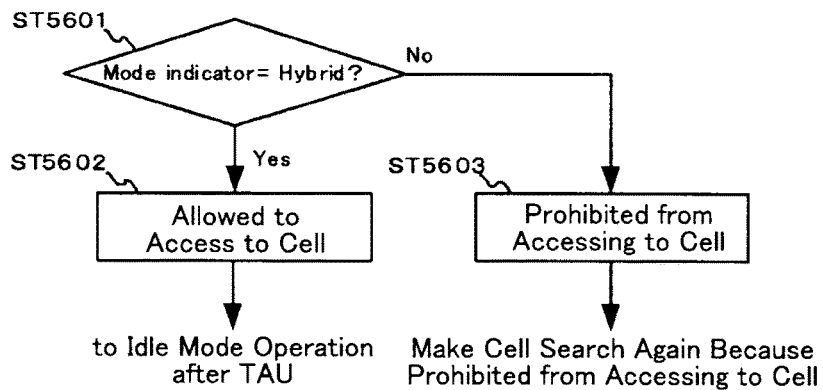
FIG. 35 is a view for explaining a case in which a hybrid access indicator is used as mode information for determining an access restriction.

In this embodiment, a method of using the above-mentioned hybrid access indicator as the mode information about a cell when determining an access restriction will be shown. An operation of a mobile terminal in the case of using the hybrid access indicator as the mode information about a cell when determining an access restriction will be shown. In the operation of the mobile terminal including from a cell search up to an idle mode operation, which is disclosed in FIG. 31 of Embodiment 7, determination using the mode information about the cell of ST5211, which is disposed to determine a new access restriction to be imposed on the cell, is carried out by using the hybrid access indicator as a mode indicator, and then determining whether the hybrid access indicator shows hybrid, as shown in ST5601 of FIG. 35. This cell maps the hybrid access indicator onto an SIB1 and then broadcasts the broadcast information, so that the mobile terminal, in ST5205 of FIG. 31, can receive the SIB1 when making a cell selection, and can acquire the hybrid access indicator. The mobile terminal, in ST5601, uses the hybrid access indicator which it has acquired by receiving the SIB1. When the mode indicator, in ST5601, shows hybrid, by making the above-mentioned cell be a "suitable cell" to allow the mobile terminal to access this cell regardless of the presence or absence of a white list in the mobile terminal, or the presence or absence of the CSG-ID (TAC) of the cell in the white list, as disclosed in Embodiment 7, the mobile terminal is allowed to access the cell in ST5602. As a result, the mobile terminal which is allowed to access the cell can similarly carry out transmission of a TAU request to the core network, reception of a TAU receipt signal, and rewriting of a TA list via the cell, and, after that, starts an idle mode operation for the cell. In contrast, when the mode indicator shows closed, a conventional access restriction is imposed on access to the cell, and it is determined this cell is not a "suitable cell" because the mobile terminal does not have a white list or the CSG-ID (TAC) of this cell does not exist in the white list. Therefore, the mobile terminal, in ST5603, is prohibited from accessing the cell, and has to make a cell search again.

As mentioned above, each mobile terminal according to this embodiment can access a cell in the hybrid access mode regardless of the presence or absence of a white list in the mobile terminal, or the presence or absence of the CSG-ID (TAC) of the cell in the hybrid access mode in the white list. As a result, each mobile terminal can carry out transmission of a TAU request to the core network, reception of a TAU receipt signal, and rewriting of a TA list via the cell in the hybrid access mode, and, after that, can start an idle mode operation for the cell in the hybrid access mode. Furthermore, because in the determining method of determining an access restriction to be imposed on access to a cell, the hybrid access indicator included in the broadcast information from this cell is used as the mode information about the cell, each mobile terminal does not have to newly receive the mode information about the cell from this cell. Therefore, there is provided an advantage of being able to reduce the amount of signaling.

Variant 1 of Embodiment 8

According to this embodiment, a hybrid access indicator in broadcast information from a cell is used, as mode information about the cell, in the determining method of determining an access restriction. In this variant, an indicator showing in which one of the following access modes: a hybrid access mode, a closed access mode, and an open access mode the cell is placed is disposed. Mobile terminals being served by the cell are broadcast the information about access mode on broadcast information. As the mode indicator shown in ST5601 of FIG. 35, the indicator showing in which one of the following access modes: the hybrid access mode, the closed access mode, and the open access mode the cell is placed is used. It is assumed that a mobile terminal makes a transition to ST5602 when the mode indicator shows hybrid or open. At this time, as disclosed in Embodiment 7, by making the above-mentioned cell be a "suitable cell" to allow the mobile terminal to access this cell regardless of the presence or absence of a white list in the mobile terminal, or the presence or absence of the CSG-ID (TAC) of the cell in the white list, the mobile terminal is allowed to access the cell in ST5602. As a result, the mobile terminal which is allowed to access the cell similarly carries out transmission of a TAU request to a core network, reception of a TAU receipt signal, and rewriting of a TA list via the cell, and, after that, starts an idle mode operation for the cell. In contrast, when the mode indicator shows closed, the mobile terminal makes a transition to ST5603. In this case, a conventional access restriction is imposed on access to the cell, and it is determined this cell is not a "suitable cell" because the mobile terminal does not have a white list or the CSG-ID (TAC) of this cell does not exist in the white list. Therefore, the mobile terminal, in ST5603, is prohibited from accessing the cell, and has to make a cell search again.

In the method disclosed in this variant, because the determination of whether or not the cell is in the open access mode is carried out in ST5601 at the same time when the determination of whether or not the cell is in another mode is carried out, the determination of ST5207 shown in FIG. 31 of whether or not the cell is a CSG cell becomes unnecessary. The use of the method disclosed in this variant as mentioned above provides the same advantages as those provided by Embodiment 7. Furthermore, because the CSG indicator showing whether or not the cell is a CSG cell which the cell transmits to mobile terminals being served thereby while carrying the CSG indicator on broadcast information becomes unnecessary, there is provided an advantage of reducing the amount of signaling. In addition, because the determination of whether or not the cell is in the open access mode is carried out in ST5601 at the same time when the determination of whether or not the cell is in another mode is carried out, and hence the determination of ST5207 shown in FIG. 31 of whether or not the cell is a CSG cell becomes unnecessary, there is provided an advantage of being able to simplify the processing carried out by each mobile terminal, and being able to reduce the size of the circuit and the power consumption of each mobile terminal.

The indicator disclosed in this variant can be used not only as the mode indicator, but also as an indicator corresponding to various services. As a form of service, there can be provided a service in which a cell is used to make this cell switch among the closed access mode cell, the hybrid access mode cell, and the open access mode with respect to time. For example, mobile terminals which have not been CSG-registered with the cell are allowed to access the cell during daytime hours, while mobile terminals which have been CSG-registered with the cell are also allowed to access the cell only during nighttime hours. In this case, this cell is made to operate as an open access mode cell during daytime hours, and is made to operate as a closed access mode cell or a hybrid access mode cell during nighttime hours. In such a case, an indicator informing each mobile terminal about in which mode the cell is made to operate is required. As this indicator, the indicator disclosed in this variant can be used. Because the mobile communication system can be made to operate with flexibility by using the indicator disclosed in this variant, there is provided an advantage of being able to introduce various forms of services into the mobile communication system.

Embodiment 9

In Embodiment 8, a hybrid access indicator in broadcast information from a cell is used, as mode information about the cell, in the determining method of determining an access restriction. In this embodiment, a method of using, as mode information about a cell, a PCI of the cell which is acquired when making a cell search in the determining method of determining an access restriction will be disclosed.

In Embodiment 7, an operation of a mobile terminal including from a cell search and a cell selection up to an idle mode operation is shown in FIG. 31. The mobile terminal, in ST5201 of FIG. 31, specifies the PCI of the cell selected thereby by using a P-SS and an S-SS. Therefore, in this embodiment, a method of using, as the mode information about the cell, the PCI of the cell which the mobile terminal has specified will be disclosed. A concrete example of the method will be described. When making a cell search, the mobile terminal, in step ST5201, establishes time synchronization among slots and among frames by using the first synchronization signal (P-SS) and the second synchronization signal (S-SS) which are transmitted thereto from a neighboring base station. A synchronization code having a one-to-one correspondence with the PCI (Physical Cell Identity) which is assigned to each cell is assigned to both the synchronization signals P-SS and S-SS (SS). Currently, 504 different PCIs have been examined, and therefore the synchronization is established by using these 504 different PCIs and the PCI of a cell with which the synchronization is established is detected (specified). Because the mobile terminal uses the PCI which it has specified as the mode information about the cell, the mobile terminal has to be able to determine whether or not the cell is a hybrid access mode cell from the specified PCI. As this method, any one of the methods disclosed in Embodiment 1 and Embodiment 2 can be used. In Embodiment 1, in the system, a PCI range for CSG cells and a PCI range for non-CSG cells are made to overlap each other (they can overlap each other completely or partially), and a PCI range in which they overlap each other is assigned to cells in the hybrid access mode. In this case, it is preferable that the PCI range in which they overlap each other is assigned only to cells in the hybrid access mode. As a result, the mobile terminal becomes able to determine whether or not the PCI which it has specified when making a cell search is one of the PCIs assigned to cells in the hybrid access mode. The mobile terminal which has determined whether or not the specified PCI is one of the PCIs assigned to cells in the hybrid access mode can store information showing the result of this determination as the mode information about the cell. As a notification of the PCI range, the method disclosed in Embodiment 1 can be applied.

Figure 36:
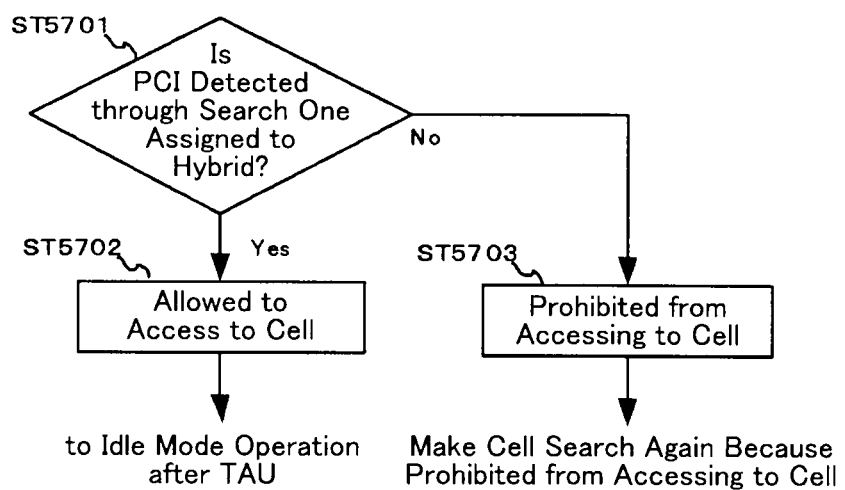
FIG. 36 is a view for explaining a case in which a PCI specified when a mobile terminal makes a cell search is used as mode information for determining an access restriction.

Furthermore, in Embodiment 2, disposing a PCI range for cells in the hybrid access mode separately from the PCI range for CSG cells and the PCI range for non-CSG cells in the system is disclosed. This method can be alternatively used. As a result, the mobile terminal becomes able to determine whether or not the PCI which it has specified when making a cell search is one of the PCIs assigned to cells in the hybrid access mode. The mobile terminal which has determined whether or not the specified PCI is one of the PCIs assigned to cells in the hybrid access mode can store, as the mode information about the cell, information showing the result of this determination in a storage medium of the mobile terminal. As a notification of the PCI range, the method disclosed in Embodiment 2 can be applied. As the storage medium, a memory unit of a protocol processing unit (3201), a control unit (3210), or the like, or an SIM/USIM mounted in the mobile terminal can be used. The operation of the mobile terminal will be shown. In the operation of the mobile terminal including from a cell search up to an idle mode operation, which is disclosed in FIG. 31 of Embodiment 7, determination using the mode information about the cell of ST5211, which is disposed to determine a new access restriction to be imposed on the cell, is carried out by using the mode information of the cell which is stored in the mobile terminal and which is determined from the PCI which the mobile terminal has specified when making a cell search, as shown in ST5701 of FIG. 36. When the mode information, in ST5701, shows hybrid, by making the above-mentioned cell be a "suitable cell" to allow the mobile terminal to access this cell regardless of the presence or absence of a white list in the mobile terminal, or the presence or absence of the CSG-ID (TAC) of the cell in the white list, as disclosed in Embodiment 7, the mobile terminal is allowed to access the cell in ST5702. The mobile terminal which is allowed to access the cell similarly carries out transmission of a TAU to the core network, reception of a TAU receipt signal, and rewriting of a TA list via the cell, and, after that, starts an idle mode operation for the cell. In contrast, when the mode indicator shows that the PCI is not a one for hybrid, a conventional access restriction is imposed on access to the cell, and it is determined this cell is not a "suitable cell" because the mobile terminal does not have a white list or the CSG-ID (TAC) of this cell does not exist in the white list. Therefore, the mobile terminal, in ST5703, is prohibited from accessing the cell, and has to make a cell search again.

Furthermore, because the mobile terminal can determine whether or not the mode of this cell is the hybrid one by using, as the mode information of this cell, the PCI of the cell which the mobile terminal has specified when making a cell search, the hybrid access indicator which has been proposed by the 3GPP can be eliminated. Because it has been proposed that the hybrid access indicator is included in the SIB1 as broadcast information, the amount of signaling can be reduced by eliminating the hybrid access indicator. As mentioned above, the use of the method disclosed in this embodiment can provide the same advantages as those provided by Embodiment 7. Furthermore, because it becomes able to eliminate the necessity to provide the hybrid access indicator showing whether or not the mode of the cell is the hybrid one, there is provided an advantage of being able to reduce the amount of signaling.

Embodiment 10

In Variant 1 of Embodiment 3, the notification of a neighboring hybrid status from a base station to mobile terminals being served by the base station is disclosed. As a concrete example of the notification of a neighboring hybrid status, the notification of whether an HeNB operating in a hybrid access mode exists in neighboring cells is disclosed. As another concrete example of the notification of a neighboring hybrid status, the notification of whether an HeNB operating in the hybrid access mode exists in the neighborhood of the cell of the base station or cells which are the target for measurement to mobile terminals being served by the base station is disclosed.

In this Embodiment 10, seven other concrete examples of the notification of a neighboring hybrid status will be disclosed hereafter.

(1) Notify that an HeNB operating in the hybrid access mode exists in a neighborhood (referred to as neighboring cells or cells which are the target for measurement from now on). Cells which are the target for measurement mean cells each of which a network can make a request to carry out a measurement, for example.

(2) Notify that an HeNB operating in the hybrid access mode does not exist in the neighborhood.

(3) Notify the PCI of an HeNB existing in the neighborhood and operating in the hybrid access mode. For example, a case in which the neighboring hybrid status is notified by using an intra frequency neighboring cell list (NCL: Neighboring Cell List), an inter frequency neighboring cell list, or an inter system neighboring cell list is considered. By notifying the neighboring hybrid status by using one of the above-mentioned neighboring cell lists, each mobile terminal can receive the information about neighboring cells. Therefore, there can be provided an advantage of preventing increase in the complexity of the operation of each mobile terminal, preventing a control delay from occurring in the operation of each mobile terminal, and reducing the processing load on each mobile terminal. Two concrete examples of the method of notifying the PCI of an HeNB existing in the neighborhood and operating in the hybrid access mode by using a neighboring cell list will be disclosed hereafter.

(3-1) Notify the neighboring hybrid status by using a current neighboring cell list. Information for enabling each mobile terminal to distinguish whether the cell operates in the hybrid access mode, as well as the PCIs of neighboring cells, can be added. Four concrete examples of the information for enabling each mobile terminal to distinguish whether the cell operates in the hybrid access mode will be disclosed hereafter.

(3-1-1) Information showing in which access mode the cell is placed. For example, the information shows the closed access mode, the open access mode, or the hybrid access mode.

(3-1-2) Information showing whether or not the cell is placed in the hybrid access mode.

(3-1-3) Information showing that the cell is placed in the hybrid access mode.

(3-1-4) Information showing that the cell is not placed in the hybrid access mode.

(3-2) Notify the PCI of an HeNB operating in the hybrid access mode by separating this PCI from the current neighboring cell list. The neighboring cell list can be divided into parts according to the access modes of neighboring cells. By using the neighboring cell list parts divided according to the access modes, each mobile terminal can determine that each cell with a PCI included in one of these neighboring cell list parts operates in the corresponding access mode. Furthermore, a neighboring cell list for cells operating in the hybrid access mode can be disposed. Each mobile terminal can determine that a cell with a PCI included in the neighboring cell list for cells operating in the hybrid access mode operates in the hybrid access mode.

(4) Notify a range of PCIs assigned to hybrid cells (cells operating in the hybrid access mode). The notification of a range of PCIs assigned to hybrid cells can be limited only when a cell operating in the hybrid access mode exists in the neighborhood.

The 3GPP has proposed that a subset of PCIs/PSCs is reserved for hybrid cells from a set of PCIs/PCSs available for macro cells, and information about the subset is broadcast to mobile terminals (nonpatent reference 11). More specifically, the 3GPP has proposed that a PCI range (referred to as a PCI range for hybrid cells from here on) which hybrid cell uses is reserved in PCIs for non-CSG cells. On the other hand, any detailed information about a notification method of notifying the PCI range for hybrid cells to mobile terminals is not disclosed.

The following advantages can be provided by notifying the range of PCIs assigned to hybrid cells from a serving cell only when a cell operating in the hybrid access mode exists in neighboring cells. By thus notifying the range of PCIs assigned to hybrid cells, without having to making a notification of whether or not an HeNB operating in the hybrid access mode exists in neighboring cells, as shown in Variant 1 of Embodiment 3, a "notification that an HeNB operating in the hybrid access mode exists in the neighborhood", which is the further concrete example (1) of the neighboring hybrid status in this embodiment, or a "notification that that an HeNB operating in the hybrid access mode does not exist in the neighborhood", which is the further concrete example (2) of the neighboring hybrid status in this embodiment, the mobile communication system becomes able to notify the same information as one of them. As a result, there can be provided an advantage of being able to make effective use of the radio resources and to increase the information about the notification, thereby preventing increase in the complexity of the mobile communication system.

(5) Notify the range of PCIs assigned to hybrid cells existing in the neighborhood. As a result, as compared with the further concrete example (4) of the neighboring hybrid status in this embodiment, the number of PCIs which each mobile terminal uses to make a cell search for detection of an HeNB operating in the hybrid access mode can be reduced. As a result, there can be provided an advantage of reducing the processing load on each mobile terminal.

(6) Notify that an HeNB operating in the hybrid access mode exists in a current carrier frequency (also referred to as a serving frequency), that no HeNB operating in the hybrid access mode exists in the current carrier frequency, or whether an HeNB operating in the hybrid access mode exists in the current carrier frequency. Because this information is not based on the statuses of neighboring cells, there can be provided an advantage of preventing increase in the complexity of the mobile communication system.

(7) Notify that an HeNB operating in the hybrid access mode exists in the current mobile communication system, that no HeNB operating in the hybrid access mode exists in the current mobile communication system, or whether an HeNB operating in the hybrid access mode exists in the current mobile communication system. Because this information is not based on the statuses of neighboring cells and the carrier frequency, there can be provided an advantage of preventing increase in the complexity of the mobile communication system. Information about release can be divided according to whether an HeNB operating in the hybrid access mode exists in the current mobile communication system, and a notification of the version of the release can be set to include the information about the notification that an HeNB operating in the hybrid access mode exists in the current mobile communication system, the notification that no HeNB operating in the hybrid access mode exists in the current mobile communication system, or the notification of whether an HeNB operating in the hybrid access mode exists in the current mobile communication system. As a result, there can be provided an advantage of being able to make effective use of the radio resources and to increase the information about the notification, thereby preventing increase in the complexity of the mobile communication system.

In this embodiment, because a notification method of notifying the neighboring hybrid status is the same as that shown in Variant 1 of Embodiment 3, the explanation of the notification method will be omitted hereafter.

An example of the operation performed by a mobile terminal according to this embodiment will be explained. Because an example of the operation performed by a mobile terminal in the case of applying any one of the further concrete examples (1) and (2) of the neighboring hybrid status in this embodiment is the same (FIG. 20) as that according to Variant 1 of Embodiment 3, the explanation of the operation will be omitted hereafter. An example of the operation performed by a mobile terminal in the case of applying the further concrete example (3) of the neighboring hybrid status in this embodiment will be explained with reference to FIG. 37. Because the same reference characters as those shown in FIGS. 14 and 15 denote the same steps, the explanation of these steps will be omitted hereafter.

The mobile terminal, in step ST3701, determines whether an HeNB operating in the hybrid access mode exists in neighboring cells (or cells which are the target for measurement). The mobile terminal can use the PCI of an HeNB operating in the hybrid access mode which exists in the neighborhood for this determination, the PCI being the "neighboring hybrid status" notified from a base station. When receiving a notification of the PCI of an HeNB operating in the hybrid access mode which exists in the neighborhood, the mobile terminal determines that an HeNB operating in the hybrid access mode exists in neighboring cells, and makes a transition to step ST3702. In contrast, when there is no notification of the PCI of an HeNB operating in the hybrid access mode which exists in the neighborhood, the mobile terminal determines that no HeNB operating in the hybrid access mode exists in neighboring cells, and makes a transition to step ST1405.

The mobile terminal, in step ST3702, makes a cell search by using the PCI of the HeNB operating in the hybrid access mode which exists in the neighborhood, the PCI being the "neighboring hybrid status" notified from the base station. The mobile terminal, in step ST3703, makes a cell search by using a PCI which the mobile terminal determines belongs to a PCI range for CSG cells according to PIC information about PCI split.

Figure 37:
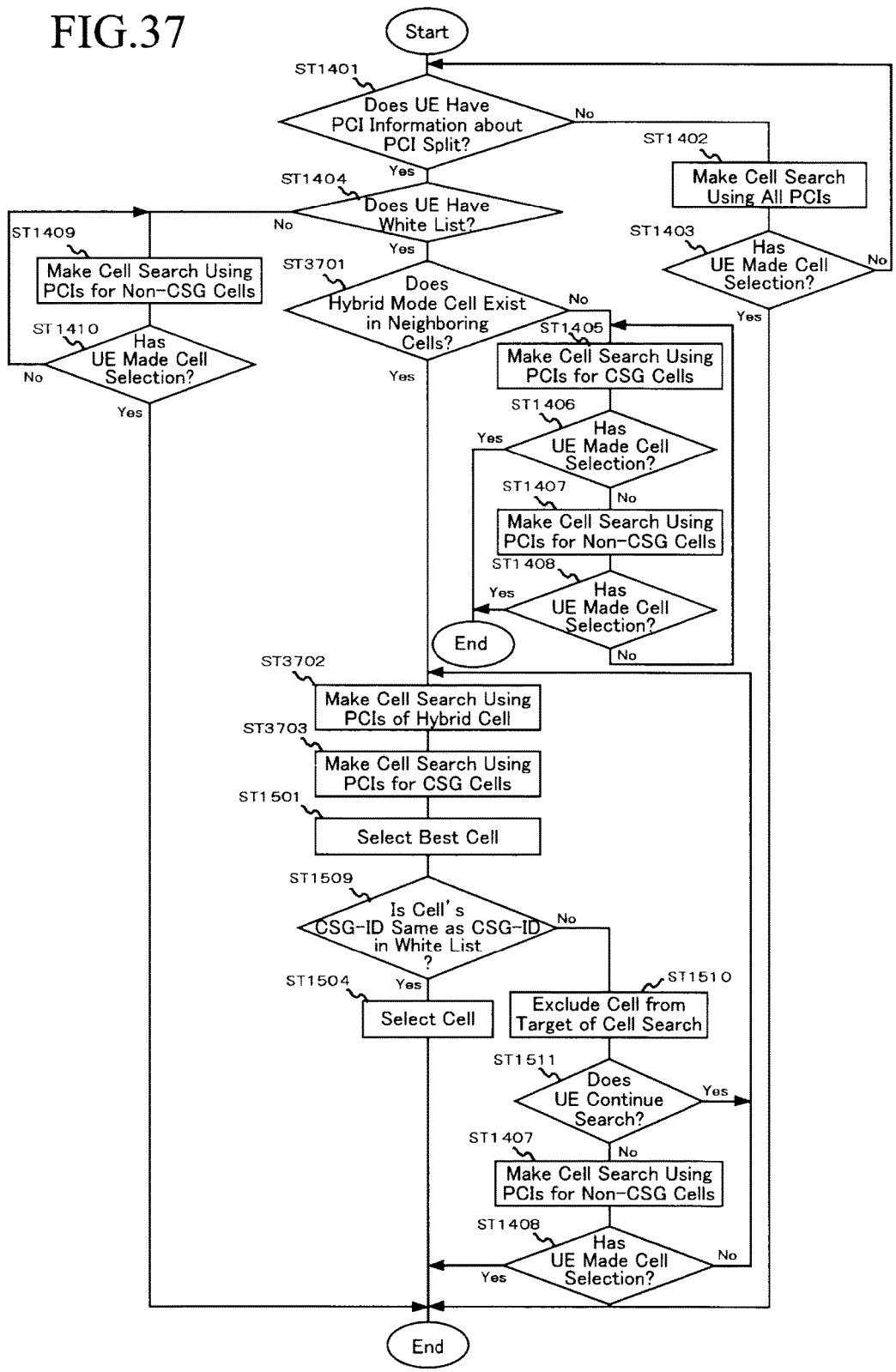
FIG. 37 is a flow chart showing a process carried out by a mobile terminal in accordance with Embodiment 10.

An example of the operation performed by a mobile terminal in the case of applying the further concrete example (4) of the neighboring hybrid status in this embodiment will be explained with reference to FIG. 37. Because the same reference characters as those shown in FIGS. 14 and 15 denote the same steps, the explanation of these steps will be omitted hereafter.

The mobile terminal, in step ST3701, determines whether an HeNB operating in the hybrid access mode exists in neighboring cells (or cells which are the target for measurement). The mobile terminal can use the range of PCIs assigned to hybrid cells, which is the "neighboring hybrid status" notified from a base station and which is notified only when a hybrid access mode cell exists in neighboring cells, for this determination. When receiving a notification of the range of PCIs assigned to hybrid cells, the mobile terminal determines that an HeNB operating in the hybrid access mode exists in neighboring cells, and makes a transition to step ST3702. In contrast, when there is no notification of the range of PCIs assigned to hybrid cells, the mobile terminal determines that no HeNB operating in the hybrid access mode exists in neighboring cells, and makes a transition to step ST1405.

The mobile terminal, in step ST3702, makes a cell search by using a PCI included in the range of PCIs assigned to hybrid cells which is the "neighboring hybrid status" notified from the base station. The mobile terminal, in step ST3703, makes a cell search by using a PCI which the mobile terminal determines belongs to a PCI range for CSG cells according to PIC information about PCI split.

An example of the operation performed by a mobile terminal in the case of applying the further concrete example (5) of the neighboring hybrid status in this embodiment will be explained with reference to FIG. 37. Because the same reference characters as those shown in FIGS. 14 and 15 denote the same steps, the explanation of these steps will be omitted hereafter.

The mobile terminal, in step ST3701, determines whether an HeNB operating in the hybrid access mode exists in neighboring cells (or cells which are the target for measurement). The mobile terminal can use the range of PCIs assigned to hybrid cells existing in the neighborhood, which is the "neighboring hybrid status" notified from a base station, for this determination. When receiving a notification of the range of PCIs assigned to hybrid cells existing in the neighborhood, the mobile terminal determines that an HeNB operating in the hybrid access mode exists in neighboring cells, and makes a transition to step ST3702. In contrast, when there is no notification of the range of PCIs assigned to hybrid cells existing in the neighborhood, the mobile terminal determines that no HeNB operating in the hybrid access mode exists in neighboring cells, and makes a transition to step ST1405.

The mobile terminal, in step ST3702, makes a cell search by using a PCI included in the range of PCIs assigned to hybrid cells existing in the neighborhood which is the "neighboring hybrid status" notified from the base station. The mobile terminal, in step ST3703, makes a cell search by using a PCI which the mobile terminal determines belongs to a PCI range for CSG cells according to PIC information about PCI split.

This Embodiment 10 can provide the following advantages in addition to the advantages provided by Embodiment 3, like Variant 1 of Embodiment 3. This embodiment can achieve a speedup in the cell searching operation of each mobile terminal which has a white list. A mobile terminal which has a white list becomes unnecessary to make a search by using a PCI belonging to the PCI range for non-CSG cells in an environment where an HeNB which is made to operate in the hybrid access mode does not exist. This can provide an advantage of being able to carry out the search operation at a high speed. This can provide a further advantage of preventing a control delay from occurring in the mobile communication system. Furthermore, there can be provided an advantage of reducing the power consumption of each mobile terminal.

In addition, as compared with the case of applying Variant 1 of the Embodiment 3 or any one of the further concrete examples (1) and (2) of the neighboring hybrid status in this embodiment, in the case of applying any one of the further concrete examples (3), (4), and (5) of the neighboring hybrid status in this embodiment, there can be provided the following advantages in the operation performed by each mobile terminal. A mobile terminal which has been registered with a CSG can simplify the process of making a cell search to detect a CSG cell and a hybrid cell which are cells ready for the closed access mode. A mobile terminal which has been registered with a CSG can make a cell search by using a PCI belonging to the PCI range for CSG cells, and a PCI belonging to the PCI range for hybrid cells in order to detect a cell ready for the closed access mode. As an alternative, a mobile terminal which has been registered with a CSG can make a cell search by using a PCI belonging to the PCI range for CSG cells, and a PCI for hybrid cells existing in the neighborhood in order to detect a cell ready for the closed access mode. More specifically, a mobile terminal which has been registered with a CSG can reduce its cell searching operation of making a cell search by using a PCI for non-CSG cells which is not used for CSG cells and for hybrid cells without having to make a cell search by using all the PCIs in order to detect a cell ready for the closed access mode. As a result, this can provide an advantage of being able to carry out the search operation at a higher speed. This can provide a further advantage of preventing a control delay from occurring in the mobile communication system more effectively. Furthermore, there can be provided an advantage of further reducing the power consumption of each mobile terminal.

Embodiment 11

A problem to be solved in Embodiment 11 will be explained. It can be considered that each of an HeNB and an HNB has a plurality of operation modes. There is a possibility that the operation mode of an HeNB and the operation mode of an HNB are changed after the HeNB and the HNB are installed, respectively. There is also a possibility that the access mode of a neighboring HeNB is changed even in the case in which Variant 1 of Embodiment 3 or Embodiment 10 are applied, for example. For example, when the operation mode of a neighboring HeNB operating in a closed access mode is changed into a hybrid access mode, the need for this serving cell to change a "neighboring hybrid status" which the serving cell notifies to mobile terminals being served thereby arises.

In this Embodiment 11, a method of changing the "neighboring hybrid status" will be disclosed. A changing method of changing the "neighboring hybrid status" in the case of setting an operation mode via a network will be disclosed.

For example, an operator sets the operation mode of an HeNB/HNB via the network. The operator issues a command to change the operation mode setting of an HeNB/HNB via the network. A network unit notifies a change in the operation mode setting to the HeNB/HNB. As a concrete example of the network unit, there is an EPC (Evolved Packet Core), an MME, an S-GW, an HeNBGW, or the like. As another concrete example of the network unit, there can be a system, a node, an entity, a function, an element, or the like for O&M (Operation & Maintenance). An S1 interface or a broadband line can be used for the notification of the change. As an alternative, an interface for O&M can be used. The notification of the change in the operation mode setting can include the current operation mode, or the immediately-previous operation mode and the current operation mode.

The network unit notifies the changed "neighboring hybrid status" to a cell which needs to change the "neighboring hybrid status" according to the above-mentioned change of the operation mode setting of the HeNB/HNB. An S1 interface or a broadband line can be used for the notification of the "neighboring hybrid status".

As an alternative, the network unit can notify a change request to a cell which needs to change the "neighboring hybrid status" according to the above-mentioned change of the operation mode setting of the HeNB/HNB. The cell which has received the change request to change the "neighboring hybrid status" changes the "neighboring hybrid status". An S1 interface or a broadband line can be used for the notification of this change request. The change request to change the "neighboring hybrid status" can include identification information (a PCI, a GCI or the like) of the HeNB/HNB whose operation mode setting has been changed, the current operation mode, or the immediately-previous operation mode and the current operation mode.

A cell which needs to change the "neighboring hybrid status" according to the change in the operation mode setting of the HeNB/HNB can be a cell which has a chance of selecting the HeNB/HNB whose operation mode setting has been changed as a handover destination or an object for cell reselection. As an alternative, when a base station notifies the "neighboring hybrid status" to mobile terminals being served thereby by using an NCL, the network unit can select a cell which needs to change an "NCL" according to the change of the operation mode setting of the HeNB/HNB.

Seven concrete examples of a method of selecting a cell which needs to change the "neighboring hybrid status" according to a change in the operation mode setting of an HeNB/HNB will be disclosed hereafter.

(1) A method of using a measurement report of a mobile terminal being served by an HeNB/HNB other than the HeNB/HNB whose operation mode setting has been changed. Furthermore, two concrete examples of this method will be disclosed hereafter.

(1-1) A method of, when selecting, as a handover destination (a target cell), the HeNB/HNB whose operation mode setting has been changed from a measurement report of a mobile terminal being served by an HeNB/HNB other than the HeNB/HNB whose operation mode setting has been changed, determining that it is necessary to change the "neighboring hybrid status" of the serving cell of the above-mentioned mobile terminal according to the change of the operation mode setting of the HeNB/HNB.

(1-2) A method of, when a mobile terminal being served an HeNB/HNB other than the HeNB/HNB whose operation mode setting has been changed reports that the quality of reception from the HeNB/HNB whose operation mode setting has been changed is better than that from the serving cell, determining that it is necessary to change the "neighboring hybrid status" of the serving cell of the above-mentioned mobile terminal according to the change of the operation mode setting of the HeNB/HNB. Because a measurement report of a mobile terminal being served by an HeNB/HNB other than the HeNB/HNB whose operation mode setting has been changed is used in this concrete example, it becomes able to exactly select a cell which has a chance of selecting the HeNB/HNB whose operation mode setting has been changed as a handover destination or an object for cell reselection. More specifically, there can be provided an advantage of not selecting a needless cell as a cell which needs to change the "neighboring hybrid status".

(2) A method of using a measurement report of a mobile terminal being served by the HeNB/HNB whose operation mode setting has been changed. Furthermore, three concrete examples of this method will be disclosed hereafter.

(2-1) A method of, when selecting a cell as a handover destination (a target cell) from a measurement report of a mobile terminal being served by the HeNB/HNB whose operation mode setting has been changed, determining that it is necessary to change the "neighboring hybrid status" of the selected cell according to the change of the operation mode setting of the HeNB/HNB.

(2-2) A method of determining that it is necessary to change the "neighboring hybrid status" of a serving cell, i.e., a cell providing reception quality which is better than that provided by the HeNB/HNB whose operation mode setting has been changed, this fact being reported by a mobile terminal being served by the cell, according to the change of the operation mode setting of the HeNB/HNB.

(2-3) A method of determining that it is necessary to change the "neighboring hybrid status" of a cell providing reception quality which is better than that shown by a certain threshold, this fact being reported by a mobile terminal being served by the cell, according to the change of the operation mode setting of the HeNB/HNB. The threshold can be determined statically or semi-statically.

Because this concrete example (2) does not have to use a measurement report of a mobile terminal being served by an HeNB/HNB other than the HeNB/HNB whose operation mode setting has been changed, but simply uses a measurement report of a mobile terminal being served by the HeNB/HNB whose operation mode setting has been changed, as compared with the concrete example (1), there can be provided an advantage of reducing the processing load on the selection method of selecting a cell which needs to change the "neighboring hybrid status".

(3) A method of using position information about a cell. The network unit determines, as a cell which needs to change the "neighboring hybrid status" according to the change of the operation mode setting of the HeNB/HNB, a cell installed at a certain distance from the HeNB/HNB whose operation mode setting has been changed on the basis of the position information about each cell. The certain distance can be determined statically semi-statically. Because this concrete example does not have to store and process the measurement report, as compared with the concrete examples (1) and (2), there can be provided an advantage of reducing the processing load on the selection method of selecting a cell which needs to change the "neighboring hybrid status".

(4) A method of, when information about the HeNB/HNB whose operation mode setting has been changed is included in neighboring cell information of an HeNB/HNB other than the HeNB/HNB whose operation mode setting has been changed or in a neighboring cell list, determining that it is necessary to change the "neighboring hybrid status" of the HeNB/HNB other than the HeNB/HNB whose operation mode setting has been changed according to the change of the operation mode setting of the HeNB/HNB. Because this concrete example does not have to store and process the measurement report, or make a comparison with a threshold or the like, as compared with the concrete examples (1), (2) and (3), there can be provided an advantage of reducing the processing load on the selection method of selecting a cell which needs to change the "neighboring hybrid status".

(5) A method of determining that it is necessary to change the "neighboring hybrid status" of a cell which is included in the neighboring cell information of the HeNB/HNB whose operation mode setting has been changed or in the neighboring cell list according to the change of the operation mode setting of the HeNB/HNB. Because this concrete example does not have to store and process the measurement report, or make a comparison with a threshold or the like, as compared with the concrete examples (1), (2) and (3), there can be provided an advantage of reducing the processing load on the selection method of selecting a cell which needs to change the "neighboring hybrid status". Furthermore, because this concrete example does not have to take into consideration neighboring cell information about neighboring cells other than the HeNB/HNB whose operation mode setting has been changed, as compared with the concrete example (4), there can be provided an advantage of reducing the processing load on the selection method of selecting a cell which needs to change the "neighboring hybrid status".

(6) A method of determining, as a cell which needs to change the "neighboring hybrid status" according to the change of the operation mode setting of the HeNB/HNB whose operation mode setting has been changed, another cell connected to one or more MMEs to which the HeNB/HNB whose operation mode setting has been changed is connected. The whole structure of a mobile communication system which complies with an LTE method which has been debated in the 3GPP will be explained with reference to FIG. 38. In the 3GPP, the whole structure of a system including a CSG (Closed Subscriber Group) cell (Home-eNodeB (Home-eNB or HeNB) of e-UTRAN, or Home-NB (HNB) of UTRAN) and a non-CSG cell (eNodeB (eNB) of e-UTRAN, NodeB (NB) of UTRAN, or BSS of GERAN) has been studied, and e-UTRAN having such a structure as shown in FIG. 38 has been proposed (refer to chapter 4.6.1 of nonpatent reference 1).

Figure 38:
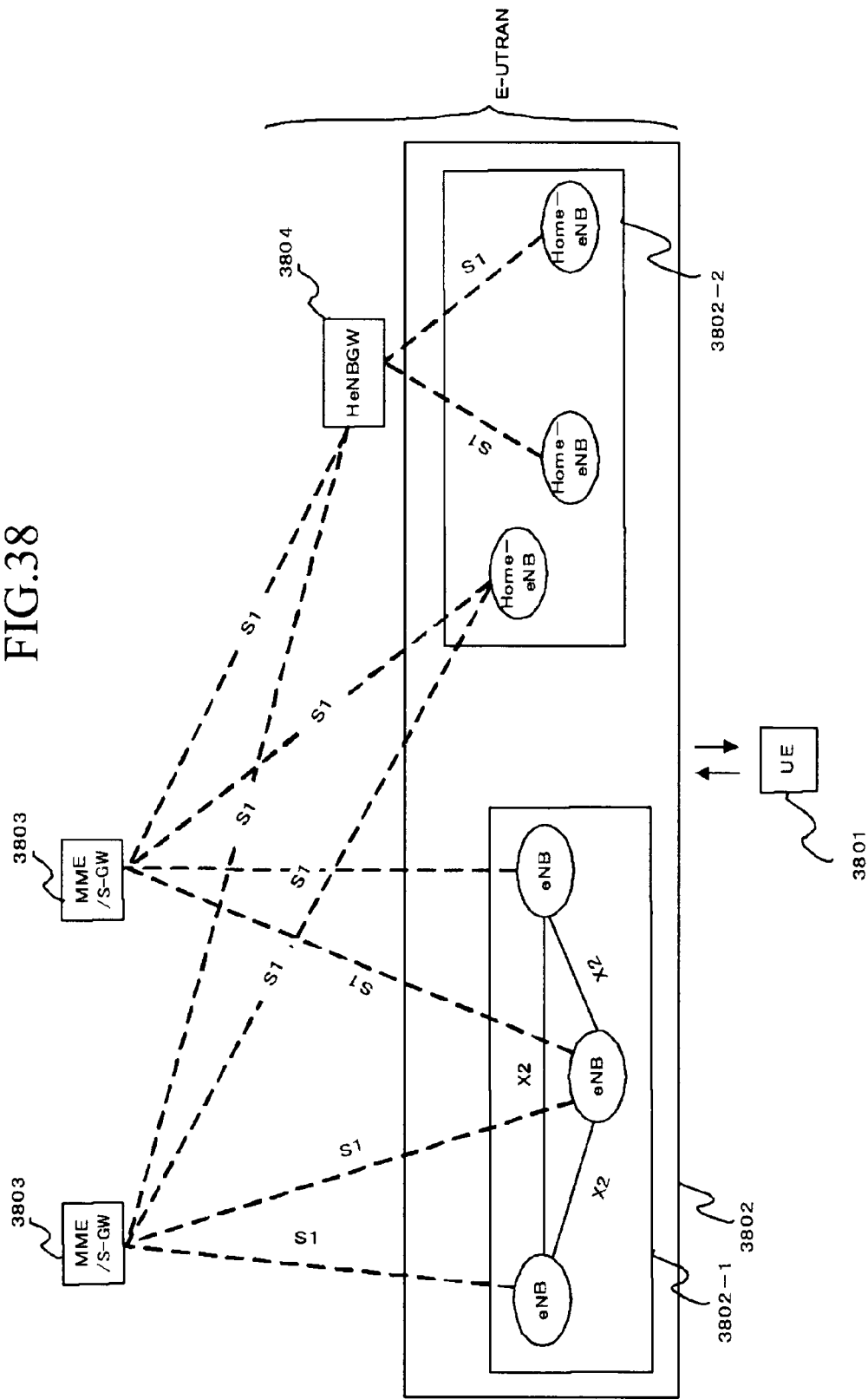
FIG. 38 is a block diagram showing the whole structure of a mobile communication system which has been debated in the 3GPP.

FIG. 38 will be explained.

A mobile terminal (UE) 3801 carries out transmission and reception with a base station 3802. The base station 3802 is categorized into an eNB 3802-1 or a Home-eNB 3802-2. Each eNB 3802-1 is connected with an MME 3803 via an interface S1, and control information is communicated between each eNB and the MME. A plurality of MMEs 3803 can be connected to each eNB 3802-1. Any two eNBs are connected to each other via an interface X2, and control information is communicated between the two eNBs. Each Home-eNB 3802-2 is connected to an MME 3803 via an interface S1, and control information is communicated between each Home-eNB and the MME. A plurality of Home-eNBs can be connected to each MME. A Home-eNB 3802-2 can be alternatively connected to an MME 3803 via an HeNBGW (Home-eNB GateWay) 3804. In this case, the Home-eNB and the HeNBGW are connected to each other via an interface S1, and the HeNBGW 3804 and the MME 3803 are connected to each other via an interface S1. One or more Home-eNBs 3802-2 are connected to one HeNBGW 3804, and information is communicated between them via S1. Each HeNBGW 3804 is connected to one or more MMEs 3803, and information is communicated between them via S1. In addition, the following structure has been studied in the 3GPP. The interface X2 is not supported between any two Home-eNBs 3802-2. Each HeNBGW 3804 can be assumed to be an eNB 3802-1 from each MME 3803. Each HeNBGW 3804 can be assumed to be an MME 3803 from each Home-eNB 3802-2. Regardless of whether or not a Home-eNB 3802-2 is connected to an EPC via an HeNBGW 3804, the interface S1 between the Home-eNB 3802-2 and the EPC is identical. Mobility to a Home-eNB 3802-2 which extends over an MME 3803 or mobility from a Home-eNB 3802-2 which extends over an MME 3803 is not supported. Each Home-eNB 3802-2 supports only one cell.

Because this concrete example enables the network to uniquely select a cell which needs to change the "neighboring hybrid status" regardless of the HeNB/HNB whose operation mode setting has been changed, as compared with the concrete examples (1), (2), (3), (4) and (5), there can be provided an advantage of reducing the processing load on the selection method of selecting a cell which needs to change the "neighboring hybrid status".

(7) A method of determining, as a cell which needs to change the "neighboring hybrid status" according to the change of the operation mode setting of the HeNB/HNB whose operation mode setting has been changed, another cell connected to an HeNBGW to which the HeNB/HNB whose operation mode setting has been changed is connected. Because this concrete example enables the network to uniquely select a cell which needs to change the "neighboring hybrid status" regardless of the HeNB/HNB whose operation mode setting has been changed, as compared with the concrete examples (1), (2), (3), (4) and (5), there can be provided an advantage of reducing the processing load on the selection method of selecting a cell which needs to change the "neighboring hybrid status".

Figure 39:
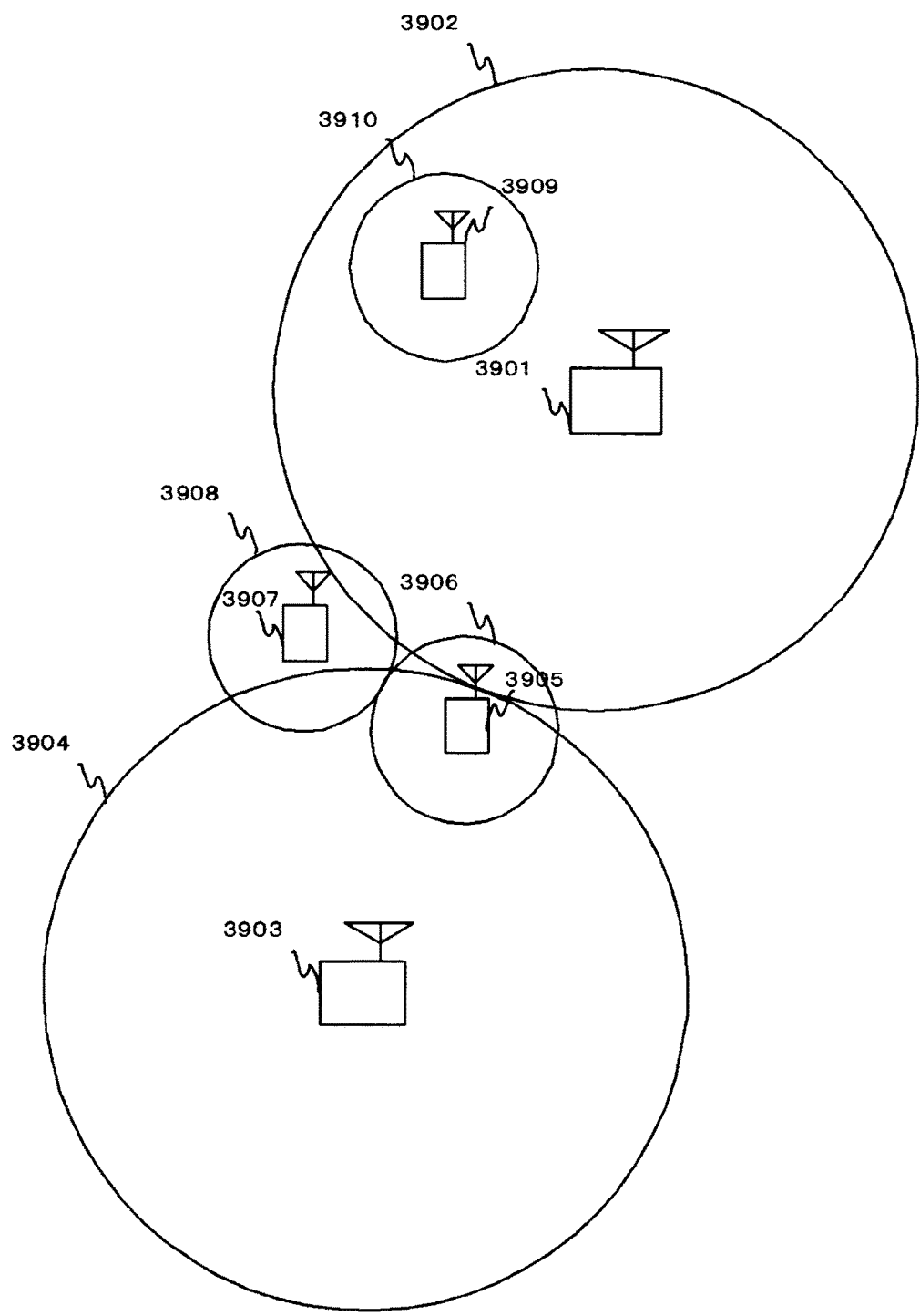
FIG. 39 is an explanatory drawing of an example of the arrangement of cells which is used in Embodiment 11.

Next, the operation of the mobile communication system will be explained. An example of arrangement of cells which are used for explanation is shown in FIG. 39. An HeNB/HNB 3909 is installed in the coverage 3902 of a macro cell 3901. The coverage of the HeNB/HNB 3909 is denoted by 3910. A macro cell 3903 is installed adjacent to the macro cell 3901. The coverage of the macro cell 3903 is denoted by 3904. An HeNB/HNB 3905 and an HeNB/HNB 3907 are installed in the vicinity of the cell border between the macro cell 3901 and the macro cell 3903. The coverage of the HeNB/HNB 3905 is denoted by 3906. The coverage of HeNB/HNB 3907 is denoted by 3908.

Figure 40:
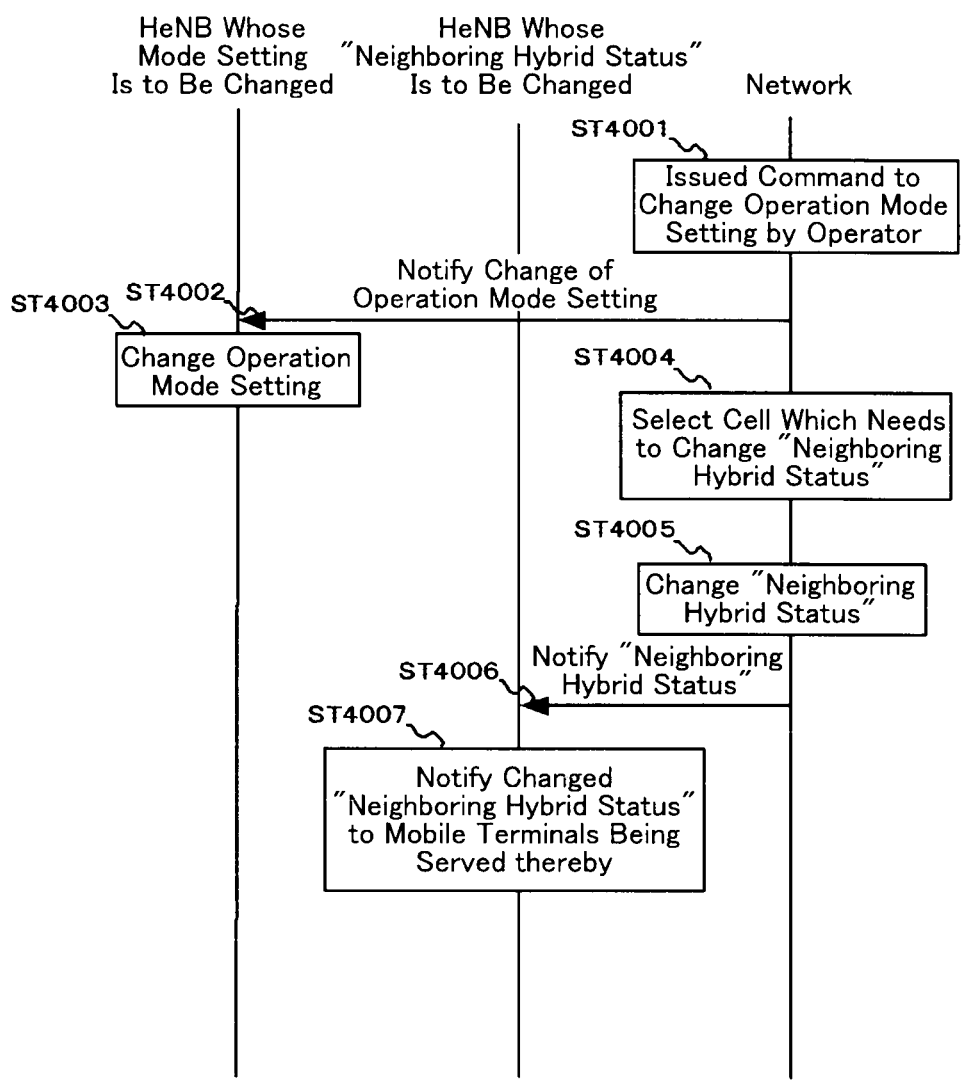
FIG. 40 is a sequence diagram of a mobile communication system which is provided as a solution by Embodiment 11.

An example of the operation of the mobile communication system will be shown with reference to FIG. 40. The network, in step ST4001, receives a command to change the operation mode setting of an HeNB from an operator, for example. If it is necessary to change a PCI according to the change in the operation mode, the network can select a PCI suitable for the new operation mode. The PCI suitable for the new operation mode can be a PCI included in a PCI range for the new operation mode. The network, in step ST4002, notifies a change of the operation mode setting to the HeNB for which the network has received the command to change the operation mode setting from the operator. The network can alternatively notify a PCI suitable for the new operation mode to the HeNB for which the network has received the command to change the operation mode setting from the operator. In this case, an immediately-previous PCI and a new PCI, only the new PCI, an immediately-previous GCI and a new GCI, or only the new GCI can be transmitted to the HeNB. The HeNB which, in step ST4003, has received the command to changing the operation mode setting changes its operation mode setting according to the command. When, in step ST4001, receiving the notification of the PCI suitable for the new operation mode, the HeNB changes the PCI according to the command. As an alternative, the HeNB which has received the command to change the operation mode setting can select a PCI suitable for the new operation mode. The PCI suitable for the new operation mode can be a PCI included in the PCI range for the new operation mode. When selecting a PCI suitable for the new operation mode, the HeNB can measure the reception quality of a neighboring cell. An example of a concrete PCI selection method will be disclosed. The HeNB determines that it easily receive interference from a neighboring cell providing good reception quality (in the case of defining an SIR as the reception quality, a cell having a high SIR) so as not to select a PCI which is the same as that of the cell or a PCI which is similar to that of the cell. A similar PCI means a PCI having a high correlation. The number of cells providing good reception quality can be one or more. When determining a cell providing good reception quality, the HeNB can use a threshold. For example, when a cell provides reception quality which is better than that shown by the threshold (in the case of defining an SIR as the reception quality, the cell provides reception quality which is higher than that shown by the threshold), the HeNB can determine that this cell provides good reception quality. The HeNB can select a PCI suitable for the new operation mode even after receiving the command to change the operation mode setting of step ST4002. This HeNB changes the PCI. When selecting a PCI suitable for the new operation mode, the HeNB can notify this PCI to the network. An S1 interface or a broadband channel can be used for this notification. An interface for O&M can be alternatively used for the notification. In this case, the immediately-previous PCI and the new PCI, only the new PCI, the immediately-previous GCI and the new GCI, or only the new GCI can be transmitted to the network.

The network, in step ST4004, selects a cell which needs to change the "neighboring hybrid status". As an alternative, the network can select a cell which needs to change the NCL. An example will be explained with reference to FIG. 39. A case in which the operation mode setting of the HeNB/HNB 3905 is changed from the closed access mode to the hybrid access mode will be examined. In this case, in step ST4004, the macro cell 3901, the macro cell 3903, and the HeNB/HNB 3907 are selected as cells which need to change the "neighboring hybrid condition", for example. Another example will be explained with reference to FIG. 39. A case in which the operation mode setting of the HeNB/HNB 3909 is changed from the closed access mode to the hybrid access mode will be examined. In this case, in step ST4004, the macro cell 3901 is selected as a cell which needs to change the "neighboring hybrid condition", for example.

The network, in step ST4005, changes the "neighboring hybrid status" of the one or more cells selected in step ST4004. As an alternative, the network can change the NCL of the one or more cells. The network, in step ST4006, notifies the "neighboring hybrid status" which it has changed in step ST4005 to the one or more cells selected in step ST4004. As an alternative, the network can notify the NCL which it has changed to the one or more cells. Each of the one or more cells which has received the "neighboring hybrid status" in step ST4007 notifies the received "neighboring hybrid status" to mobile terminals being served thereby.

Embodiment 11 can provide the following advantages. Even in the case in which the operation mode setting of an HeNB or HNB is changed after it is installed, there can be provided an advantage of being able to change the "neighboring hybrid status" or "NCL" appropriately. Furthermore, this embodiment can eliminate the need for an operator or the owner of the HeNB/HNB to perform an operation of changing the "neighboring hybrid status". By doing in this way, the mobile communication system can update the "neighboring hybrid status" according to a change in the operation mode setting while suppressing the workload on the operator or the owner of the HeNB/HNB, and occurrence of an additional cost. As a result, even in the case in which the operation mode setting of an HeNB or HNB is changed after it is installed, Variant 1 of Embodiment 3 or Embodiment 10 can be applied, and the same advantages as those provided by Variant 1 of Embodiment 3 or Embodiment 10 can be provided.

Variant 1 of Embodiment 11

A problem to be solved by Variant 1 of Embodiment 11 is the same as that shown in Embodiment 11, and the explanation of the problem will be omitted hereafter.

In this Variant 1 of Embodiment 11, a changing method of changing a "neighboring hybrid status" in the case of setting an operation mode via an HeNB/HNB will be disclosed. For example, the owner of an HeNB/HNB issues a commands to change the operation mode setting of the HeNB/HNB directly to this HeNB/HNB. The HeNB/HNB makes a change request of a cell which needs to change the "neighboring hybrid status" according to the change of the operation mode setting. The cell which has received the change request to change the "neighboring hybrid status" changes the "neighboring hybrid status". An X2 interface or a broadband channel can be used for this notification of the change. The change request to change the "neighboring hybrid status" can include identification information (a PCI, a GCI or the like) of the HeNB/HNB whose operation mode setting has been changed, the current operation mode, or the immediately-previous operation mode and the current operation mode.

A cell which needs to change the "neighboring hybrid status" according to the change in the operation mode setting of the HeNB/HNB can be a cell which has a chance of selecting the HeNB/HNB whose operation mode setting has been changed as a handover destination or an object for cell reselection. As an alternative, when a base station notifies the "neighboring hybrid status" to mobile terminals being served thereby using by an NCL, a network can select a cell which needs to change an "NCL" according to the change of the operation mode setting of the HeNB/HNB.

Three concrete examples of a method of selecting a cell which needs to change the "neighboring hybrid status" according to a change in the operation mode setting of an HeNB/HNB will be disclosed hereafter.

(1) A method of using the results of measurement of neighboring cells which the HeNB/HNB whose operation mode setting has been changed carries out. It can be determined that it is necessary to change the "neighboring hybrid status" of a cell providing reception quality which is better than that shown by a certain threshold according to the change of the operation mode setting of the HeNB/HNB. The threshold can be determined statically or semi-statically.

(2) A method of using a measurement report of a mobile terminal being served by the HeNB/HNB whose operation mode setting has been changed. Furthermore, three concrete examples of this method will be disclosed hereafter.

(2-1) A method of, when selecting a cell as a handover destination (a target cell) from a measurement report of a mobile terminal being served by the HeNB/HNB whose operation mode setting has been changed, determining that it is necessary to change the "neighboring hybrid status" of the cell according to the change of the operation mode setting of the HeNB/HNB.

(2-2) A method of determining that it is necessary to change the "neighboring hybrid status" of a serving cell, i.e., a cell providing reception quality which is better than that provided by the HeNB/HNB whose operation mode setting has been changed, this fact being reported by a mobile terminal being served by the cell, according to the change of the operation mode setting of the HeNB/HNB.

(2-3) A method of determining that it is necessary to change the "neighboring hybrid status" of a cell providing reception quality which is better than that shown by a certain threshold, this fact being reported by a mobile terminal being served by the cell, according to the change of the operation mode setting of the HeNB/HNB. The threshold can be determined statically or semi-statically.

This concrete example eliminates the need to add a new function of measuring the neighboring cells to each cell, as compared with the concrete example (1). As a result, there can be provided an advantage of preventing increase in the complexity of the mobile communication system.

(3) A method of determining that it is necessary to change the "neighboring hybrid status" of a cell which is included in the neighboring cell information of the HeNB/HNB whose operation mode setting has been changed or in a neighboring cell list according to the change of the operation mode setting of the HeNB/HNB. Because this concrete example does not have to store and process the measurement report, or make a comparison with a threshold or the like, as compared with the concrete examples (1) and (2), there can be provided an advantage of reducing the processing load on the selection method of selecting a cell which needs to change the "neighboring hybrid status".

Figure 41:
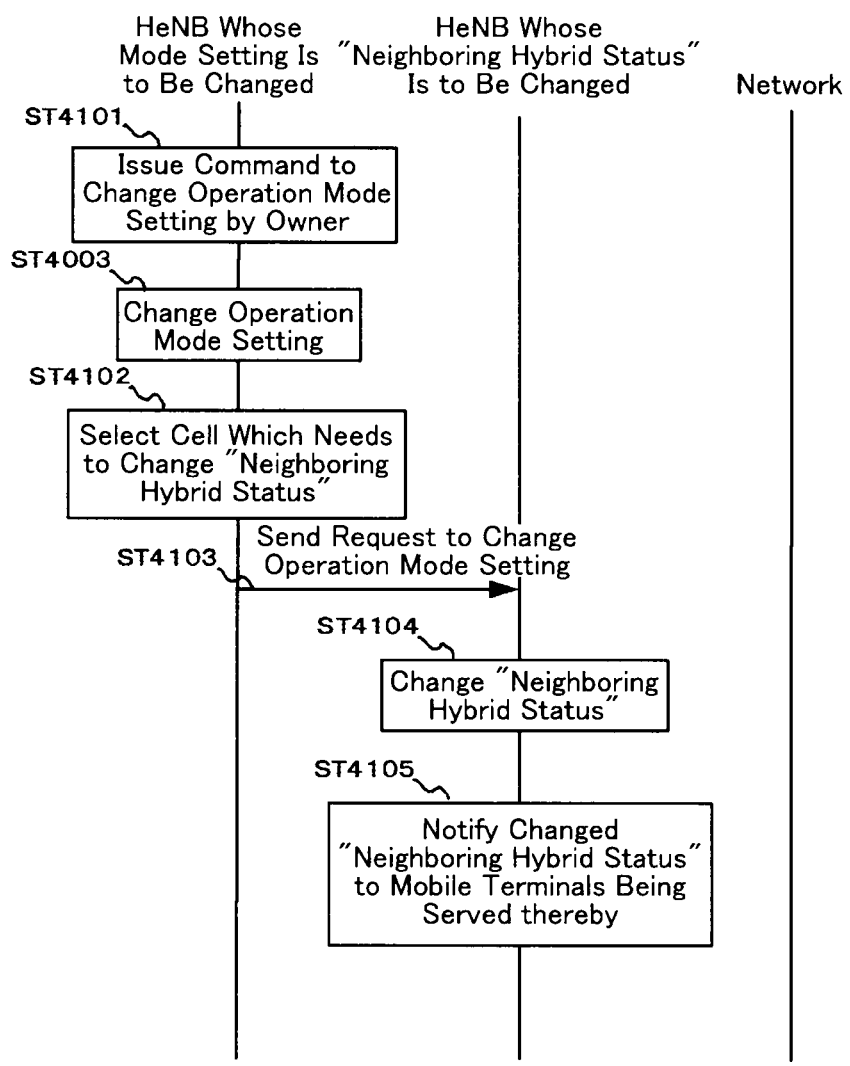
FIG. 41 is a sequence diagram of a mobile communication system which is provided as a solution by Variant 1 of Embodiment 11.

Next, the operation of the mobile communication system will be explained. An example of arrangement of cells which are used for explanation is shown in FIG. 39. An example of the operation of the mobile communication system is shown in FIG. 41. Because the example of the cell arrangement shown in FIG. 39 is the same as that shown in Embodiment 11, the explanation of the example will be omitted hereafter. An example of the operation of the mobile communication system will be shown with reference to FIG. 41. Because the same reference characters as those shown in FIG. 40 denote the same steps, the explanation of the steps will be omitted hereafter. An HeNB, in step ST4101, receives a command to change the operation mode setting from the owner thereof.

The HeNB, in step ST4102, selects a cell which needs to change the "neighboring hybrid status". As an alternative, the HeNB can select a cell which needs to change the NCL. A case in which the operation mode setting of an HeNB/HNB 3905 is changed from the closed access mode to the hybrid access mode in the example shown in FIG. 39 will be examined. In this case, in step ST4102, a macro cell 3901, a macro cell 3903, and an HeNB/HNB 3907 are selected as cells which need to change the "neighboring hybrid status", for example. Furthermore, a case in which the operation mode setting of an HeNB/HNB 3909 is changed from the closed access mode to the hybrid access mode in the example shown in FIG. 39 will be examined. In this case, in step ST4102, the macro cell 3901 is selected as a cell which needs to change the "neighboring hybrid status", for example.

The HeNB, in step ST4103, makes a change request to change the "neighboring hybrid status" of the one or more cells selected in step ST4102. As an alternative, the HeNB can make a change request to change the NCL of the one or more cells. The HeNB can alternatively notify a PCI suitable for the new operation mode to the one or more cells selected in step ST4102. In this case, the immediately-previous PCI and the new PCI, only the new PCI, the immediately-previous GCI and the new GCI, or only the new GCI can be transmitted to the network. Each of the one or more cells which has received the change request to change the "neighboring hybrid status", in step ST4104, changes its neighboring hybrid status. As an alternative, each of the one or more cells can change the NCL thereof. Each of the one or more cells which, in step ST4105, has received the "neighboring hybrid status" notifies the "neighboring hybrid status" changed in step ST4104 to mobile terminals being served thereby.

This Variant 1 of Embodiment 11 can be used in combination with Embodiment 11.

Variant 1 of Embodiment 11 can provide the following advantages in addition to those provided by Embodiment 11. Also in the case in which the operation mode setting of an HeNB or HeNB is changed via the HNB or HNB, even when the operation mode setting of the HeNB or HNB is changed after it is installed, there can be provided an advantage of being able to change the "neighboring hybrid status" or "NCL" appropriately. Furthermore, also in the case in which the operation mode setting of an HeNB or HeNB is changed via the HNB or HNB, this embodiment can eliminate the need for an operator or the owner of the HeNB/HNB to perform an operation of changing the "neighboring hybrid status". By doing in this way, the mobile communication system can update the "neighboring hybrid status" according to a change in the operation mode setting while suppressing the workload on the operator or the owner of the HeNB/HNB, and occurrence of an additional cost. As a result, also in the case in which the operation mode setting of an HeNB or HeNB is changed via the HNB or HNB, even when the operation mode setting of the HeNB or HNB is changed after it is installed, Variant 1 of Embodiment 3 or Embodiment 10 can be applied, and the same advantages as those provided by Variant 1 of Embodiment 3 or Embodiment 10 can be provided.

Variant 2 of Embodiment 11

A problem to be solved by Variant 2 of Embodiment 11 is the same as that shown in Embodiment 11 and Variant 1 of Embodiment 11, and the explanation of the problem will be omitted hereafter.

In this Variant 2 of Embodiment 11, another solution to the changing method of changing a "neighboring hybrid status" in the case of setting an operation mode via an HeNB/HNB, which is different from that provided by Variant 1 of Embodiment 11, will be disclosed. For example, the owner of an HeNB/HNB issues a command to change the operation mode setting directly to the HeNB/HNB. The HeNB/HNB which has received the command to change the operation mode setting changes the operation mode setting according to the command.

The HeNB/HNB notifies a network unit that it has changed the operation mode setting. An S1 interface or a broadband channel can be used for this notification. This notification can include identification information (a PCI, a GCI or the like) about the HeNB/HNB whose operation mode setting has been changed, the current operation mode, or the immediately-previous operation mode and the current operation mode. As a concrete example of the network unit, there is an EPC (Evolved Packet Core), an MME, an S-GW, an HeNBGW, or the like.

The network unit which has received the notification notifies the changed "neighboring hybrid status" to a cell which needs to change the "neighboring hybrid status" according to the change of the operation mode setting of the HeNB/HNB. An S1 interface or a broadband channel can be used for the notification of the change.

As an alternative, the network unit which has received the notification can notify a change request to a cell which needs to change the "neighboring hybrid status" according to the above-mentioned change of the operation mode setting of the HeNB/HNB. The cell which has received the change request to change the "neighboring hybrid status" changes the "neighboring hybrid status". An S1 interface or a broadband channel can be used for this notification of the change. The change request to change the "neighboring hybrid status" can include identification information (a PCI, a GCI or the like) of the HeNB/HNB whose operation mode setting has been changed, the current operation mode, or the immediately-previous operation mode and the current operation mode.

A cell which needs to change the "neighboring hybrid status" according to the change in the operation mode setting of the HeNB/HNB can be a cell which has a chance of selecting the HeNB/HNB whose operation mode setting has been changed as a handover destination or an object for cell reselection. Furthermore, when a base station notifies the "neighboring hybrid status" to mobile terminals being served thereby by using an NCL, the network unit can select a cell which needs to change an "NCL" according to the change of the operation mode setting of the HeNB/HNB.

Because a concrete example of a selection method of selecting a cell which needs to change the "neighboring hybrid status" according to the change of the operation mode setting of the HeNB/HNB is the same as that shown in Embodiment 11, the explanation of the selection method will be omitted hereafter.

Figure 42:
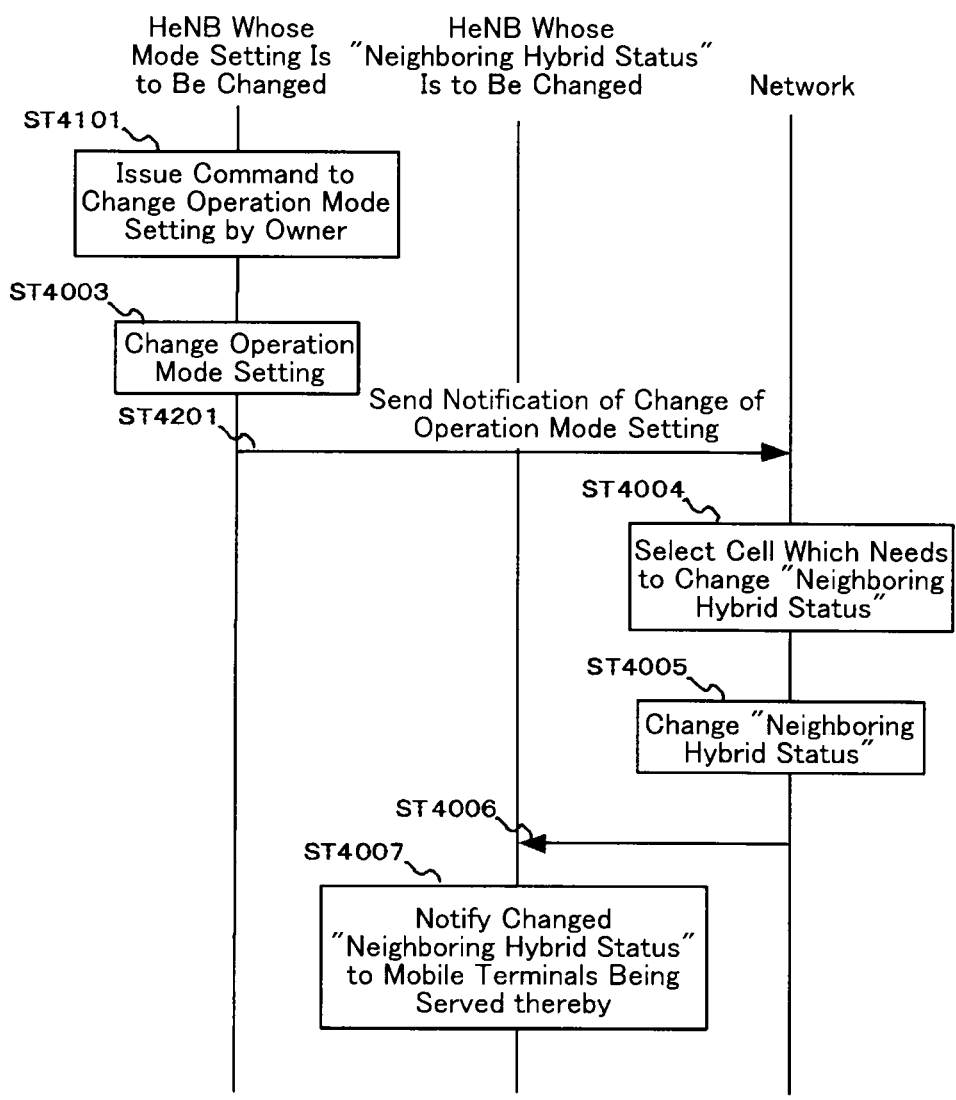
FIG. 42 is a sequence diagram of a mobile communication system which is provided as a solution by Variant 2 of Embodiment 11.

Next, the operation of a mobile communication system will be explained. An example of arrangement of cells which are used for explanation is shown in FIG. 39. An example of the operation of the mobile communication system will be shown in FIG. 42. Because the same reference characters as those shown in FIGS. 40 and 41 denote the same steps, the explanation of the steps will be omitted hereafter. An HeNB, in step ST4201, notifies the network unit that it has changed the operation mode setting. The HeNB can alternatively notify a PCI suitable for the new operation mode to the network unit. In this case, the immediately-previous PCI and the new PCI, only the new PCI, the immediately-previous GCI and the new GCI, or only the new GCI can be transmitted to the network unit.

This Variant 2 of Embodiment 11 can provide the same advantages as those provided by Variant 1 of Embodiment 11.

In any one of Embodiment 11, Variant 1 of Embodiment 11, and Variant 2 of Embodiment 11, the selection method of selecting a PCI suitable for the new operation mode according to a change of the operation mode setting is disclosed. In contrast, when Embodiment 1 is applied, there is no necessity to change the PCI according to a change in the operation mode setting. The method disclosed in Embodiment 1 is superior also in this point.

In any one of Embodiment 11, Variant 1 of Embodiment 11, and Variant 2 of Embodiment 11, the method of changing the "neighboring hybrid status" when the operation mode of an HeNB/HNB is changed is disclosed. Not only when the operation mode of an HeNB/HNB is changed but also when an HeNB/HNB is newly set up, the need to change the "neighboring hybrid status" of a neighboring cell in the neighborhood of the location where the HeNB/HNB is newly installed arises. Also in this situation, any one of Embodiment 11, Variant 1 of Embodiment 11, and Variant 2 of Embodiment 11 can be applied.

It has been studied that in an LTE system, a self configuration function or a self optimization function is supported. In this study, an ANR (Automatic Neighbor Relation) function has been studied (nonpatent reference 1). The ANR function is the one of automatically carrying out handling of relations with neighboring cells (Neighbor Relations (NRs)), instead of an operator which manually carries out the handling of relations with neighboring cells. By making the ANR function automatically carry out the handling of relations with neighboring cells, the mobile communication system can reduce the operator's workload and increase of the cost.

The method disclosed in any one of Embodiment 11, Variant 1 of Embodiment 11, and Variant 2 of Embodiment 11 can be incorporated into the ANR function as a part of this ANR function. It is preferable that the method of changing the "neighboring hybrid status" is incorporated into the ANR function. This ANR function can be disposed in each eNB or each HeNB/HNB, or can be disposed in the network unit.

In the case in which the ANR function is thus configured, the method disclosed in this embodiment can be implemented without increase in the workload on the operator or the owner of the HeNB/HNB and increase in the cost, and there can be provided an advantage of further enhancing the performance of the mobile communication system, and further lowering the power consumption of each mobile terminal. In addition, also when the installed number of HeNB/HNB(s) increases in the future, the mobile communication system can be configured in such a way as to support flexible installation of the plurality of HeNB/HNB (s) and a change of the operation mode of each HeNB/HNB. In the present invention, although embodiments including from Embodiment 1 to Variant 1 of Embodiment 11 are described individually, some of these embodiments can be used in combination.

In the present invention, although an LTE system (E-UTRAN) is described mainly, each of the embodiments can be applied to a W-CDMA system (UTRAN, UMTS) and an LTE-Advanced system. Furthermore, the present invention can be applied to a mobile communication system in which a CSG (Closed Subscriber Group) is introduced, and a communication system in which an operator specifies a subscriber, like in the case of a CSG, and the specified subscriber is allowed to access the communication system.

In the present invention, the case in which an HeNB/HNB supports the hybrid access mode is described mainly. The present invention can be applied also to the case in which other entities of the mobile communication system support the hybrid access mode. As a concrete example, the present invention can be applied to the case in which a cell having a large coverage, e.g., a macro cell supports the hybrid access mode, and the case in which a cell having a small coverage, e.g., a microcell, a pico cell, a femto cell, a hot spot, a relay or the like supports the hybrid access mode.

In the present invention, the case in which an HeNB/HNB supports a plurality of modes is described mainly. The present invention can be applied also to the case in which other entities of the mobile communication system support a plurality of modes. As a concrete example, the present invention can be applied to the case in which a cell having a large coverage, e.g., a macro cell supports a plurality of modes, and the case in which a cell having a small coverage, e.g., a microcell, a pico cell, a femto cell, a hot spot, a relay or the like supports a plurality of modes.

INDUSTRIAL APPLICABILITY

Because the mobile communication system in accordance with the present invention has an advantage of reducing the power consumption of a mobile terminal, and so on, the mobile communication system in accordance with the present invention is suitable for use as a mobile communication system in which a base station carries out radio communications with a plurality of mobile terminals, and so on.

The invention claimed is:
1. A mobile communication system including:
mobile terminals;
a closed subscriber group (CSG) cell operating in a closed access mode in which a specified one of the mobile terminals can access the CSG cell; and
a non-CSG cell operating in an open access mode in which an unspecified one of the mobile terminals can access the non-CSG cell, wherein
a CSG indicator indicates whether a cell is a CSG cell or not is broadcasted,
the mobile communication system further includes a hybrid cell operating in a hybrid access mode which shows an operation form of the CSG cell and supports both the closed access mode and the open access mode at the same time,
the hybrid cell sets the CSG indicator to indicate that the cell is not the CSG cell, and
the mobile terminals receive the CSG indicator.

2. The mobile communication system according to claim 1,
wherein on the basis of the CSG indicator set by the hybrid cell, the mobile terminals determine the cell by which the CSG indicator is set as the non-CSG cell or the hybrid cell.

3. The mobile communication system according to claim 1,
wherein the hybrid cell broadcasts a CSG identifier (CSG-ID) which is a specific identification number.

4. The mobile communication system according to claim 3,
wherein the mobile terminals receive the CSG-ID broadcasted by the hybrid cell and select a cell having a desired CSG-ID.

5. A cell used in a mobile communication system including mobile terminals, the cell comprising:
a CSG cell operating in a closed access mode in which a specified one of the mobile terminals can access the CSG cell; and
a non-CSG cell operating in an open access mode in which an unspecified one of the mobile terminals can access the non-CSG cell, wherein
a CSG indicator indicates whether a cell is a CSG cell or not is broadcasted, and
in a hybrid access mode which shows an operation form of the CSG cell and supports both the closed access mode and the open access mode at the same time, the cell sets the CSG indicator to indicate that the cell is not the CSG cell.

6. The cell according to claim 5,
wherein the cell broadcasts a CSG-ID, which is a specific identification number.

7. A mobile terminal used in a mobile communication system including
a CSG cell operating in a closed access mode in which a specified mobile terminal can access the CSG cell, and
a non-CSG cell operating in an open access mode in which an unspecified mobile terminal can access the non-CSG cell, wherein
a CSG indicator indicates whether a cell is a CSG cell or not is broadcasted,
the mobile terminal comprising:
a receiver that receives the CSG indicator set by a hybrid cell operating in a hybrid access mode which shows an operation form of the CSG cell and supports both the closed access mode and the open access mode at the same time.

8. The mobile terminal according to claim 7,
wherein on the basis of the CSG indicator set by the hybrid cell, the mobile terminal determines the cell by which the CSG indicator is set as the non-CSG cell or the hybrid cell.

9. A mobile terminal used in a mobile communication system including
- a CSG cell operating in a closed access mode in which a specified mobile terminal can access the CSG cell, and
- a non-CSG cell operating in an open access mode in which an unspecified mobile terminal can access the non-CSG cell, the mobile terminal comprising:
- a receiver that receives a CSG-ID, which is a specific identification number, broadcasted by a hybrid cell operating in a hybrid access mode which shows an operation form of the CSG cell and supports both the closed access mode and the open access mode at the same time; and
- a controller that selects a cell having a desired CSG-ID.

* * * * *